United States Patent
Kim et al.

(10) Patent No.: US 10,986,462 B2
(45) Date of Patent: Apr. 20, 2021

(54) SYSTEM AND METHOD FOR PROVIDING INFORMATION USING NEAR FIELD COMMUNICATION

(71) Applicant: Samsung Electronics Co., Ltd., Suwon-si (KR)

(72) Inventors: Sun-kyung Kim, Busan (KR); Yevhenii Yakishyn, Kyiv (UA); Andrii Astrakhantsev, Kharkov (UA); Mykhaylo Korobov, Kharkov (UA); Vladimir Tuz, Kharkov (UA); Kyoung-jin Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 211 days.

(21) Appl. No.: 15/781,636

(22) PCT Filed: Dec. 7, 2016

(86) PCT No.: PCT/KR2016/014271
§ 371 (c)(1),
(2) Date: Jun. 5, 2018

(87) PCT Pub. No.: WO2017/099463
PCT Pub. Date: Jun. 15, 2017

(65) Prior Publication Data
US 2020/0275249 A1    Aug. 27, 2020

(30) Foreign Application Priority Data
Dec. 10, 2015  (KR) .................... 10-2015-0176031

(51) Int. Cl.
*H04W 4/90* (2018.01)
*H04W 4/80* (2018.01)
(Continued)

(52) U.S. Cl.
CPC ............... *H04W 4/00* (2013.01); *H04W 4/12* (2013.01); *H04W 4/80* (2018.02); *H04W 4/90* (2018.02);
(Continued)

(58) Field of Classification Search
CPC ..... H04W 4/80; H04W 4/90; H04W 12/0013; H04W 12/04031; H04W 4/12;
(Continued)

(56) References Cited

U.S. PATENT DOCUMENTS 8,477,948 B2    7/2013  Shon et al.
8,494,576 B1 *  7/2013  Bye ...................... H04L 9/3234
                                                    455/550.1
(Continued)

FOREIGN PATENT DOCUMENTS

CN    103987038 A      8/2014
CN    104219054 A  *  12/2014
(Continued)

OTHER PUBLICATIONS

Extended European Search Report dated Aug. 29, 2018, issued in European Application No. 16873328.5-1218 / 3370443.
(Continued)

*Primary Examiner* — Un C Cho
*Assistant Examiner* — Lalita W Pace
(74) *Attorney, Agent, or Firm* — Jefferson IP Law, LLP

(57) ABSTRACT

Provided are a system and a method for providing information by using a near field communication. A method for a first device to provide information to a second device includes receiving a first message broadcasted from a communication apparatus since the first device is located within a near field communication range of the communication apparatus; receiving a second message from the second device since the second device located within the near field
(Continued)

communication range of the communication apparatus is in near field contact with the first device after the first message is received; authenticating the second device using the second message; and providing predetermined information related to the communication apparatus and the second device since the second device is authenticated.

15 Claims, 44 Drawing Sheets

(51) Int. Cl.
    *H04W 4/00* (2018.01)
    *H04W 12/06* (2021.01)
    *H04W 12/08* (2021.01)
    *H04W 12/04* (2021.01)
    *H04W 12/00* (2021.01)
    *H04W 4/12* (2009.01)

(52) U.S. Cl.
    CPC . *H04W 12/0013* (2019.01); *H04W 12/04031* (2019.01); *H04W 12/06* (2013.01); *H04W 12/0609* (2019.01); *H04W 12/08* (2013.01)

(58) Field of Classification Search
    CPC ........... H04W 12/06; H04W 12/00407; H04W 12/00; H04W 12/00503; H04W 12/04; H04W 12/04071; H04W 12/0605; H04W 12/00305; H04W 84/18; H04W 76/14; H04W 76/23; H04W 8/082; H04W 36/03; H04W 12/003; H04W 12/00506; H04W 12/009; H04W 12/0403; H04W 12/0602; H04W 12/0608; H04W 12/0609; H04W 48/02; H04W 48/04; H04W 48/10; H04W 76/50; H04W 4/02; H04W 4/024; H04W 4/029; H04W 64/00; H04W 12/08; H04L 67/12; G06F 2221/0788; G06K 7/0008; G06K 19/0723; H04B 5/00; H04B 5/0012; H04B 5/02; H04M 1/7253; H04M 2250/02; H04M 11/04; H04M 2242/04; G08B 25/016
    See application file for complete search history.

(56) References Cited

U.S. PATENT DOCUMENTS

| | | | |
|---|---|---|---|
| 8,837,718 B2 | 9/2014 | Lauter et al. | |
| 8,874,067 B2 | 10/2014 | Hebbar et al. | |
| 9,538,372 B2* | 1/2017 | Li | H04L 9/0866 |
| 2003/0016122 A1 | 1/2003 | Petrick | |
| 2004/0171369 A1* | 9/2004 | Little | H04W 12/0401 455/410 |
| 2004/0190038 A1* | 9/2004 | Shahindoust | G07F 17/26 358/1.14 |
| 2006/0149967 A1* | 7/2006 | Lee | H04L 63/08 713/168 |
| 2006/0232437 A1* | 10/2006 | Gutowski | H04W 4/80 340/10.1 |
| 2007/0008922 A1* | 1/2007 | Abhishek | H04W 72/02 370/329 |
| 2007/0097934 A1* | 5/2007 | Walker | H04L 9/083 370/338 |
| 2008/0194927 A1* | 8/2008 | KenKnight | G06Q 50/24 600/301 |
| 2010/0063889 A1* | 3/2010 | Proctor, Jr. | G06Q 30/0222 705/21 |
| 2010/0087146 A1 | 4/2010 | Han et al. | |
| 2010/0179831 A1 | 7/2010 | Brown et al. | |
| 2012/0284511 A1* | 11/2012 | Paddon | H04W 4/029 713/168 |
| 2013/0217332 A1* | 8/2013 | Altman | H04W 12/04 455/41.2 |
| 2014/0220883 A1 | 8/2014 | Emigh et al. | |
| 2014/0329464 A1 | 11/2014 | Yoon | |
| 2015/0058629 A1* | 2/2015 | Yarvis | H04L 63/0442 713/171 |
| 2015/0271676 A1 | 9/2015 | Shin et al. | |
| 2015/0289295 A1* | 10/2015 | Granbery | H04L 67/1046 370/230 |
| 2015/0359489 A1* | 12/2015 | Baudenbacher | G06F 19/3418 600/300 |
| 2017/0110000 A1* | 4/2017 | Venkatesh | G08B 21/22 |
| 2018/0000346 A1* | 1/2018 | Cronin | A61B 5/0205 |
| 2019/0075421 A1* | 3/2019 | Fogg | H04W 64/00 |

FOREIGN PATENT DOCUMENTS

| | | |
|---|---|---|
| GB | 2523444 A | 8/2015 |
| KR | 10-2010-0002424 A | 1/2010 |
| KR | 10-2010-0038790 A | 4/2010 |
| KR | 10-2011-0054737 A | 5/2011 |
| KR | 10-1259009 B1 | 4/2013 |
| WO | 2007/031955 A2 | 3/2007 |
| WO | 2014/171662 A1 | 10/2014 |

OTHER PUBLICATIONS

International Search Report dated Feb. 27, 2017, issued in International Application No. PCT/KR2016/014271.
Chinese Office Action with English translation dated Jul. 30, 2020; Chinese Appln. No. 201680078483.4.

\* cited by examiner

FIG. 23

SYSTEM AND METHOD FOR PROVIDING INFORMATION USING NEAR FIELD COMMUNICATION

TECHNICAL FIELD

The disclosure relates to a system and method for providing information by using near field communication, and more particularly to a system and method for transmitting and receiving information between devices located within a communication range of a communication apparatus.

BACKGROUND ART

As multimedia and network technologies are improved, devices may communicate with each other to transmit and receive various types of information, thereby providing various services to users. In particular, in the case of performing near field communication between devices, secure provision of information from one device to another becomes important, and appropriate information needs to be provided from the device to the other device. Accordingly, there is a need for a technique that enables the device to efficiently authenticate the other device and effectively provide the appropriate information to the other device.

DESCRIPTION OF EMBODIMENTS

Technical Problem

Provided are a system and method for providing information by using near-field communication, which may safely provide appropriate information to another device through near field communication.

Provided are also a system and method for providing information by using near field communication, wherein a first device located within a near field communication range of a communication apparatus may effectively authenticate a second device located within the near field communication range of the communication apparatus.

Provided are also a system and method for providing information by using near field communication, wherein a public key of a user of a first device, a public key of a user of a second device, and a session key in a message transmitted from a communication apparatus are used to encrypt information used for authentication of the second device.

BRIEF DESCRIPTION OF DRAWINGS

FIG. 23 is a diagram showing an example in which a first device, a second device, and a third device display profile information, first health information, and second health information, respectively, according to some embodiments.

BEST MODE

Figure 1:
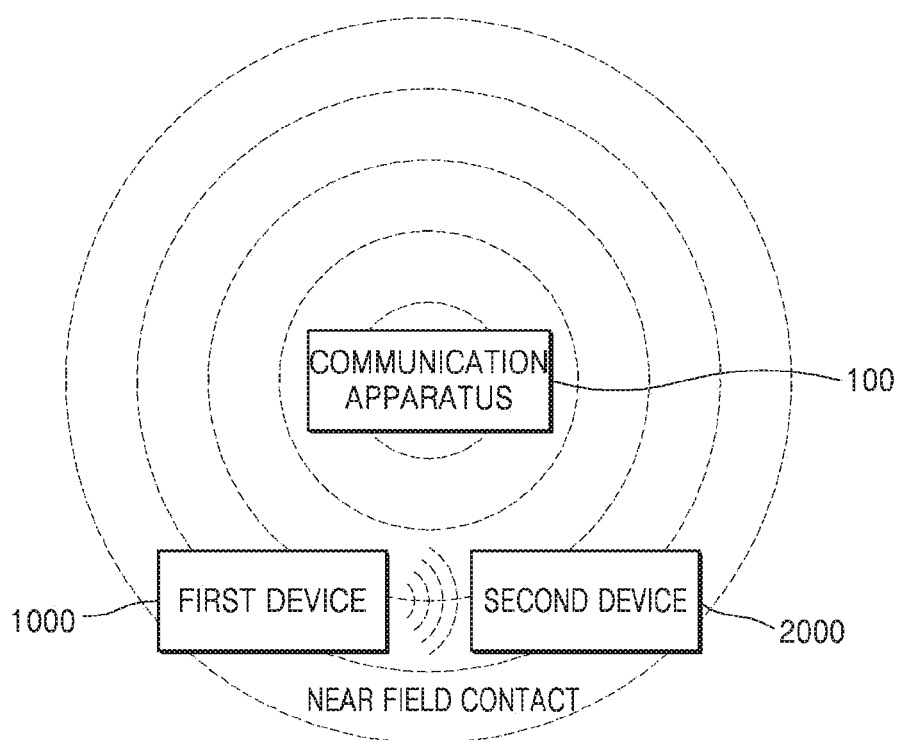
FIG. 1 is a schematic diagram illustrating an example of an information providing system using near field communication, according to some embodiments.

According to an aspect of the disclosure, a method, performed by a first device, of providing information to a second device includes receiving a first message broadcasted from a communication apparatus when the first device is located within a near field communication range of the communication apparatus; receiving a second message from the second device as the second device located within the near field communication range of the communication apparatus comes into near field contact with the first device after the first message is received; authenticating the second device by using the second message; and providing predetermined information related to the communication apparatus and the second device when the second device is authenticated.

According to another aspect of the disclosure, a first device for providing information to a second device includes a communicator configured to receive a first message broadcasted from a communication apparatus when the first device is located within a near field communication range of the communication apparatus and receive a second message from the second device as the second device located within the near field communication range of the communication apparatus comes into near field contact with the first device after the first message is received; and a controller configured to authenticate the second device by using the second message and provide predetermined information related to the communication apparatus and the second device when the second device is authenticated.

According to another aspect of the disclosure, a computer-readable recording medium having embodied thereon a program for executing the method in a computer may be provided.

Mode of Disclosure

Hereinafter, embodiments of the disclosure will be described in detail with reference to the accompanying drawings so that those skilled in the art may easily carry out the disclosure. However, the disclosure may be embodied in many different forms and is not limited to the embodiments described herein. Further, to clearly explain the disclosure in the drawings, portions not related to the description are omitted, and like reference numerals denote like portions throughout the specification.

Although the terms used in the disclosure have been described in general terms that are currently used in consideration of the functions referred to in the disclosure, they are intended to encompass various other terms depending on the intent of those skilled in the art, precedents, or the emergence of new technology. Accordingly, the terms used in the disclosure are not defined based on the meaning of the term, not on the name of a simple term, but on the contents throughout the disclosure.

Also, the terms first, second, etc. may be used to describe various elements, but the elements are not limited by these terms. These terms are used for the purpose of distinguishing one component from another.

Moreover, the terms used in the disclosure are used only to describe specific embodiments, and are not intended to be used to limit the disclosure. The singular expressions include plural meanings unless the context clearly dictates singular. Also, throughout the specification, when a part is "connected" to another part, it includes not only a case where the part is "directly connected" but also a case where the part is "electrically connected" with another part in between. Also, when a part includes an element, it means that the embodiment may include other elements other than the exclusion of other elements unless specifically stated otherwise.

In the specification, and in particular, the term "the" and similar indications used in the claims may refer to both singular and plural. Also, unless there is a description explicitly specifying the order of operations describing the method according to the disclosure, the operations described may be done in the proper order. The disclosure is not limited by the order of description of the operations described.

The phrases "in some embodiments" or "in an embodiment" appearing in various places in the specification are not necessarily referring to the same embodiment.

Some embodiments of the disclosure may be represented by functional block configurations and various processing operations. Some or all of these functional blocks may be implemented with various numbers of hardware and/or software configurations that perform particular functions. For example, the functional blocks of the disclosure may be implemented by one or more microprocessors, or by circuit configurations for a given function. Also, for example, the functional blocks of the disclosure may be implemented in various programming or scripting languages. The functional blocks may be implemented with algorithms running on one or more processors. The disclosure may also employ conventional techniques for electronic configuration, signal processing, and/or data processing, and the like. The terms "mechanism", "component", "means", "configuration", and the like are widely used and are not limited to mechanical and physical configurations.

Also, the connecting lines or connecting members between the elements shown in the figures are merely illustrative of functional connections and/or physical or circuit connections. In practical apparatuses, connections between the elements may be represented by various functional connections, physical connections, or circuit connections that may be replaced or added.

The disclosure will be described in detail with reference to the accompanying drawings.

FIG. 1 is a schematic diagram illustrating an example of an information providing system using near field communication according to some embodiments.

Referring to FIG. 1, the information providing system using near field communication may include a first device 1000, a second device 2000, and a communication apparatus 100. In some embodiments, the communication apparatus 100 may be a beacon apparatus that performs near field communication or an electronic apparatus including the beacon apparatus.

In the information providing system using near field communication according to some embodiments, the first device 1000 located within a near field communication range of the communication apparatus 100 may authenticate the second device 2000 located within the near field communication range of the communication apparatus 100 and may provide predetermined information related to the communication apparatus 100 and the second device 2000.

Since the first device 1000 and the second device 2000 are located within the near field communication range of the communication apparatus 100, a communication function for near field communication between the first device 1000 and the second device 2000 may be activated. Also, the first device 1000 located within the near field communication range of the communication apparatus 100 may perform near field communication with the second device 2000 located within the near field communication range of the communication apparatus 100. The near field communication of the communication apparatus 100 may include, for example, Bluetooth communication and Wi-Fi communication, but is not limited thereto. Also, the near field communication between the first device 1000 and the second device 2000 may include, for example, NFC communication and RFID communication, but is not limited thereto. Also, for example, the first device 1000 and the second device 2000 may perform near field communication with each other through tagging.

Protocols of BLE communication that may be used in the disclosure may be classified into a host protocol which is an upper protocol and a controller protocol which is a lower protocol with respect to a HCI (High Controller Interface). For example, the host protocol may include L2cap, ATT, SMP, GAT, and GATT, and the controller protocol may include a link layer and a physical layer. Also, for example, the communication apparatus 100 may broadcast a message including identification information of the communication apparatus 100 using the link layer. Also, a data packet used for BLE communication may include a Preamble field, an Access Address field, a PDU (Protocol Data Unit) field, and a CRC field. Also, the PDU field may include an Advertising Channel PDU used for a packet sent on Advertising channels or a Data Channel PDU used for a packet sent on Data channels.

The first device 1000 may receive authentication information from the second device 2000 through near field communication, and may authenticate the second device 2000 using the received authentication information. Further, since the second device 2000 located within the near field communication range of the communication apparatus 100 is authenticated, the first device 1000 may provide predetermined information related to the communication apparatus 100 and the second device 2000. The predetermined information related to the communication apparatus 100 and the second device 2000 may include, for example, profile information, health information, guide information, shopping information, mirroring data, and the like, but is not limited thereto.

The first device 1000 may be a smart phone, a tablet PC, a PC, a smart TV, a mobile phone, a personal digital assistant (PDA), a laptop, a media player, a global positioning system (GPS), an e-book reader, a digital broadcasting terminal, a navigation, a kiosk, an MP3 player, a digital camera, consumer electronics, and another mobile or non-mobile computing device but is not limited thereto. Also, the first device 1000 may be a wearable device having a communication function and a data processing function, such as a watch, glasses, a hair band, and a ring but is not limited thereto. The first device 1000 may include all kinds of devices capable of performing near field communication with the communication apparatus 100 and the second device 2000.

The second device 2000 may be a smart phone, a tablet PC, a PC, a smart TV, a mobile phone, a personal digital assistant (PDA), a laptop, a media player, a global positioning system (GPS), an e-book reader, a digital broadcasting terminal, a navigation, a kiosk, an MP3 player, a digital camera, consumer electronics, and another mobile or non-mobile computing device but is not limited thereto. Also, the second device 2000 may be a wearable device having a communication function and a data processing function, such as a watch, glasses, a hair band, and a ring but is not limited thereto. The second device 2000 may include all kinds of devices capable of performing near field communication with the communication apparatus 100 and the first device 1000.

Also, the first device 1000, the second device 2000, and the communication apparatus 100 according to some embodiments may use at least one of various types of Bluetooth communication methods, various types of WIFI communication, ZigBee communication, and ANT communication to communicate with each other. The communication method used by the first device 1000, the second device 2000 and the communication apparatus 100 may include, for example, Bluetooth ACL/HS, Bluetooth SCO/eSCO, Bluetooth low energy, Wi-Fi, Wi-Fi Direct, ZigBee, and ANT but is not limited thereto.

Also, types of data that may be transmitted and received between devices for each communication method may be different, and the first device 1000, the second device 2000, and the communication apparatus 100 may select an appropriate communication method among a plurality of communication methods according to an operating mode and a type of data that is to be transmitted and received.

Figure 2:
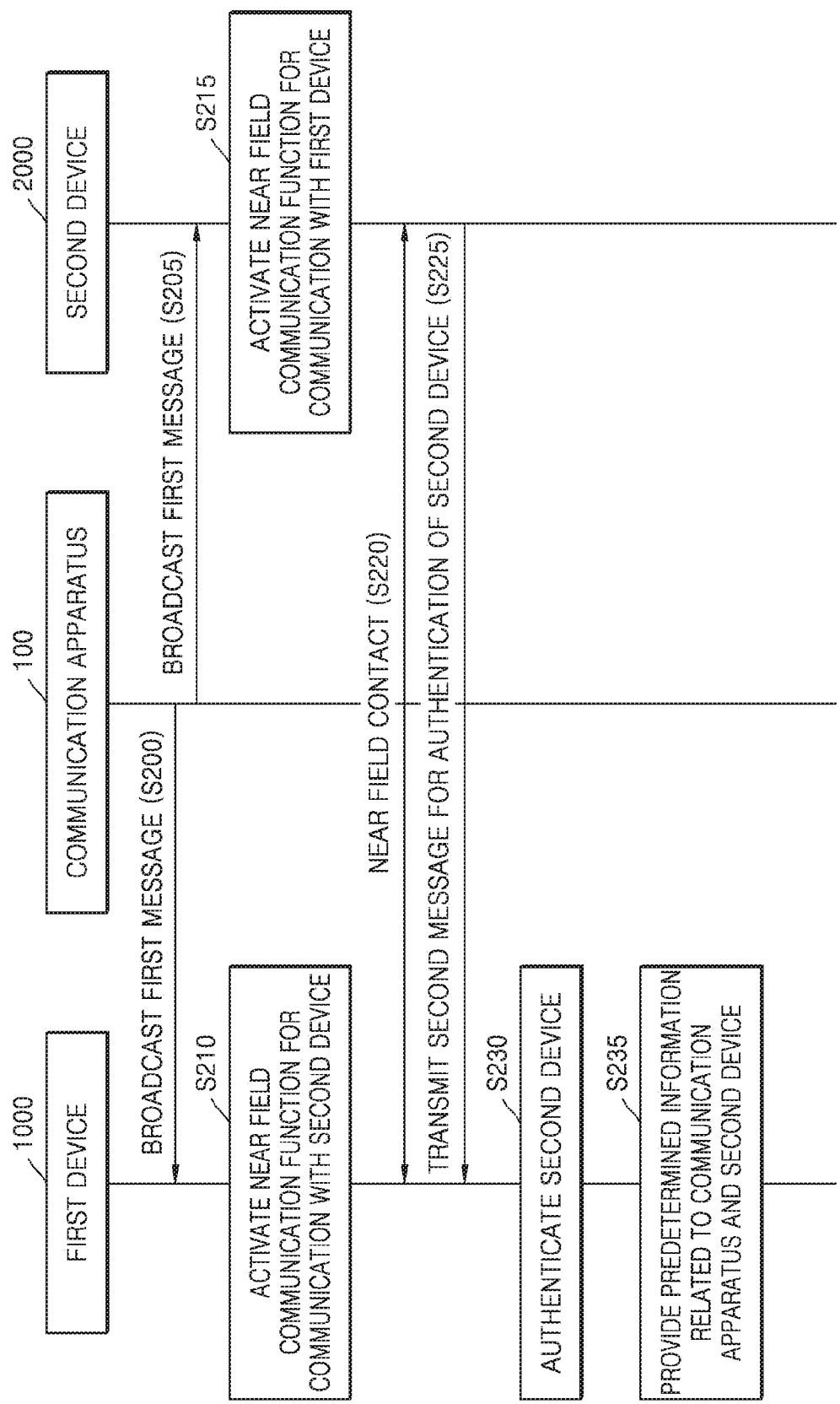
FIG. 2 is a flowchart of a method in which a first device authenticates a second device and provides predetermined information, according to some embodiments.

FIG. 2 is a flowchart of a method in which the first device 1000 authenticates the second device 2000 and provides predetermined information according to some embodiments.

In operations S200 and S205, the communication apparatus 100 may broadcast a first message. The first message may include, for example, identification information (e.g., ID) of the communication apparatus 100, a session key, and a random number value. The identification information of the communication apparatus 100 may be used by each of the first device 1000 and the second device 2000 to activate a near field communication function and may be used to determine an operation mode of the first device 1000. The session key may be used by the first device 1000 to transmit and receive data to and from an authentication server 200 that will be described later to authenticate the second device 2000. The data transmitted and received between the first device 1000 and the authentication server 200 may be encrypted by the session key. Also, the random number value may be provided from the first device 1000 to the authentication server 200, and may be used to authenticate the second device 2000.

In operation S210, the first device 1000 may activate the near field communication function for communication with the second device 2000. The first device 1000 may extract the identification information of the communication apparatus 100 from the first message received from the communication apparatus 100 and may activate the near field communication function for near field communication with the second device 2000 since the identification information is extracted. For example, the first device 1000 may activate a NFC communication function. In this case, the first device 1000 may previously set conditions for activating the near field communication function, for example, an ID of the communication apparatus 100 to be extracted to activate the near field communication function.

In operation S215, the second device 2000 may activate a near field communication function for communication with the first device 1000. The second device 2000 may extract the identification information of the communication apparatus 100 from the first message received from the communication apparatus 100 and may activate the near field communication function for near field communication with the first device 1000 since the identification information is extracted. For example, the second device 2000 may activate the NFC communication function. In this case, the second device 2000 may previously set the conditions for activating the near field communication function, for example, the ID of the communication apparatus 100 to be extracted to activate the near field communication function.

In operation S220, the first device 1000 may be in near field contact with the second device 2000. The first device 1000 in which the near field communication function is activated and the second device 2000 in which the near field communication function is activated may be close to each other and may exchange data with each other since the first device 1000 and the second device 2000 are close to each other.

In operation S225, the second device 2000 may provide the first device 1000 with a second message for authentication of the second device 2000. The second device 2000 may extract the random number value included in the first message and generate authentication information including the extracted random number value and identification information of a user of the second device 2000. Also, the second device 2000 may transmit the second message including the authentication information to the first device 1000.

In operation S230, the first device 1000 may authenticate the second device 2000. The first device 1000 may authenticate the second device 2000 using the random number value in the second message received from the second device 2000 and the identification information of the user of the second device 2000. The first device 1000 may request the authentication server 200 to authenticate the second device 2000.

In operation S235, the first device 1000 may provide predetermined information related to the communication apparatus 100 and the second device 2000. The predetermined information related to the communication apparatus 100 and the second device 2000 may include, for example, profile information, health information, guide information, shopping information, and presentation information, etc., but is not limited thereto. The information provided by the first device 1000 may be preset based on at least one of an identification value of the communication apparatus 100 and an identification value of the second device 2000.

Also, when the first device 1000 is out of a communication range of the communication apparatus 100, the first device 1000 may end or stop providing the information. Thereafter, when the first device 1000 comes back into the communication range of the communication apparatus 100, the first device 1000 may resume providing the information.

Figure 3:
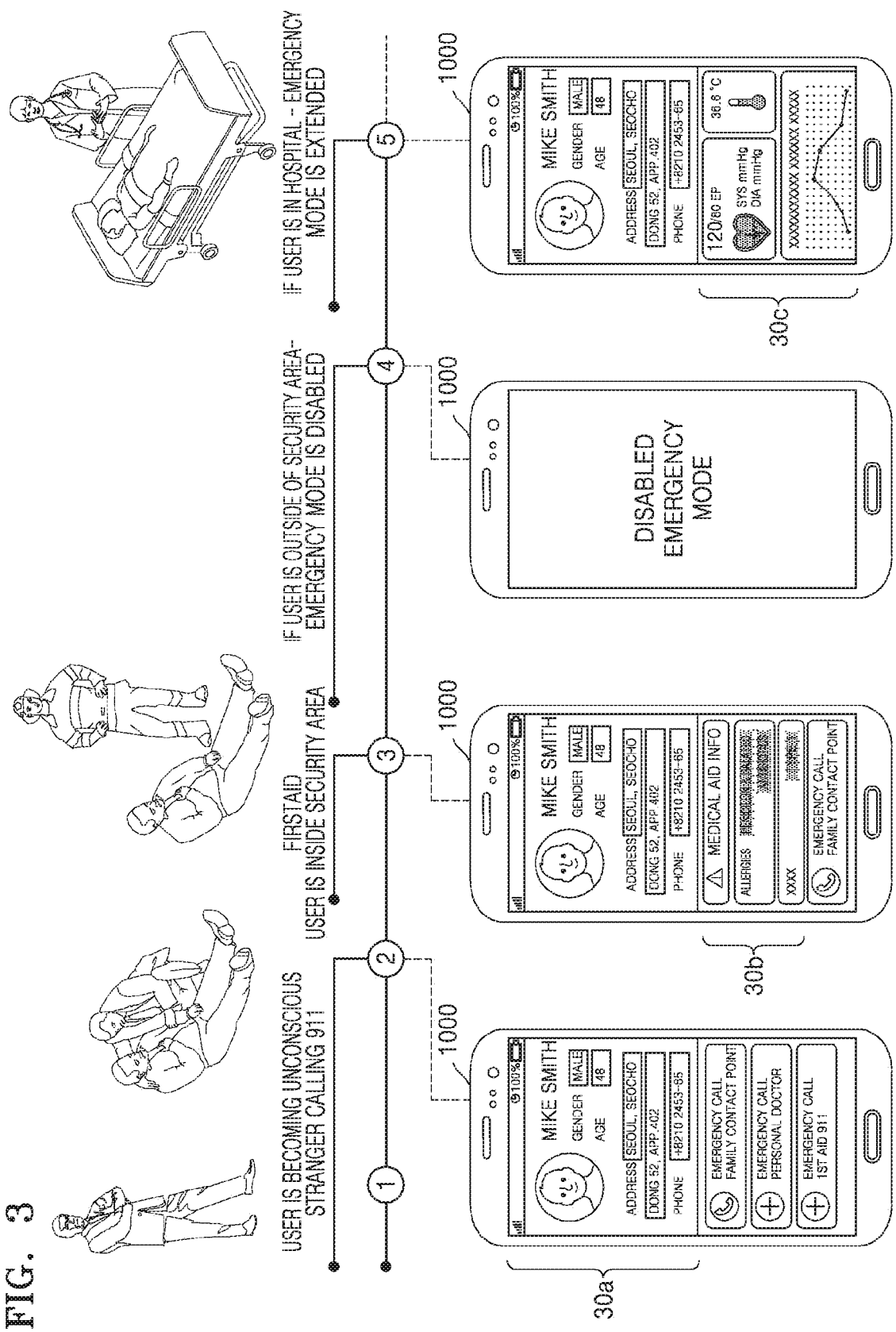
FIG. 3 is a diagram illustrating an example of providing health information of a first device when a user of the first device is in an emergency state, according to some embodiments.

FIG. 3 is a diagram illustrating an example of providing health information of the first device 1000 when a user of the first device 1000 is in an emergency state according to some embodiments.

Referring to FIG. 3, when the user of the first device 1000 becomes unconscious, the first device 1000 may determine that the user of the first device 1000 is in the emergency state. The first device 1000 may display profile information 30a of the user of the first device 1000 on a screen of the first device 1000 when it is determined that the user of the first device 1000 is in the emergency state.

A person nearby who has found the user of the first device 1000 may then call 911 using the first device 1000 and ask for a rescue with respect to the user of the first device 1000.

Also, for example, when a firefighter arrives at a location where the user of the first device 1000 is located, the first device 1000 and the second device 2000 may be located in a near field communication range of a first communication apparatus 100-1 installed in an ambulance, the first device 1000 may authenticate a user of the second device 2000 and display first health information 30*b* of the user of the first device 1000 on a screen of the first device 1000. The first health information 30*b* may be, for example, information about a disease of the user of the first device 1000.

Thereafter, when the user of the first device 1000 is moved to a hospital, the first device 1000 and the first device 1000 and a third device 3000 of a doctor may be located in a near field communication range of a second communication apparatus 100-2 installed in the hospital and display second health information 30*c* of the user of the first device 1000 on the screen of the first device 1000. The second health information 30*c* may include, for example, a hospital medical record of the user of the first device 1000.

Thus, when the user of the first device 1000 is in the emergency state, the person nearby, the firefighter and the doctor of the first device 1000 may obtain the profile information 30*a* of the user of the first device 1000, the first health information 30*b*, and the second health information 30*c*, respectively, and the user of the first device 1000 may be effectively rescued and treated through the profile information 30*a*, the first health information 30*b*, and the second health information 30*c*.

Figure 4:
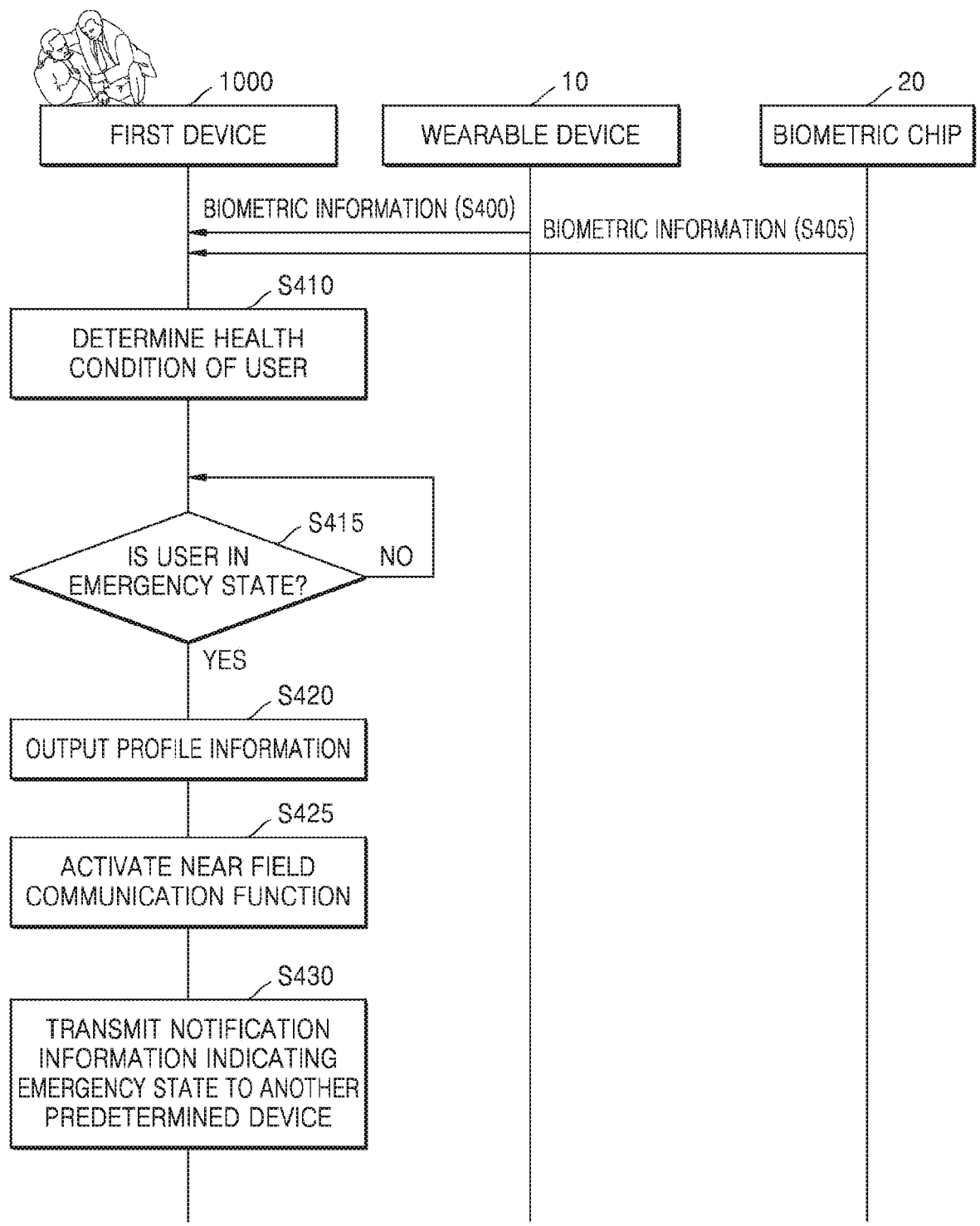
FIG. 4 is a flowchart of a method, performed by a first device, of determining a health condition of a user of the first device, based on biometric information, and switching an operation mode of the first device to an emergency mode, according to some embodiments.

FIG. 4 is a flowchart of a method, performed by the first device 1000, of determining a health condition of a user of the first device 1000 based on biometric information and switching an operation mode of the first device to an emergency mode according to some embodiments.

The emergency mode may be an operation mode for the first device 1000 to provide information necessary to rescue the user of the first device 1000. In the emergency mode, the first device 1000 may authenticate the second device 2000 or the third device 3000 according to a predetermined rule and provide health information of the user of the first device 1000. Also, in the emergency mode, the first device 1000 may activate a predetermined power saving function of the first device 1000 to save battery in the first device 1000. Since the predetermined power saving function of the first device 1000 is activated, the first device 1000 may change a brightness of a screen of the first device 1000 and a color of a background screen or end at least some of applications running in the first device 1000.

In operation S400, the first device 1000 may receive the biometric information of the user of the first device 1000 from a wearable device 10. The wearable device 10 may be a device worn on a user's body and may be a device with a communication function and a data processing function, such as, a watch, glasses, a hair band and a ring. However, the disclosure is not limited thereto. The biometric information may be information used to determine a health condition of the user and may include, for example, a body temperature of the user, a blood pressure, a pulse, a blood sugar level, and a pupil state, but is not limited thereto.

In operation S405, the first device 1000 may receive the biometric information of the user of the first device 1000 from a biometric chip 20 in the body of the user of the first device 1000. The biometric chip 20 may be a device inserted into the user's body to detect the biometric information of the user, and may provide the detected biometric information to the first device 1000. Also, the biometric chip 20 may provide the biometric information to the first device 1000 via the wearable device 10 by providing the detected biometric information to the wearable device 10.

In operation S410, the first device 1000 may determine the health condition of the user of the first device 1000. The first device 1000 may determine the health condition of the user by analyzing the biometric information received from at least one of the wearable device 10 and the biometric chip 20. The first device 1000 may periodically determine the health condition of the user and accumulate and store data regarding the determined health condition.

In operation S415, the first device 1000 may determine whether the user is in an emergency state. A value of the biometric information for determining whether the user is in the emergency state may be previously set.

When it is determined in operation S415 that the user of the first device 1000 is in the emergency state, in operation S420, the first device 1000 may output profile information of the user of the first device 1000. The first device 1000 may display the profile information of the user of the first device 1000 on a screen of the first device 1000. The profile information of the user may include, for example, a name of the user, an age, a gender, etc., and the first device 1000 may display a telephone number for an emergency rescue request and a predetermined telephone number of an acquaintance of the user of the first device 1000 together with the profile information of the user on the screen of the first device 1000.

In operation S420, the first device 1000 may activate a near field communication function. In operation S425, the first device 1000 may activate a predetermined near field communication function to receive a message from the communication apparatus 100.

In operation S430, the first device 1000 may transmit notification information indicating an emergency state of the user of the first device 1000 to another predetermined device (not shown). The other device (not shown) to receive the notification information indicating the emergency state of the user of the first device 1000 may be preset by the user of the first device 1000. Alternatively, the other device (not shown) to receive the notification information indicating the emergency state of the user of the first device 1000 may be determined based on a call history of the first device 1000. For example, another device (not shown) of a telephone number called more than a predetermined number of times based on the call history of the first device 1000 may be determined as the other device (not shown) to receive the notification information.

Also, the notification information indicating the emergency state of the user may be previously set. For example, a notification message such as "a user AAA is currently in an emergency state and is being rescued" may be previously set according to the emergency state of the first device 1000. Meanwhile, the first device 1000 may generate black box information that will be described later, and may periodically transmit the black box information to the other predetermined device (not shown).

Figure 5:
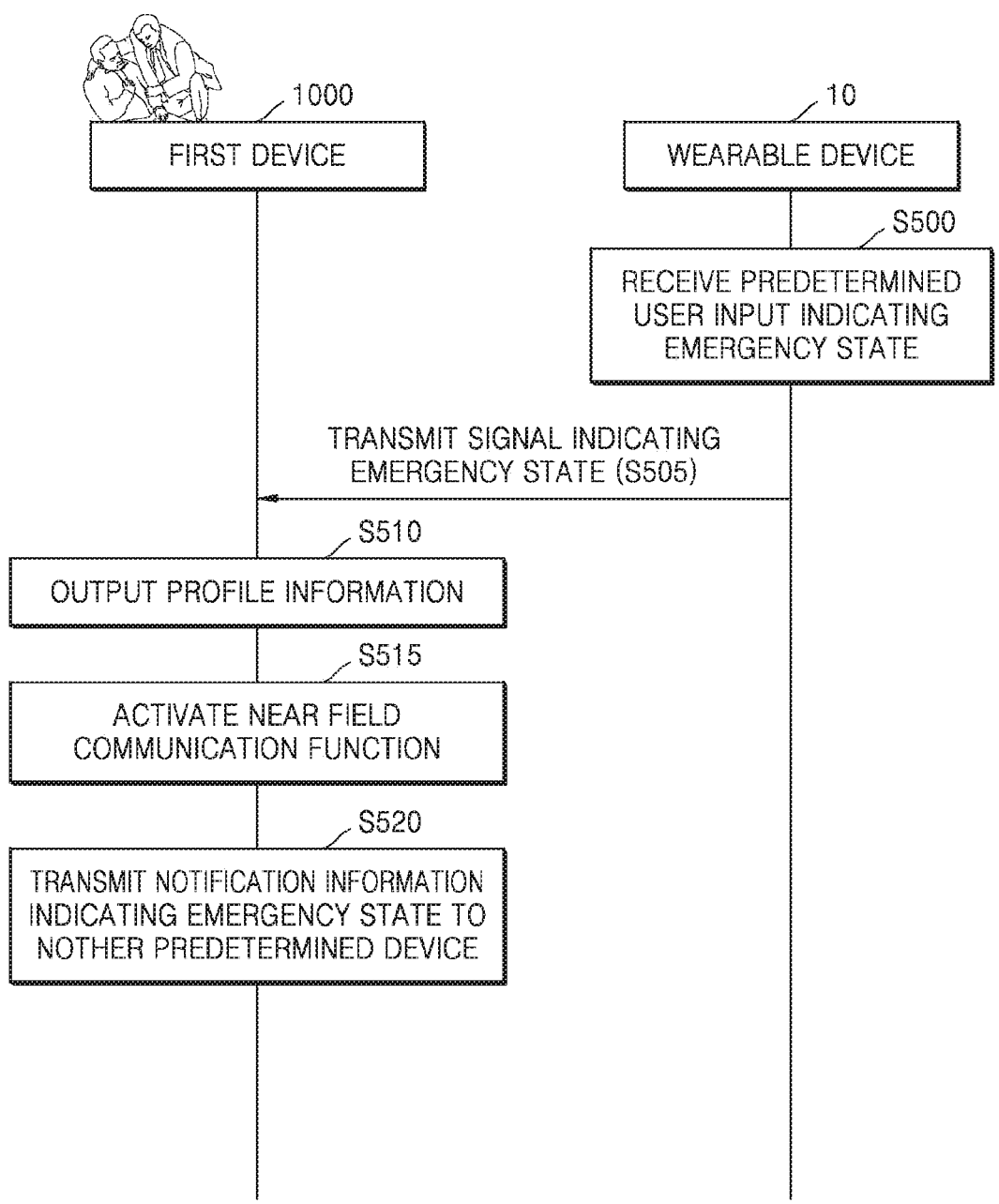
FIG. 5 is a flowchart of a method of switching an operation mode of a first device to an emergency mode depending on a user input with respect to a wearable device, according to some embodiments.

FIG. 5 is a flowchart of a method of switching an operation mode of the first device 1000 to an emergency mode depending on a user input with respect to the wearable device 10 according to some embodiments.

In operation S500, the wearable device 10 may receive a predetermined user input indicating an emergency state of a user of the first device 1000. The user of the first device 1000 may input a user input to the wearable device 10 to notify the emergency state of the user of the first device 1000 in a situation where a health condition rapidly deteriorates and a rescue is required. For example, when the wearable device 10 is a smart watch, the user may input a touch input of a predetermined pattern to a screen of the smart watch. For example, to notify the emergency state of the user of the first device 1000, the user of the first device 1000 may input the touch input of the predetermined pattern, regardless of an operation being performed in the wearable device 10 and a display status of a screen of the first device 1000. Also, for example, the user may move the wearable device 10 in the predetermined pattern. However, the user input for notifying the emergency state is not limited thereto.

In operation S505, the wearable device 10 may transmit a signal indicating the emergency state of the user to the first device 1000. The wearable device 10 may transmit a predetermined notification signal to the first device 1000 in response to the user input in operation S500.

In operations S500 and S505, it is described that the first device 1000 receives the signal indicating the emergency state of the user based on the user input through the wearable device 10, but the disclosure is not limited thereto. The user may input the user input to the first device 1000 to notify the emergency state of the user.

In operation S510, the first device 1000 may output profile information of the user of the first device 1000. The first device 1000 may output the profile information of the user in response to the notification signal indicating the emergency state of the user received from the wearable device 10. The first device 1000 may display the profile information of the user of the first device 1000 on a screen of the first device 1000. The first device 1000 may display a telephone number for an emergency rescue request and a predetermined telephone number of an acquaintance of the user of the first device 1000 together with the profile information of the user on the screen of the first device 1000.

In operation S515, the first device 1000 may activate a near field communication function. The first device 1000 may activate a predetermined near field communication function to receive a message from the communication apparatus 100.

In operation S520, the first device 1000 may transmit notification information indicating the emergency state of the user of the first device 1000 to another predetermined device (not shown). The other device (not shown) to receive the notification information indicating the emergency state of the user of the first device 1000 may be previously set by the user of the first device 1000.

Figure 6:
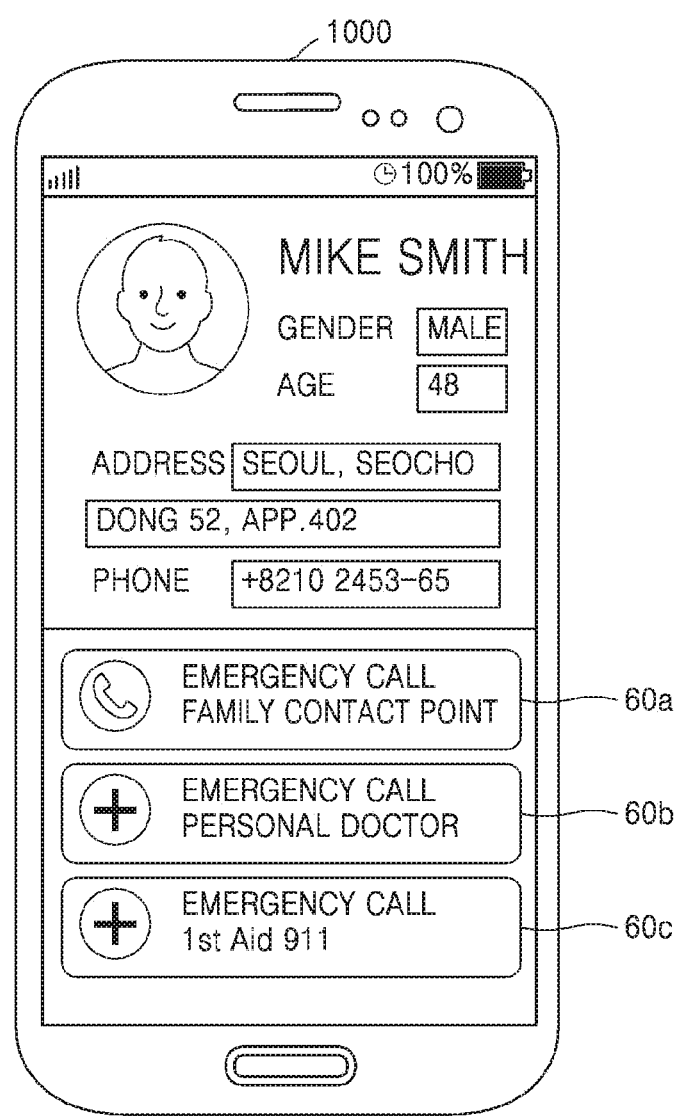
FIG. 6 is a diagram showing an example of profile information according to some embodiments.

FIG. 6 is a diagram showing an example of profile information according to some embodiments.

Referring to FIG. 6, the profile information of a user may include a name, a sex, an age, an address, and a telephone number. However, the disclosure is not limited to thereto. The profile information may include various types of information indicating a profile of the user according to setting of the user. Also, the first device 1000 may display a GUI for originating an emergency call along with the profile information of the user on a screen of the first device 1000.

For example, the GUI for originating the emergency call may include a button 60*a* for calling a user's family, a button 60*b* for calling a user's family doctor, and a button 60*c* for requesting an emergency rescue.

However, the information displayed by the first device 1000 together with the profile information is not limited thereto. Buttons (not shown) for notifying other users of an emergency may be displayed together with the profile information through predetermined methods. For example, the buttons for notifying the emergency may be variously configured according to a type of the first device 1000, a screen size, the setting of the user, or the like.

Figure 7:
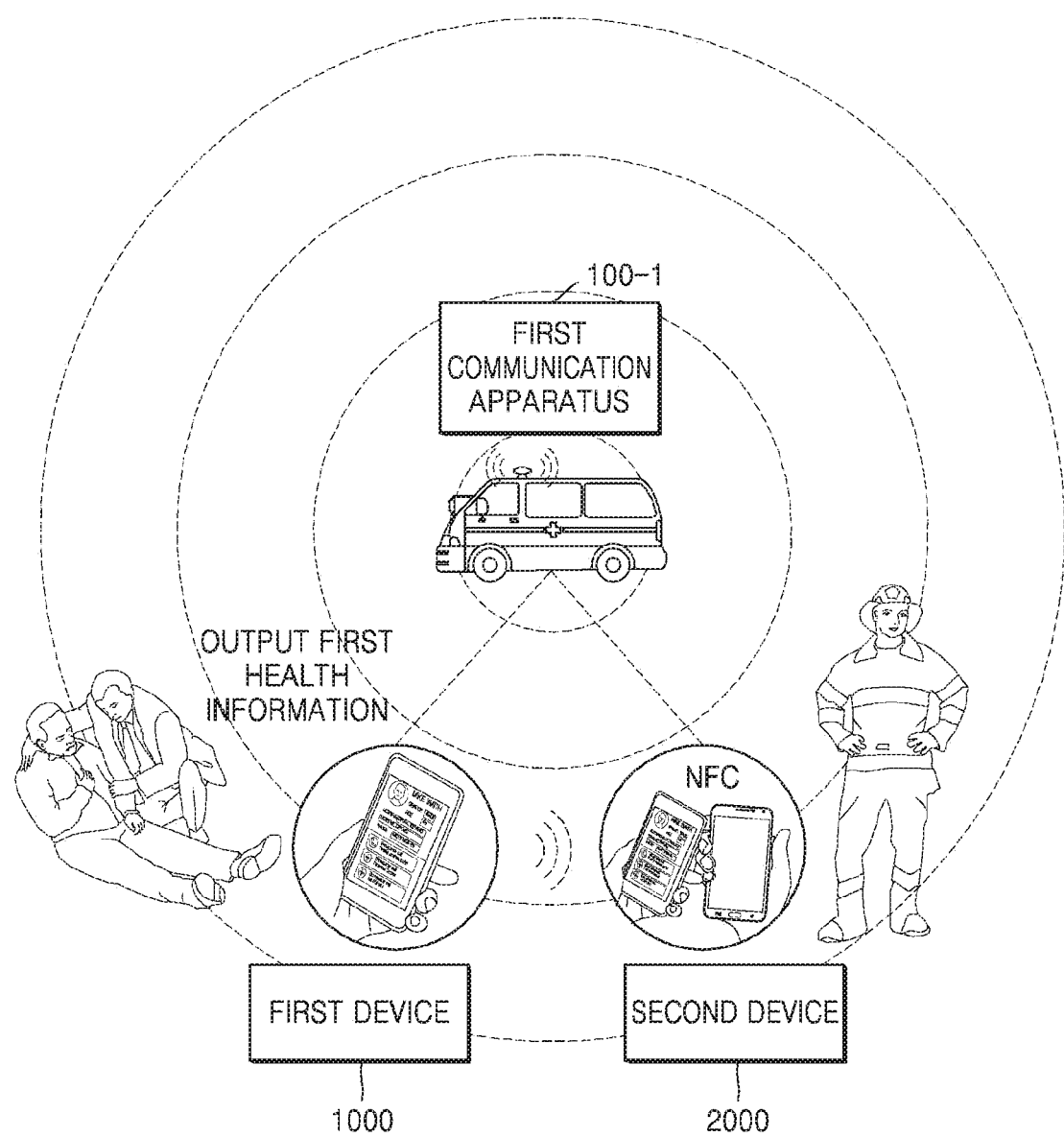
FIG. 7 is a diagram illustrating an example in which, when a user of a first device is in an emergency state, the first device authenticates a second device located within a communication range of a first communication apparatus and outputs first health information, according to some embodiments.

FIG. 7 is a diagram illustrating an example in which when a user of the first device 1000 is in an emergency state, the first device 1000 authenticates the second device 2000 located within a communication range of the first communication apparatus 100-1 and outputs first health information according to some embodiments. For example, the first communication apparatus 100-1 may be installed in an ambulance, and the second device 2000 may be a device of a firefighter.

Referring to FIG. 7, when the ambulance arrives at a place where the user of the first device 1000 is located, the first device 1000 and the second device 2000 may be located within a near field communication range of the first communication apparatus 100-1 installed in the ambulance. The first device 1000 and the second device 2000 may be in close contact with each other within the near field communication range of the first communication apparatus 100-1 and the first device 1000 may receive identification information including an ID of the firefighter that is a user of the second device 2000 from the second device 2000. The first device 1000 may then authenticate the second device 2000 and display the first health information about a screen of the first device 1000. The first health information may, for example, be information indicating a disease of the user of the first device 1000 and may be utilized by the firefighter to take emergency action to the user of the first device 1000.

Figure 8:
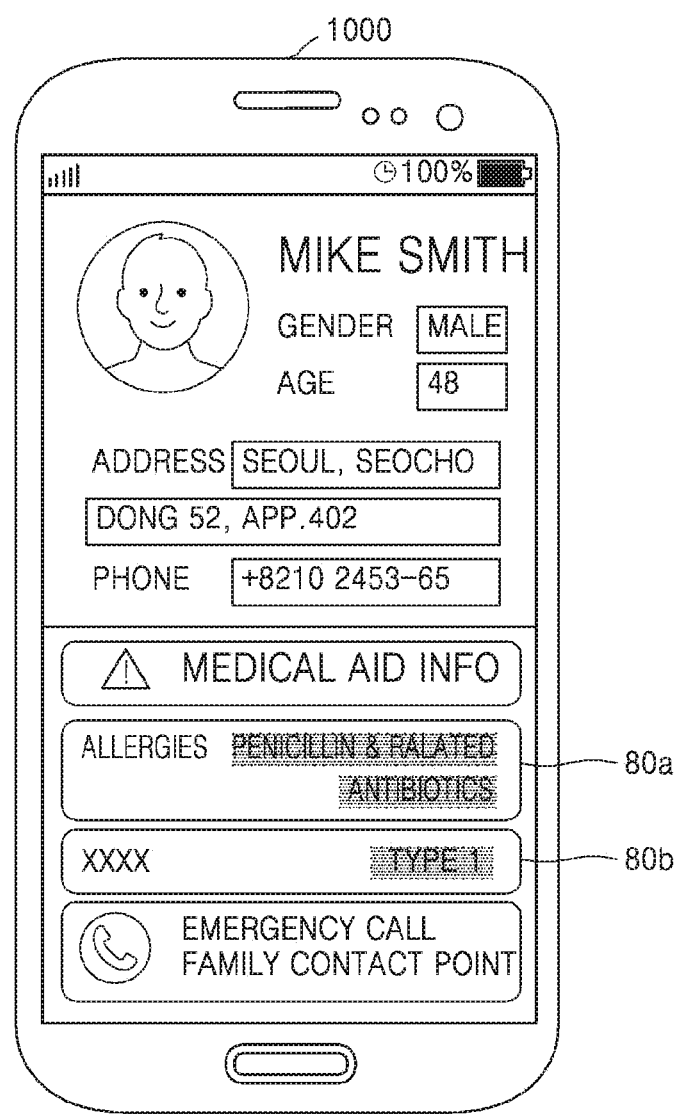
FIG. 8 is a diagram showing an example of health information according to some embodiments.

FIG. 8 is a diagram showing an example of first health information according to some embodiments.

The first health information of a user of the first device 1000 may be information necessary for an emergency rescue, and may include, for example, information about specificity of a user's body, information about a current disease of the user, and a type of the first health information. For example, the first health information may include information about the height, age, weight, blood type, organ donation status, chronic disease, allergy, etc. of the user. The first health information is not limited to the information exemplified above, and may include various types of information according to setting of the user.

Also, referring to FIG. 8, for example, the first device 1000 may display a field 80*a* indicating information about the user's allergy and a field 80*b* indicating the type of the first health information on a screen of the first device 1000. However, the first health information provided by the first device 1000 is not limited to the embodiment shown in FIG. 8, and various types of information necessary for an emergency rescue of the user may be provided as the first health information.

Figure 9:
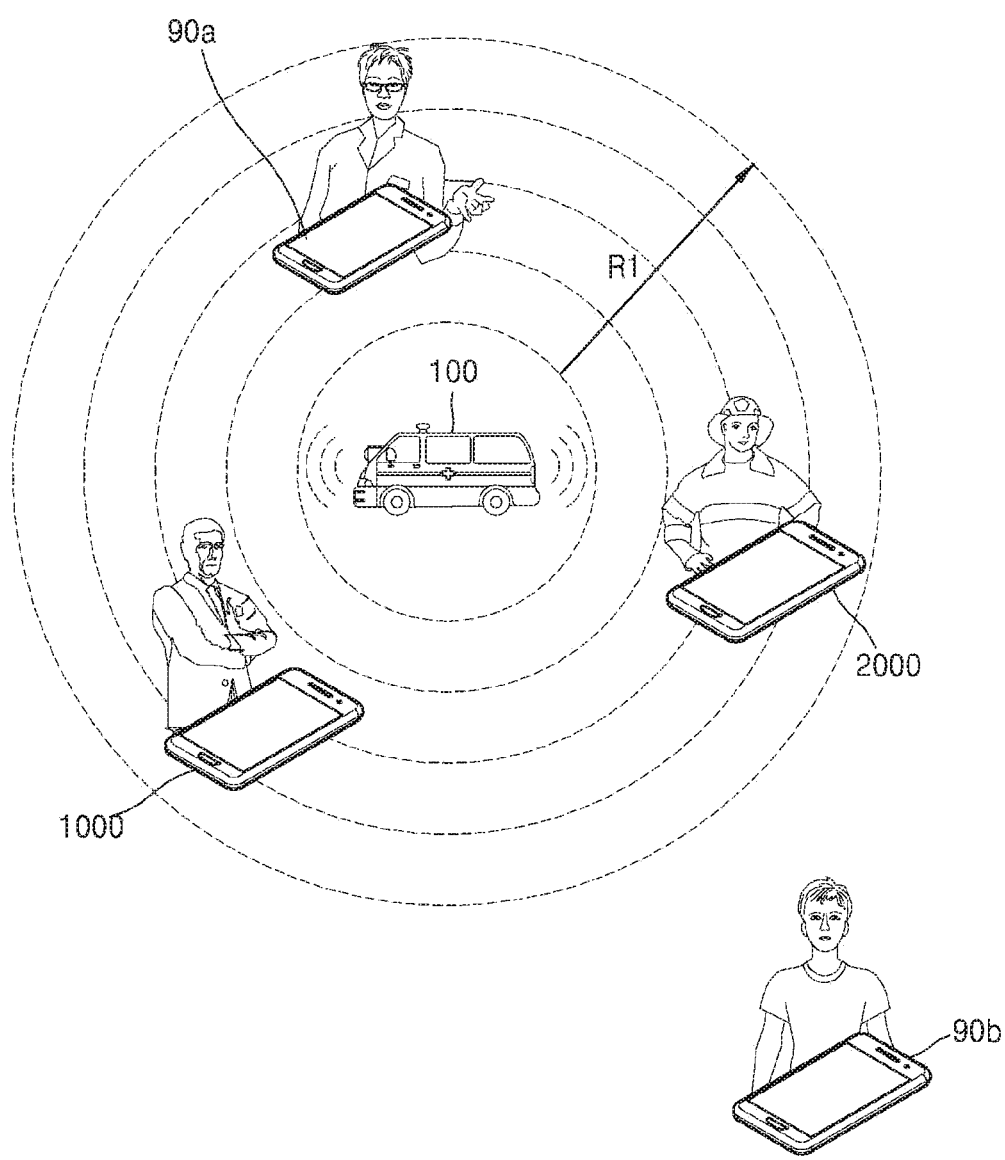
FIG. 9 is a diagram for explaining a communication range of a communication apparatus according to some embodiments.

FIG. 9 is a diagram for explaining a communication range of the communication apparatus 100 according to some embodiments.

Referring to FIG. 9, since an ambulance arrives around a user of the first device 1000 in an emergency state, the communication apparatus 100 in the ambulance may broadcast a first message. The communication apparatus 100 may broadcast the first message over near field communication and the communication range of the communication apparatus 100 may be formed, for example, within a range of a radius R1, with respect to the communication apparatus 100.

Another device 90*b* that is not located within the communication range of the communication apparatus 100 does not perform any operation but the first device 1000, the second device 2000, and another device 90*a* that are located within the communication range of the communication apparatus 100 may receive the first message and activate a communication function for inter-device near field communication. When the other device 90b enters the communication range of the communication apparatus 100, the other device 90b may receive the first message and activate the communication function for inter-device near field communication.

Thereafter, when the second device 2000 of a firefighter is in close contact with the first device 1000 and transmits authentication information of the second device 2000 to the first device 1000, the first device 1000 may authenticate the second device 2000 using the communication apparatus 100 and display first health information of the first device 1000 on a screen of the first device 1000.

Even when the other device 90a is close contact with the first device 1000, since the other device 90a will not be authenticated by the communication apparatus 100, personal information of the user of the first device 1000 may be securely may be managed.

Also, when the first device 1000 is out of the communication range of the communication apparatus 100, the first device 1000 may end an emergency mode and end providing of the first health information without performing authentication of the second device 2000. Alternatively, when the first device 1000 is out of the communication range of the communication apparatus 100, the first device 1000 may maintain the emergency mode but stop providing the first health information. In this case, when the first device 1000 comes back into the communication range of the communication apparatus 100, the first device 1000 may resume providing the first health information.

Figure 10:
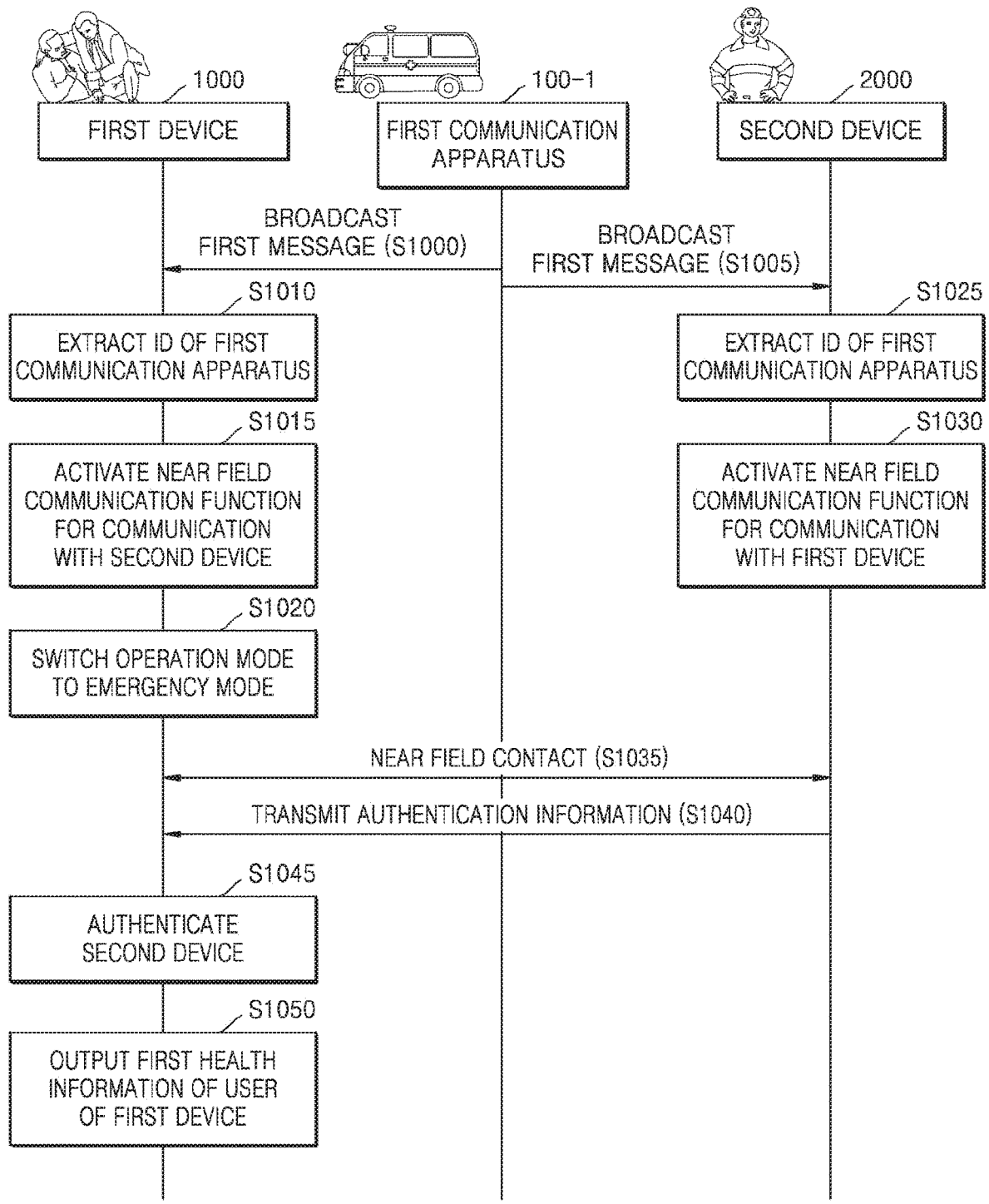
FIG. 10 is a flowchart of a method, performed by a first device, of authenticating a second device located within a communication range of a first communication apparatus and outputting first health information, according to some embodiments.

FIG. 10 is a flowchart of a method, performed by the first device 1000, of authenticating the second device 2000 located within a communication range of the first communication apparatus 100-1 and outputting first health information according to some embodiments.

In operations S1000 and S1005, the first communication apparatus 100-1 may broadcast a first message. The first message may include, for example, identification information (e.g., ID) of the first communication apparatus 100-1, a session key, and a random number value.

In operation S1010, the first device 1000 may extract the ID of the first communication apparatus 100-1 from the first message. The first device 1000 may identify the ID of the first communication apparatus 100-1 from data included in the first message and extract the identified ID of the first communication apparatus 100-1.

In operation S1015, the first device 1000 may activate a communication function for near field communication with the second device 2000. The first device 1000 may activate a near field communication function for near field communication with the second device 2000 since the ID of the first communication apparatus 100-1 is extracted from the first message. For example, the first device 1000 may activate a NFC communication function. In this case, the first device 1000 may previously set conditions for activating the near field communication function, for example, the ID of the communication apparatus 100 to be extracted to activate the near field communication function.

In operation S1020, the first device 1000 may switch an operation mode of the first device 1000 to an emergency mode. The emergency mode may be an operational mode for the first device 1000 to provide information necessary to rescue a user of the first device 1000. In the emergency mode, the first device 1000 may authenticate the second device 2000 or the third device 3000 according to a predetermined rule and provide health information of the first device 1000.

In operation S1025, the second device 2000 may extract the ID of the first communication apparatus 100-1 from the first message. In operation S1030, the second device 2000 may activate the communication function for near field communication with the second device 2000. Since the second device 2000 extracts the ID of the communication apparatus 100 from the first message, the second device 2000 may activate, for example, the NFC communication function. In this case, the second device 2000 may previously set conditions for activating the near field communication function, for example, the ID of the communication apparatus 100 to be extracted to activate the near field communication function.

In operation S1035, the first device 1000 and the second device 2000 may be in close contact with each other. For example, since the second device 2000 having the activated NFC function is tagged with the first device 1000 having the activated NFC function, the first device 1000 and the second device 2000 may be connected to each other through NFC communication.

In operation S1040, the second device 2000 may transmit authentication information of the second device 2000 to the first device 1000. The second device 2000 may transmit the authentication information, for example, including the random number value extracted from the first message and the ID of the user of the second device 2000 to the second device 2000 through NFC communication. Alternatively, for example, the second device 2000 may transmit the authentication information including the random number extracted from the first message, the session key extracted from the first message, and the ID of the user of the second device 2000 to the second device 2000 through NFC communication.

In operation S1045, the first device 1000 may authenticate the second device 2000. The first device 1000 may directly authenticate the second device 2000 or authenticate the second device 2000 through the communication apparatus 100 or the authentication server 200. In this regard, authenticating the second device 2000 may mean authenticating the second device 2000 or the user of the second device 2000.

In operation S1050, the first device 1000 may output the first health information of the user of the first device 1000. Since the second device 2000 is authenticated, the first device 1000 may display the first health information of the user of the first device 1000 on a screen of the first device 1000. The first health information may be information necessary for an emergency rescue, for example, information about specificity of a user's body, information about a current disease of the user, and a type of the first health information.

Figure 11:
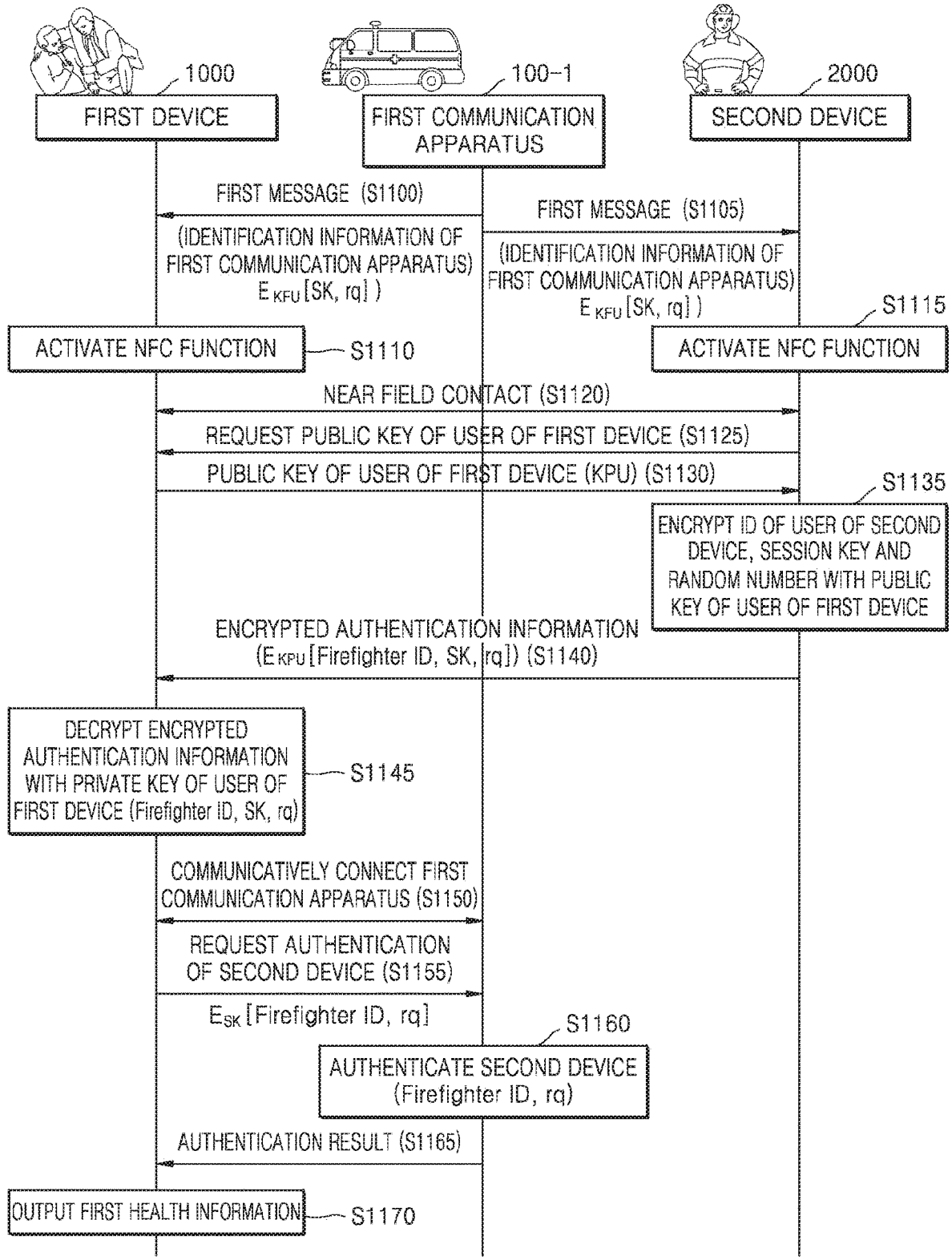
FIG. 11 is a detailed flowchart of a method, performed by a first device, of authenticating a second device, according to some embodiments.

FIG. 11 is a detailed flowchart of a method performed by the first device 1000 of authenticating the second device 2000 according to some embodiments. In FIG. 11, a user of the first device 1000 may be a patient, and a user of the second device 2000 may be a firefighter.

In operations S1100 and S1105, the first communication apparatus 100-1 may broadcast a first message. The first message may include identification information of the first communication apparatus 100-1, a session key, and a random number value. For example, the first message may include a session key SK encrypted by a public key KFU of the user of the second device 2000, a random number value rq, and an ID of the first communication apparatus 100-1.

Also, the first communication apparatus 100-1 may previously register an ID (e.g., Firefighter ID) of the user of the second device 2000, match the registered ID with the session key SK and the random number rq included in the first message, and store matching information in a DB (not shown) connected to the first communication apparatus 100-1. The matching information stored in the DB (not shown) may be used for authenticating the second device 2000 in the future.

In operation S1110, the first device 1000 may activate a NFC function. The first device 1000 may activate the NFC function by extracting the ID of the first communication apparatus 100-1 from the first message and identifying the extracted ID.

In operation S1115, the second device 2000 may activate the NFC function. The second device 2000 may activate the NFC function by extracting the ID of the first communication apparatus 100-1 from the first message and identifying the extracted ID.

In operation S1120, the first device 1000 and the second device 2000 may be in close contact with each other. For example, since the second device 2000 having the activated NFC function is tagged with the first device 1000 having the activated NFC function, the first device 1000 and the second device 2000 may communicate data with each other through NFC communication.

In operation S1125, the second device 2000 may request the public key KPU of the user of the first device 1000 from the first device 1000. When the second device 2000 extracts the ID of the first communication apparatus 100-1 and is in close contact with the first device 1000, the second device 2000 may request the public key KPU of the user of the first device 1000 from the first device 1000 according to a predetermined rule.

In operation S1130, the first device 1000 may transmit the public key KPU of the user of the first device 1000 to the second device 2000. When the first device 1000 extracts the ID of the first communication apparatus 100-1 and is in close contact with the second device 2000 and receives a signal for requesting the public key KPU of the user of the first device 1000 from the second device 2000, the first device 1000 may transmit the public key KPU of the user of the first device 1000 to the second device 2000 according to a predetermined rule. Also, for example, operations S1125 and S1130 may be performed through one tagging, but are not limited thereto.

In operation S1135, the second device 2000 may encrypt the ID of the user of the second device 2000, the session key SK and the random number rq with the public key KPU of the user of the first device 1000. The second device 2000 may obtain the session key SK and the random number rq by decrypting the session key SK and the random number rq that are included in the first message and encrypted by the public key KFU of the user of the second device 2000 using a private key KFR of the user of the second device 2000.

The second device 2000 may also generate encrypted authentication information for authenticating the second device 2000 by encrypting the ID of the user of the second device 2000, the session key SK and the random number rq with the public key KPU of the user of the first device 1000 received from the first device 1000.

In operation S1140, the second device 2000 may transmit the encrypted authentication information to the first device 1000. The second device 2000 may transmit the ID of the user of the second device 2000, the session key SK and the random number rq that are encrypted with the public key KPU of the user of the first device 1000 to the first device 1000 through NFC communication.

In operation S1145, the first device 1000 may decrypt the encrypted authentication information with the private key KPR of the user of the first device 1000. The first device 1000 may obtain the ID, the session key SK and the random number rq of the user of the second device 2000 by decrypting the encrypted authentication information.

In operation S1150, the first device 1000 may be communicatively connected to the first communication apparatus 100-1. The first device 1000 may pair with the first communication apparatus 100-1 and transmit/receive data to/from the first communication apparatus 100-1 through bidirectional communication. The first device 1000 may be communicatively connected to the first communication apparatus 100-1 through near field communication. For example, the first device 1000 may be connected to the first communication apparatus 100-1 through BLE communication, but is not limited thereto.

The first device 1000 may also activate a near field communication function for receiving a first message from the first communication apparatus 100-1, a near field communication function for communicating with the second device 2000, and a communication function for bidirectional communication with the first communication apparatus 100-1. Accordingly, the first device 1000 may transmit/receive data to/from the first communication apparatus 100-1 and the second device 2000 through communication methods respectively corresponding to the first communication apparatus 100-1 and the second device 2000.

In operation S1155, the first device 1000 may request authentication of the second device 2000 from the first communication apparatus 100-1. The first device 1000 may encrypt the ID of the user of the second device 2000 and the random number rq obtained in operation S1145 with the session key SK obtained in operation S1145. Also, the first device 1000 may transmit the ID of the user of the second device 2000 and the random number rq encrypted by the session key SK to the first communication apparatus 100-1.

In operation S1160, the first communication apparatus 100-1 may authenticate the second device 2000. The first communication apparatus 100-1 may decrypt the encrypted ID of the user of the second device 2000 and random number rq received from the first device 1000 with the session key SK stored in the first communication apparatus 100-1. The session key SK stored in the first communication apparatus 100-1 may be the session key SK included in the first message when the first communication apparatus 100-1 generates the first message.

Also, the first communication apparatus 100-1 may authenticate the second device 2000 using the ID of the user of the second device 2000 and the random number rq obtained through decryption described above. For example, the first communication apparatus 100-1 may authenticate the second device 2000 by comparing the ID of the user of the second device 2000 and the random number rq obtained through the decryption with the ID and the random number value rq that are previously stored in a DB (not shown) connected to the first communication apparatus 100-1. In this case, the ID and the random number rq used for comparison described above may be the ID of the user of the second device 2000 and the random number rq that are matched and stored in operation S1100 and operation S1105.

In operation S1165, the first communication apparatus 100-1 may transmit an authentication result of the second device 2000 to the first device 1000. In operation S1170, the first device 1000 may output first health information of the user of the first device 1000. The first device 1000 may display the first health information on a screen of the first device 1000 since the authentication result indicating that the second device 2000 is authenticated is received.

Figure 12:
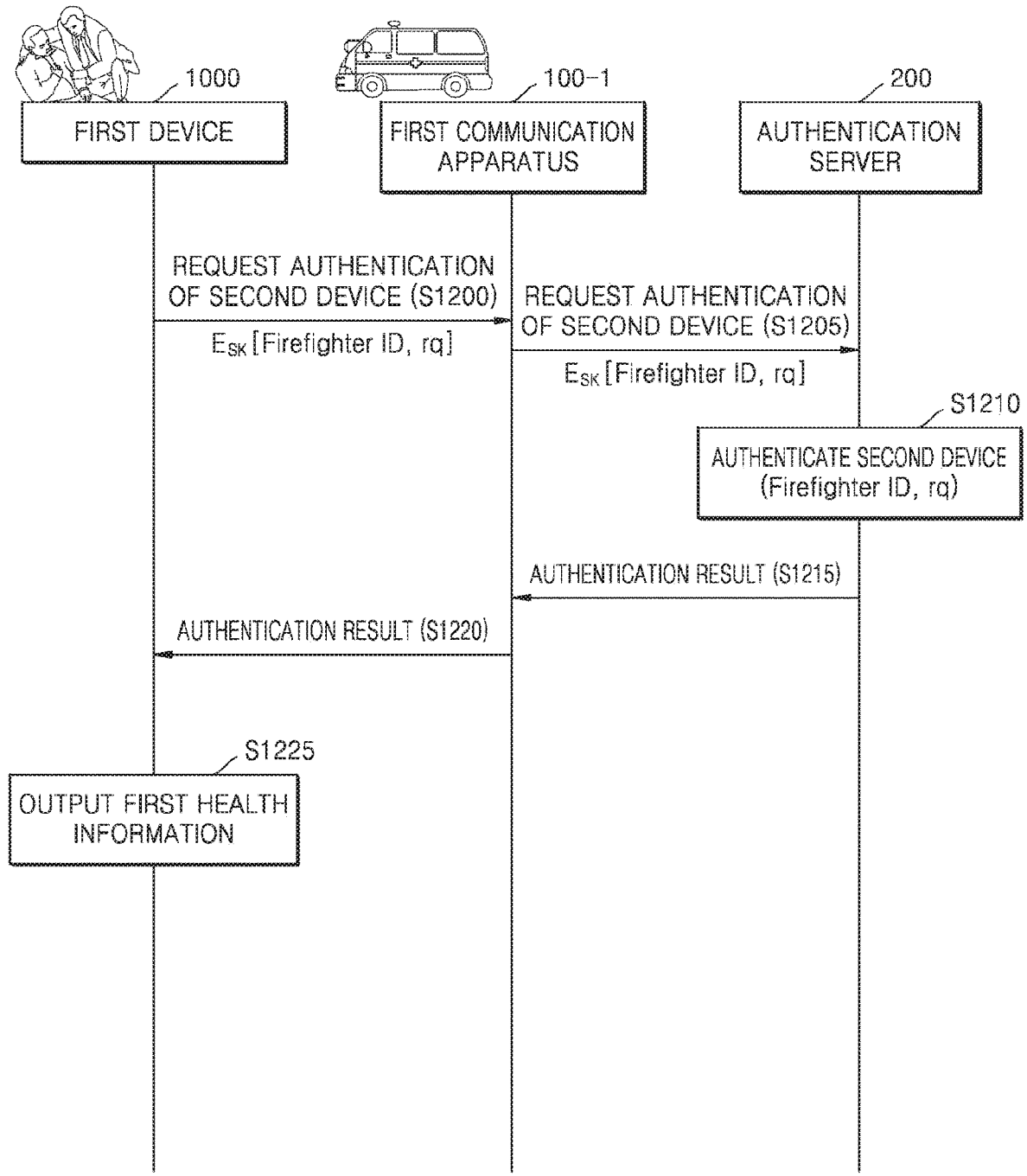
FIG. 12 is a flowchart of a method, performed by a first device, of requesting an authentication server to authenticate a second device via a first communication apparatus, according to some embodiments.

FIG. 12 is a flowchart of a method, performed by the first device 1000, of requesting the authentication server 200 to authenticate the second device 2000 via the first communication apparatus 100-1 according to some embodiments.

In operation S1200, the first device 1000 may request authentication of the second device 2000 from the first communication apparatus 100-1. The first device 1000 may transmit an ID (e.g., Firefighter ID) of a user of the second device 2000 and the random number value rq encrypted by the session key SK to the first communication apparatus 100-1.

In operation S1205, the first communication apparatus 100-1 may request the authentication server 200 to authenticate the second device 2000. The first communication apparatus 100-1 may transmit the ID of the user of the second device 2000 and the random number rq encrypted by the session key SK to the authentication server 200.

In operation S1210, the authentication server 200 may authenticate the second device 2000. The authentication server 200 may decrypt the encrypted ID of the user of the second device 2000 and random number rq received from the first communication apparatus 100-1 with the session key SK stored in a DB (not shown) of the authentication server 200. The session key SK stored in the DB (not shown) of the authentication server 200 may be the session key SK included in a first message when the first communication apparatus 100-1 generates the first message.

Also, the authentication server 200 may authenticate the second device 2000 using the ID of the user of the second device 2000 and the random number rq obtained through decryption described above. For example, the authentication server 200 may authenticate the second device 2000 by comparing the ID of the user of the second device 2000 and the random number rq obtained through the decryption with the ID and the random number value rq that are previously stored in the DB (not shown) of the authentication server 200.

In this case, the first communication apparatus 100-1 may match the ID of the user of the second device 2000, the session key SK, and the random number rq and previously store the matched ID, the matched session key SK and the matched random number rq in the DB (not shown) of the authentication server 200 when generating the first message. Also, the authentication server 200 may authenticate the second device 2000 using authentication information received from the first communication apparatus 100-1 and previously stored matched values.

In operation S1215, the authentication server 200 may transmit an authentication result of the second device 2000 to the first communication apparatus 100-1. In operation S1220, the first communication apparatus 100-1 may transmit the authentication result of the second device 2000 to the first device 1000.

In operation S1225, the first device 1000 may output first health information of a user of the first device 1000. The first device 1000 may display the first health information on a screen of the first device 1000 since the authentication result indicating that the second device 2000 is authenticated is received.

Figure 13:
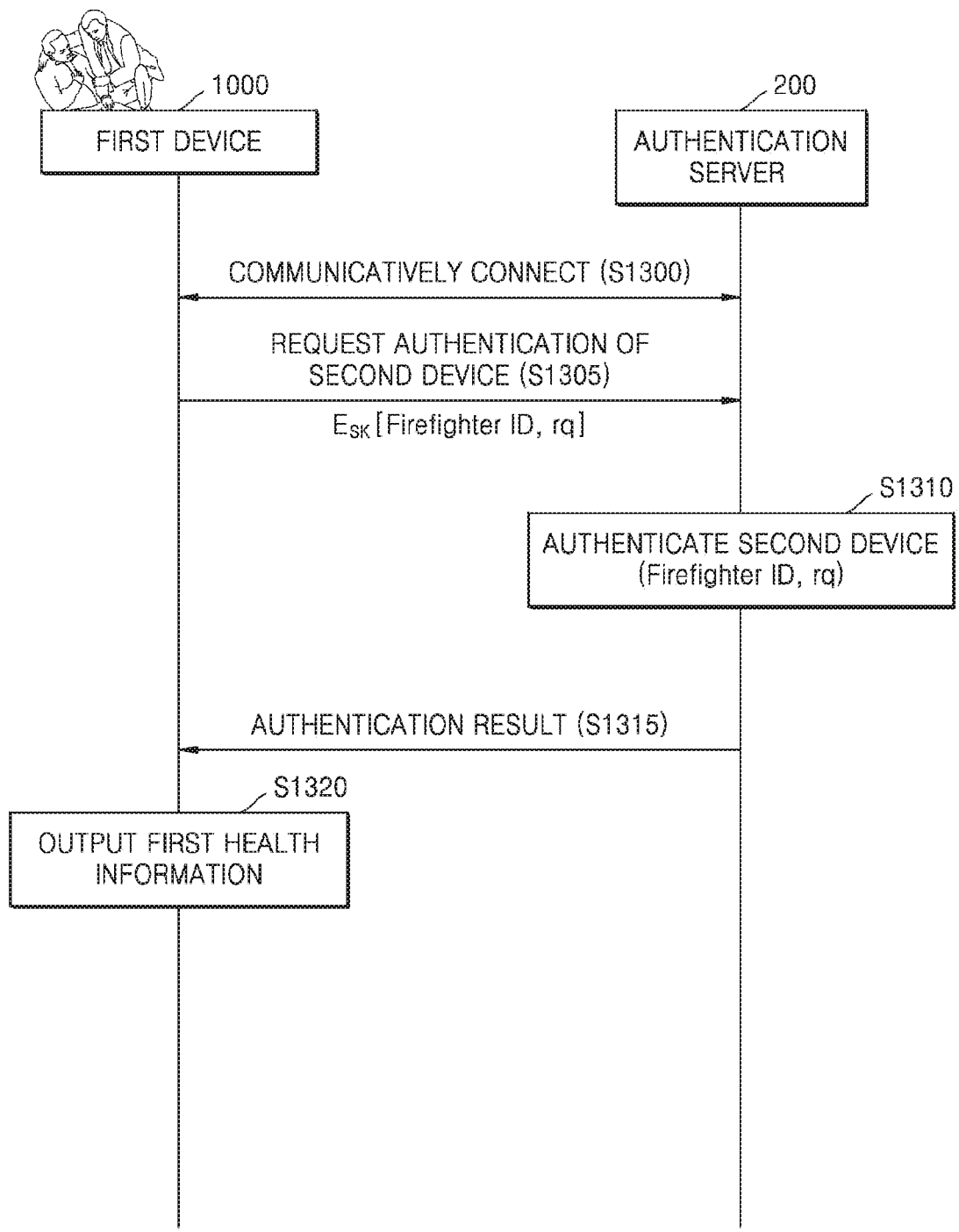
FIG. 13 is a flowchart of a method, performed by a first device, of directly requesting an authentication server to authenticate a second device, according to some embodiments.

FIG. 13 is a flowchart of a method, performed by the first device 1000, of directly requesting the authentication server 200 to authenticate the second device 2000 according to some embodiments.

In operation S1300, the first device 1000 may be communicatively connected to the authentication server 200. The first device 1000 may be connected to the authentication server 200 and may transmit and receive data through bidirectional communication. For example, the first device 1000 may be connected to the authentication server 200 through IP communication, but is not limited thereto. Also, the first device 1000 may transmit and receive the data to and from the authentication server 200 through various communication protocols, for example, HTTP and FTP. The first device 1000 may also activate a near field communication function for receiving a first message from the first communication apparatus 100-1, a near field communication function for receiving authentication information from the second device 2000, and a communication function for bidirectional communication with the authentication server 200. Accordingly, the first device 1000 may transmit and receive the data to and from the first communication apparatus 100-1, the second device 2000, and the authentication server 200 through communication methods respectively corresponding to the first communication apparatus 100-1, the second device 2000, and the authentication server 200. Address information for accessing the authentication server 200 may be previously stored in the first device 1000 or included in the first message received from the first communication apparatus 100-1.

In operation S1305, the first device 1000 may directly request the authentication server 200 to authenticate the second device 2000. The first device 1000 may transmit an ID (e.g., Firefighter ID) of a user of the second device 2000 and the random number value rq encrypted by the session key SK to the authentication server 200.

In operation S1310, the authentication server 200 may authenticate the second device 2000. The authentication server 200 may decrypt the encrypted ID of the user of the encrypted second device 2000 and random number rq received from the first device 1000 with the session key SK stored in a DB (not shown) of the authentication server 200.

Also, the authentication server 200 may authenticate the second device 2000 using the ID of the user of the second device 2000 and the random number rq obtained through decryption described above.

In operation S1315, the authentication server 200 may transmit an authentication result of the second device 2000 to the first device 1000. In operation S1320, the first device 1000 may output first health information of the user of the first device 1000.

Figure 14:
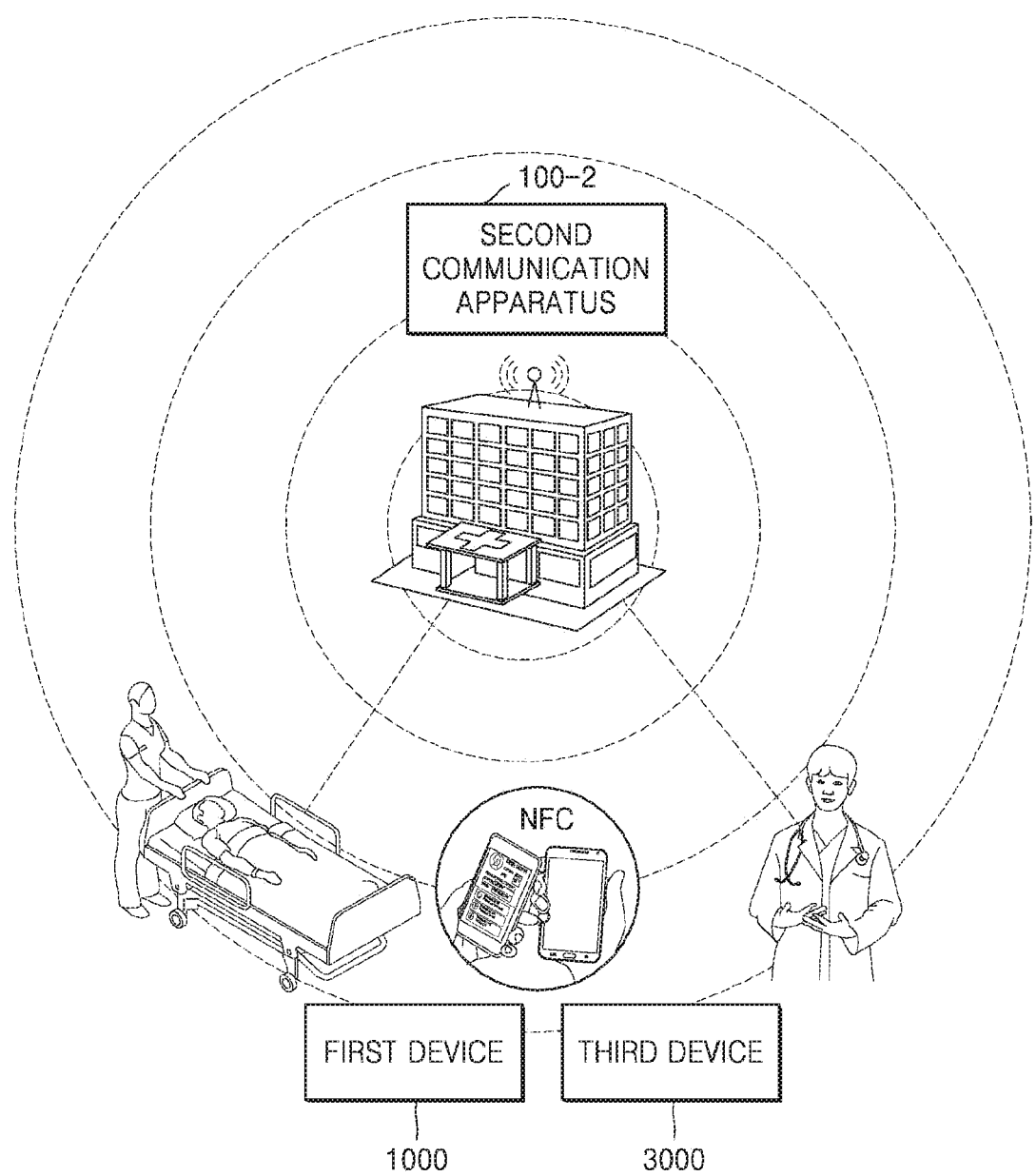
FIG. 14 is a diagram of an example in which, when a user of a first device is in an emergency state, the first device authenticates a third device located within a communication range of a second communication apparatus and outputs second health information, according to some embodiments.

FIG. 14 is a diagram of an example in which when a user of the first device 1000 is in an emergency state, the first device 1000 authenticates the third device 3000 located within a communication range of the second communication apparatus 100-2 and outputs second health information according to some embodiments. The second communication apparatus 100-2 may be installed in a hospital, and the third device 3000 may be a device of a doctor.

Referring to FIG. 14, when the user of the first device 1000 boarding an ambulance arrives at the hospital, the first device 1000 and the third device 3000 may be located in a near filed communication range of the second communication apparatus 100-2 installed in the hospital. The first device 1000 and the third device 3000 may be in close contact within the near filed communication range of the second communication apparatus 100-2 and the first device 1000 may receive identification information including an ID of the doctor who is a user of the third device 3000 from the third device 3000. The first device 1000 may then authenticate the third device 3000 and display the second health information on a screen of the first device 1000. The first health information may be information required by the doctor to treat the user of the first device 1000, for example, information about a medical record of the user of the first device 1000.

Figure 15:
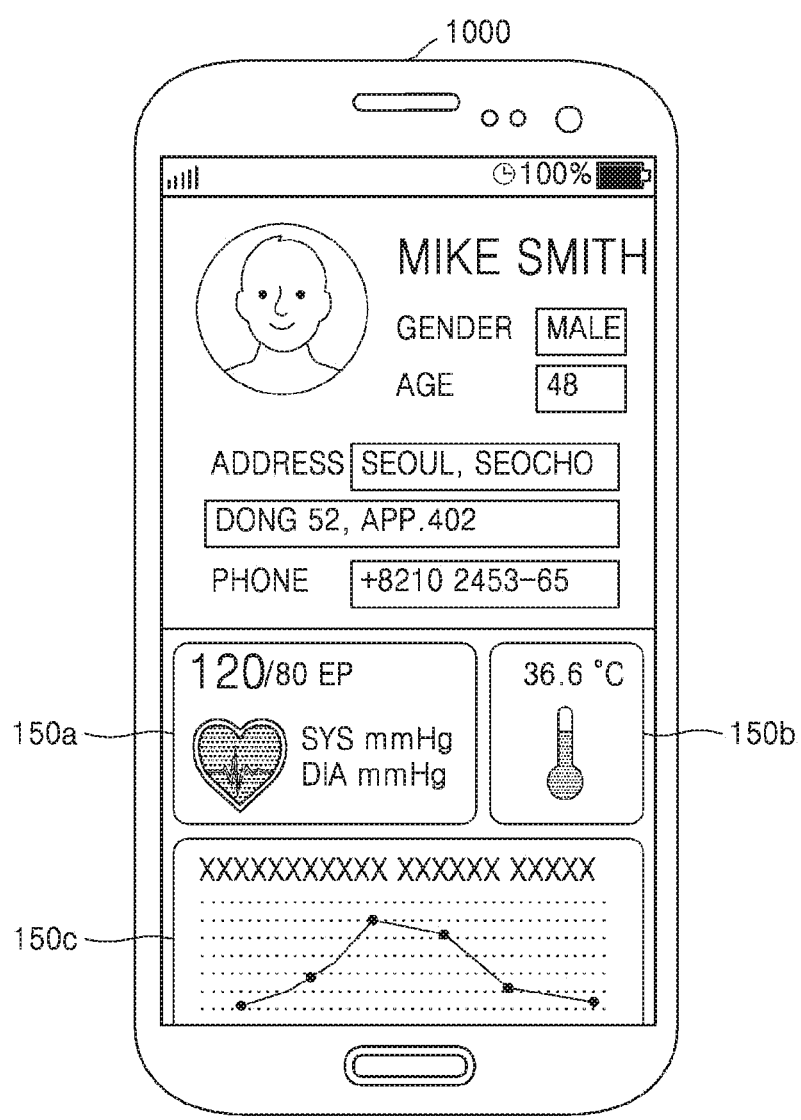
FIG. 15 is a diagram showing an example of second health information according to some embodiments.

FIG. 15 is a diagram showing an example of second health information according to some embodiments.

Referring to FIG. 15, the second health information of a user of the first device 1000 may be information necessary for a doctor to perform an emergency operation on the user of the first device 1000.

The second health information may include biometric information detected from the user of the first device 1000. In this case, the first device 1000 may obtain the biometric information from the first device 1000, a wearable device 10 worn by the user of the first device 1000, and a biometric chip 20 inserted into a user's body of the first device 1000.

For example, the second health information may include pulse information 150*a* of the user of the first device 1000 and body temperature information 150*b*. Also, the second health information may include, for example, data 150*c* in which the body temperature information 150*b* of the user of the first device 1000 is cumulatively recorded. In this case, the pulse information 150*a* and the body temperature information 150*b* of the user of the first device 1000 may be obtained from the wearable device 10 worn by the user of the first device 1000 or the biometric chip 20 inserted into the user's body.

On the other hand, although not shown in FIG. 15, the second health information may include a medical record of the user of the first device 1000. In this case, the first device 1000 may request data about the medical record of the user of the first device 1000 from a medical information providing server 400 that will be described later and receive the data about the medical record from the medical information providing server 400. The medical information providing server 400 may be a server storing and providing medical records of a user and may include, for example, a cloud server, an EMR (Electronic Medical Record) server, a medical institution server, and a PHR (Personal Health Record) server but is not limited thereto. Also, the medical information providing server 400 may be a server that combines and manages medical information of users collected from a plurality of medical institutions, but is not limited thereto.

Also, information included in the second health information is not limited to the embodiment shown in FIG. 15, and various types of information necessary for performing an emergency action to the user may be included in the second health information.

Figure 16:
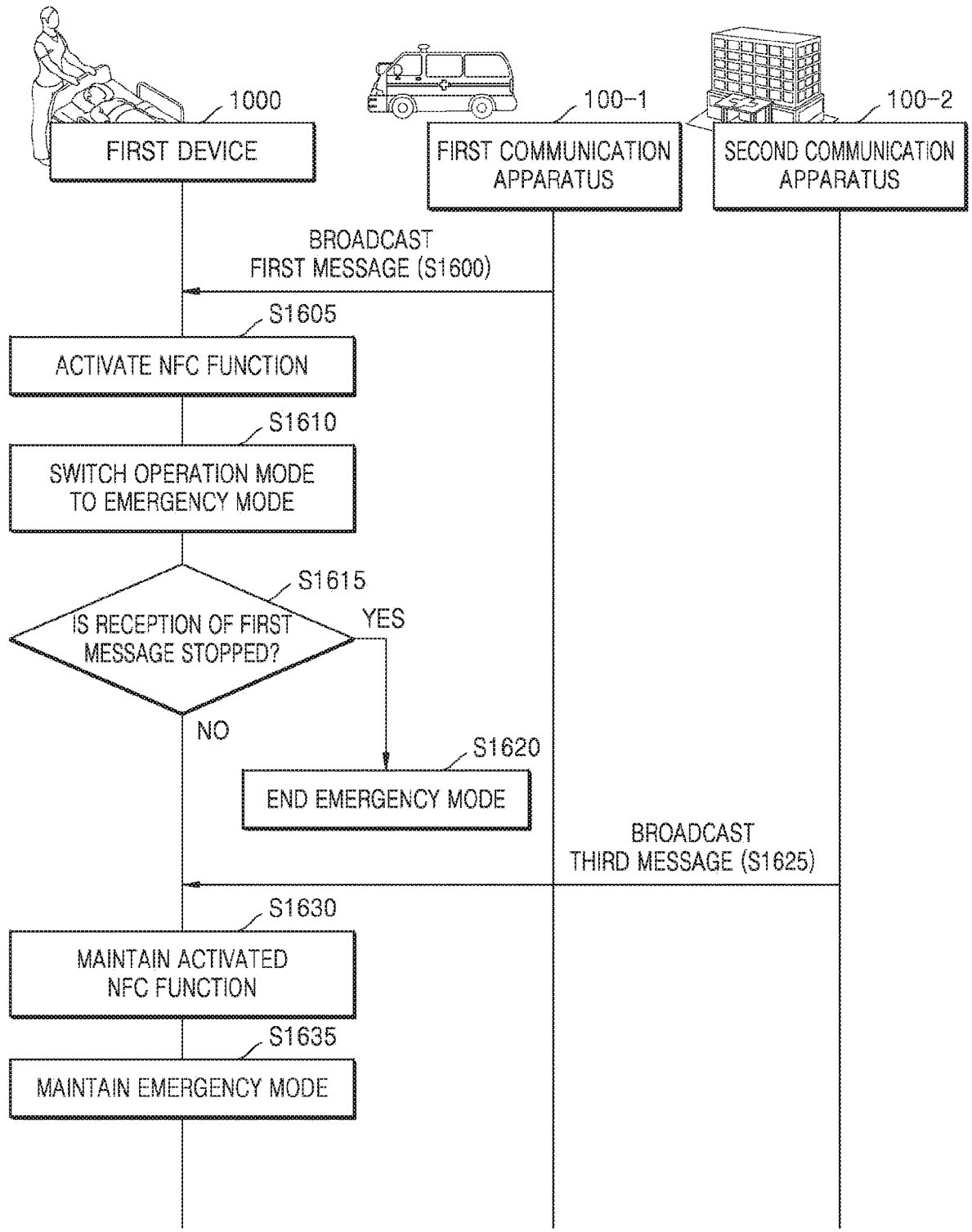
FIG. 16 is a flowchart of a method of maintaining an emergency mode as a first device is included in a communication range of a second communication apparatus.

FIG. 16 is a flowchart of a method of maintaining an emergency mode since the first device 1000 is included in a communication range of the second communication apparatus 100-2.

In operation S1600, the first communication apparatus 100-1 may broadcast a first message to the first device 1000. The first communication apparatus 100-1 may continuously broadcast the first message or broadcast the first message repeatedly at a predetermined period. In operation S1605, the first device 1000 may activate a NFC communication function. The first device 1000 may activate the NFC communication function by extracting and identifying identification information of the first communication apparatus 100-1 from the first message. Thereafter, in operation S1610, the first communication apparatus 100-1 may switch an operation mode of the first communication apparatus 100-1 to an emergency mode.

In operation S1615, the first device 1000 may determine whether a reception of the first message is stopped. The first device 1000 may determine that the reception of the first message is stopped when the first message is not received for more than a predetermined time. The predetermined time used for determining whether the reception of the first message is stopped may be previously set in the first device 1000. Alternatively, data indicating the predetermined time used for determining whether the reception of the first message is stopped may be included in the first message, and the first device 1000 may extract and identify the data indicating the predetermined time included in the first message from the first message.

When it is determined in operation S1615 that the reception of the first message is stopped, in operation S1620, the first device 1000 may end the emergency mode. The first device 1000 may deactivate the activated NFC communication function and switch an operation mode of the first device 1000 from the emergency mode to a normal mode.

In operation S1625, the second communication apparatus 100-2 may broadcast a third message. Also, the first device 1000 may receive the third message broadcast from the second communication apparatus 100-2. The first device 1000 may identify identification information of the second communication apparatus 100-2 included in the third message.

In operation S1630, the first device 1000 may maintain the activated NFC function, and in operation S1635, the first device 1000 may maintain the emergency mode. The first device 1000 may determine that the third message is received while the first message is being received based on the identification information of the second communication apparatus 100-2 included in the third message, and maintain the activated NFC function and the emergency mode.

Figure 17:
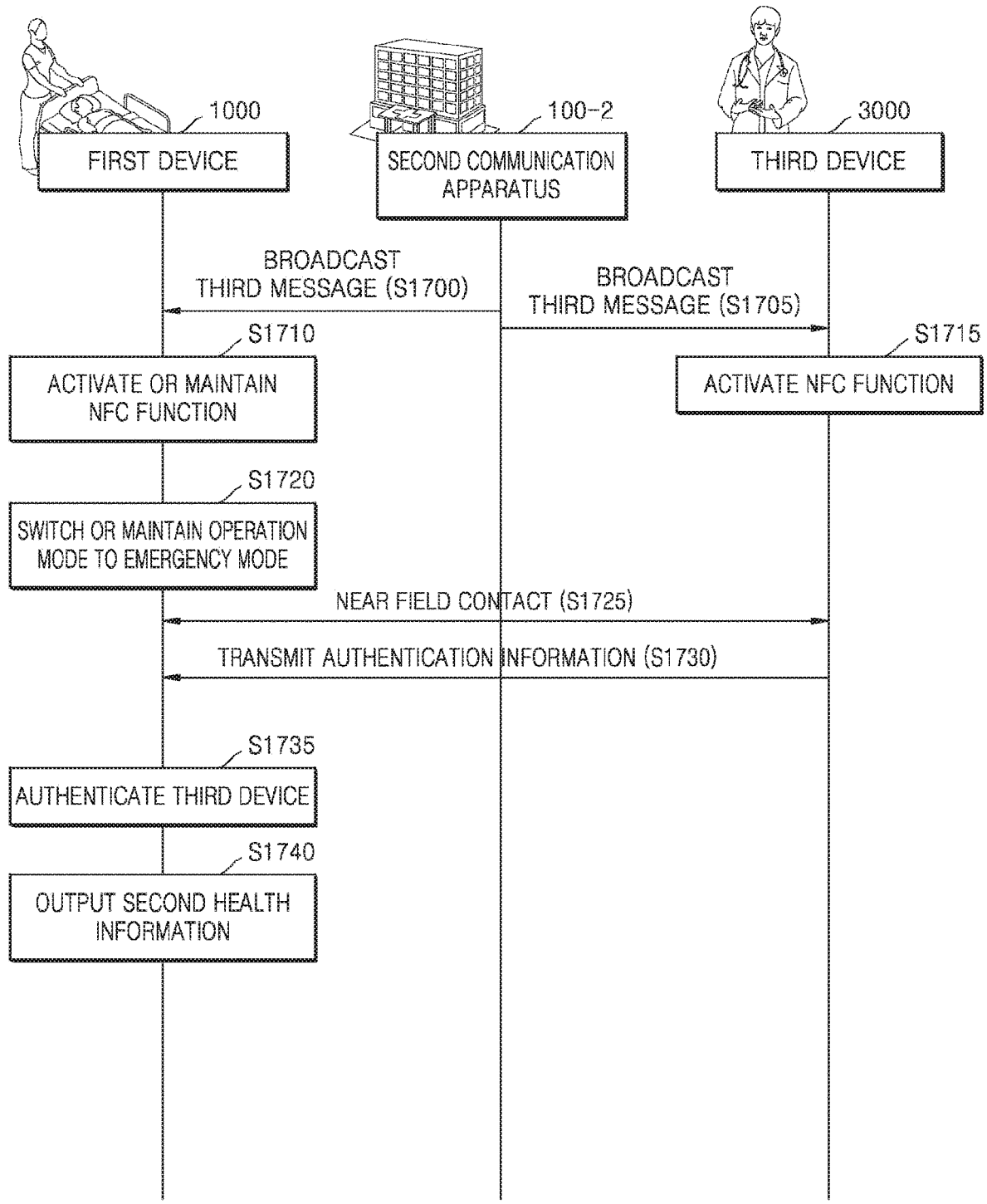
FIG. 17 is a flowchart of a method, performed by a first device, of authenticating a third device located within a communication range of a second communication apparatus and outputting second health information, according to some embodiments.

FIG. 17 is a flowchart of a method, performed by the first device 1000, authenticating the third device 3000 located within a communication range of the second communication apparatus 100-2 and outputting second health information according to some embodiments.

In operations S1700 and S1705, the second communication apparatus 100-2 may broadcast a third message. The third message may, for example, include identification information of the second communication device 100-2, a session key, and a random number value. The identification information of the second communication apparatus 100-2 may be used by the first device 1000 to maintain or activate a near field communication function and the identification information of the second communication apparatus 100-2 may be used by the third device 3000 to activate the near field communication function. Also, the third message may be used to determine an operation mode the first device 1000 operates. The session key may also be used by the first device 1000 to transmit and receive data to and from the authentication server 200 to authenticate the third device 3000 and the data transmitted and received between the first device 1000 and the authentication server 200 may be encrypted by the session key. Also, the random number value may be provided from the first device 1000 to the authentication server 200, and may be used to authenticate the third device 3000.

In operation S1710, the first device 1000 may activate or maintain a NFC communication function for communication with the third device 3000. The first device 1000 may extract the identification information of the second communication apparatus 100-2 from the third message received from the second communication apparatus 100-2 and, since the identification information of the second communication apparatus 100-2 is extracted, may activate the NFC communication function for near field communication with the third device 3000 or maintain the already activated NFC communication function.

In operation S1715, the third device 3000 may activate the NFC communication function for communication with the second device 2000. The third device 3000 may extract the identification information of the second communication apparatus 100-2 from the third message received from the second communication apparatus 100-2, since the identification information of the second communication apparatus 100-2 is extracted, may activate the NFC communication function for near field communication with the first device 1000.

In operation S1720, the first device 1000 may switch an operation mode of the first device 1000 to an emergency mode, or may maintain the emergency mode when already operating in the emergency mode. The first device 1000 may switch the operation mode of the first device 100 to the emergency mode or maintain the emergency mode based on the extracted identification information of the second communication apparatus 100-2.

In operation S1725, the first device 1000 may be in near field contact with the third device 3000. The first device 1000 in which the near field communication function is activated and the third device 3000 in which the near field communication function is activated may be close to each other and, since the first device 1000 and the third device 3000 are close to each other, the first device 1000 and the second device 2000 may transmit and receive data with each other.

In operation S1730, the second device 2000 may provide authentication information for authentication of the third device 3000 to the first device 1000. The third device 3000 may extract the random number value included in the third message and generate the authentication information including the extracted random number value and identification information of a user of the third device 3000. Also, the third device 3000 may transmit the generated authentication information to the first device 1000 through near field communication.

In operation S1735, the first device 1000 may authenticate the third device 3000. The first device 1000 may authenticate the third device 3000 using the random number value in the authentication information received from the third device 3000 and the identification information of the user of the third device 3000. The first device 1000 may request the authentication server 200 to authenticate the third device 3000.

In operation S1740, the first device 1000 may output the second health information of a user of the first device 1000. Since the third device 3000 is authenticated, the first device 1000 may display the second health information of the user of the first device 1000 on a screen of the first device 1000. The second health information may be information necessary for a doctor to perform an emergency operation on the user of the first device 1000. The second health information may include, for example, biometric information of the user of the first device 1000 and information indicating a medical record of the user of the first device 1000 and a type of the second health information.

Figure 18:
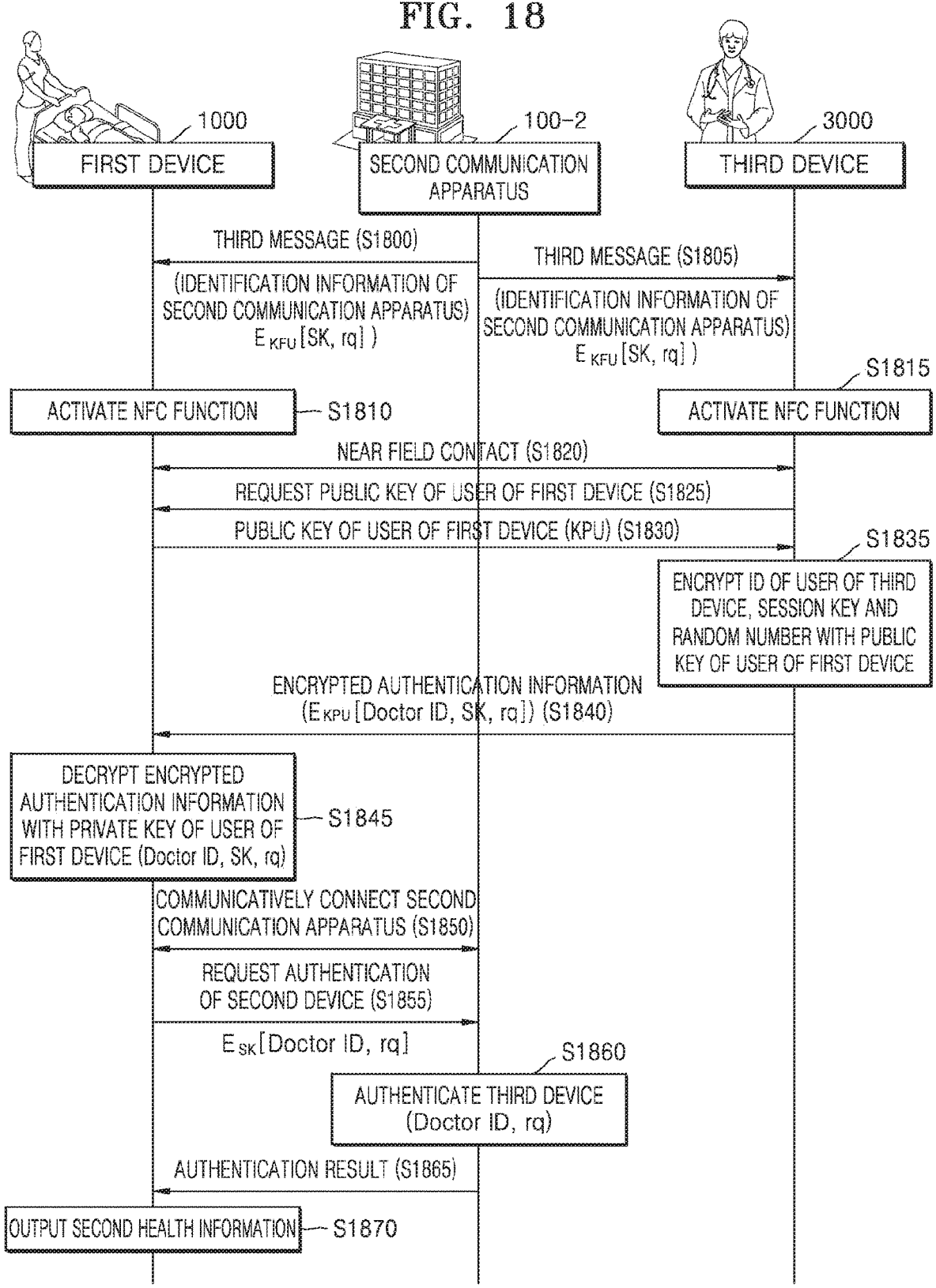
FIG. 18 is a flowchart of a method, performed by a first device, of authenticating a third device, according to some embodiments.

FIG. 18 is a flowchart of a method, performed by the first device 1000, of authenticating the third device 3000 according to some embodiments. In FIG. 18, a user of the first device 1000 is a patient, and a user of the second device 2000 may be a doctor.

In operations S1800 and S1805, the second communication apparatus 100-2 may broadcast a third message. The third message may include, for example, identification information of the second communication apparatus 100-2, the session key SK, and the random number rq. For example, the third message may include the session key SK and the random number value rq encrypted by a public key KDU of a user of the third device 3000 and an ID of the second communication apparatus 100-2.

Also, the second communication apparatus 100-2 may previously register an ID (e.g., Doctor ID) of the user of the third device 3000, match the registered ID and the session key SK and the random number rq included in the third message, and store the matched ID in a DB (not shown) connected to the second communication apparatus 100-2. Matching information stored in the DB (not shown) may be used to authenticate the third device 3000 in the future.

In operation S1810, the first device 1000 may activate a NFC function. The first device 1000 may activate the NFC function by extracting the ID of the second communication apparatus 100-2 from the third message and identifying the extracted ID.

In operation S1815, the third device 3000 may activate the NFC function. The third device 3000 may activate the NFC function by extracting the ID of the second communication apparatus 100-2 from the third message and identifying the extracted ID.

In operation S1820, the first device 1000 and the third device 3000 may be in near field contact with each other. For example, since the third device 3000 having the activated NFC function is tagged to the first device 1000 having the activated NFC function, the first device 1000 and the third device 3000 may transmit and receive data with each other through NFC communication.

In operation S1825, the third device 3000 may request the first device 1000 to request the public key KPU of the user of the first device 1000. When the ID of the second communication apparatus 100-2 is extracted and the third device 3000 is in near field contact with the first device 1000, the third device 3000 may request the public key KPU of the user of the first device 1000 from the first device 1000 according to a predetermined rule.

In operation S1830, the first device 1000 may transmit the public key KPU of the user of the first device 1000 to the third device 3000. When the ID of the second communication apparatus 100-2 is extracted, the first device 1000 is in near field contact with the third device 3000, and a signal for requesting the public key KPU of the user of the first device 1000 is received, the first device 1000 may transmit the public key KPU of the user of the first device 1000 to the third device 3000 according to a predetermined rule. Also, for example, operations S1825 and S1830 may be performed through one tagging.

In operation S1835, the third device 3000 may encrypt the ID of the user of the third device 3000, the session key SK and the random number rq with the public key KPU of the user of the first device 1000. The third device 3000 may obtain the session key SK and the random number rq by decrypting the session key SK and the random number rq included in the third message to the third device 3000 and encrypted by the public key KDU of the user of the third device 3000 using the private key KDR of the user of the third device 3000.

The third device 3000 may also generate encrypted authentication information for authenticating the third device 3000 by encrypting the ID of the user of the third device 3000, the session key SK and the random number rq with the public key KPU of the user of the first device 1000 received from the first device 1000.

In operation S1840, the third device 3000 may transmit the encrypted authentication information to the first device 1000. The third device 3000 may transmit the ID of the user of the third device 3000, the session key SK and the random number rq encrypted with the public key KPU of the user of the first device 1000 to the first device 1000 through NFC communication.

In operation S1845, the first device 1000 may decrypt the encrypted authentication information with the private key KPR of the user of the first device 1000. The first device 1000 may obtain the ID of the user of the third device 3000, the session key SK and the random number rq by decrypting the encrypted authentication information.

In operation S1850, the first device 1000 may be communicatively connected to the second communication apparatus 100-2. The first device 1000 may pair with the second communication apparatus 100-2 and transmit and receive data to and from the second communication apparatus 100-2 through bidirectional communication. The first device 1000 may be communicatively connected to the second communication apparatus 100-2 through near field communication. For example, the first device 1000 may be connected to the second communication apparatus 100-2 through BLE communication but is not limited thereto.

In operation S1855, the first device 1000 may request authentication of the third device 3000 from the second communication apparatus 100-2. The first device 1000 may encrypt the ID of the user of the third device 3000 and the random number rq obtained in operation S1845 with the session key SK obtained in operation S1845. The first device 1000 may also transmit the ID of the user of the third device 3000 and the random number rq encrypted by the session key SK to the second communication apparatus 100-2.

In operation S1860, the second communication apparatus 100-2 may authenticate the third device 3000. The second communication apparatus 100-2 may decrypt the encrypted ID of the user of the third device 3000 and random number rq received from the first device 1000 with the stored session key SK stored in the second communication apparatus 100-2. The session key SK stored in the second communication apparatus 100-2 may be the session key SK included in the third message when the second communication apparatus 100-2 generates the third message.

Also, the second communication apparatus 100-2 may authenticate the third device 3000 using the ID of the user of the third device 3000 and the random number rq obtained through decryption described above. For example, the second communication apparatus 100-2 may authenticate the third device 3000 by comparing the ID of the user of the third device 3000 and the random number rq obtained through decryption above with the ID and the random number value rq that are previously stored in a DB (not shown) connected to the second communication apparatus 100-2. In this case, the ID and the random number rq used for comparison described above may be the ID of the user of the third device 3000 and the random number rq that are matched and stored in operation S1800 and operation S1805.

In operation S1865, the second communication apparatus 100-2 may transmit an authentication result of the third device 3000 to the first device 1000. In operation S1870, the first device 1000 may output second health information of the user of the first device 1000. The first device 1000 may display the second health information on a screen of the first device 1000 since the authentication result indicating that the third device 3000 is authenticated is received.

In FIG. 18, it is described that the second communication apparatus 100-2 authenticates the third device 3000 in response to a request from the first device 1000, but is not limited thereto. The first device 1000 may directly authenticate the third device 3000 or the first device 1000 may request authentication of the third device 3000 from the authentication server 200 via the second communication apparatus 100-2.

Figure 19:
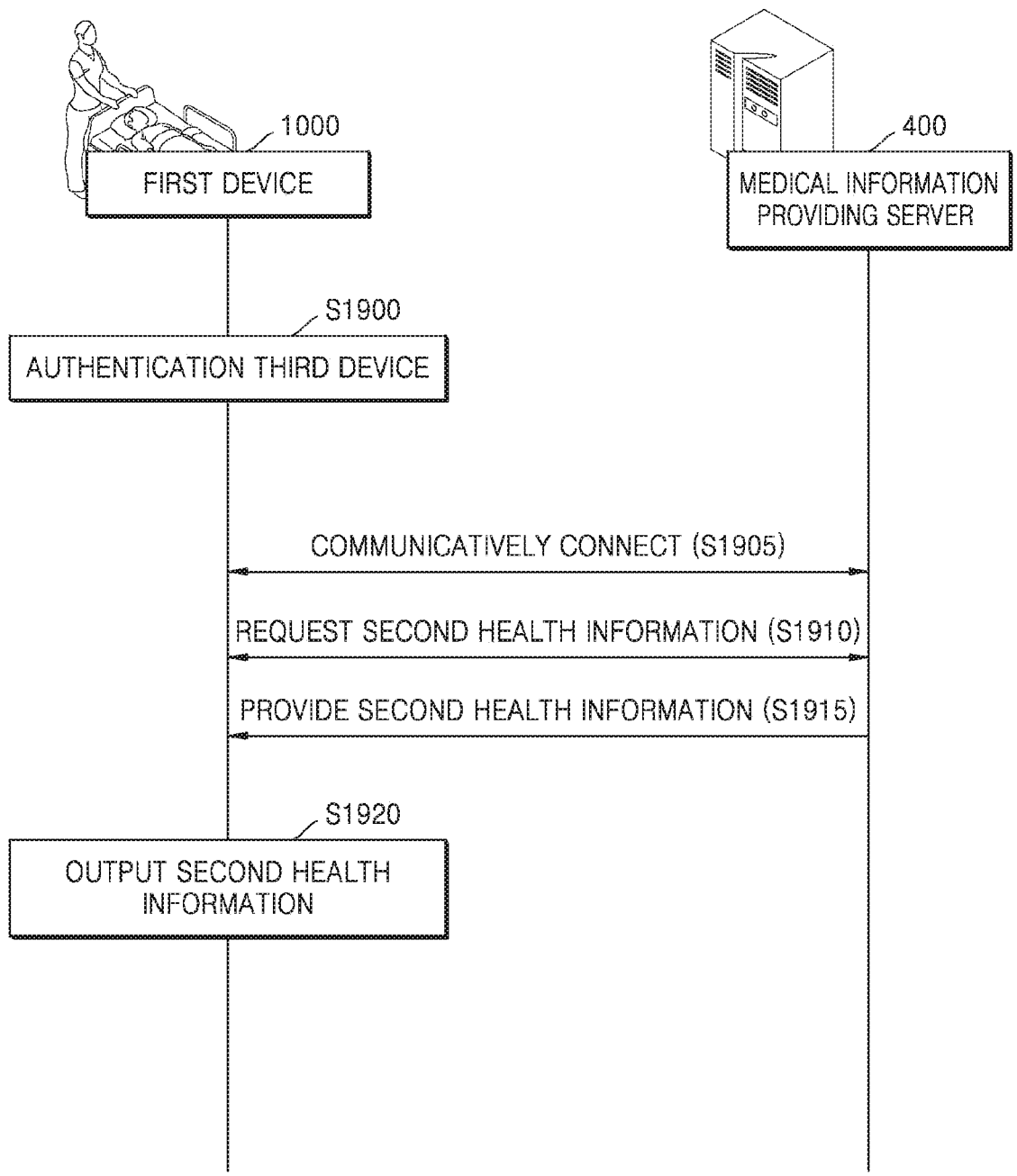
FIG. 19 is a flowchart of a method, performed by a first device, of obtaining second health information from a medical information providing server, according to some embodiments.

FIG. 19 is a flowchart of a method performed by the first device 1000 of obtaining second health information from a medical information providing server 400 according to some embodiments.

In operation S1900, the first device 1000 may authenticate the third device 3000. In operation S1905, the first device 1000 may be communicatively connected to the medical information providing server 400. The first device 1000 may be connected to the medical information providing server 400 and may transmit and receive data to and from the medical information providing server 400 through bidirectional communication. For example, the first device 1000 may be communicatively connected to the medical information providing server 400 through IP communication, but is not limited thereto. Also, the first device 1000 may transmit and receive data to and from the medical information providing server 400 through various communication protocols such as HTTP and FTP, for example.

In operation S1910, the first device 1000 may request the medical information providing server 400 for the second health information. In this case, the first device 1000 may request the medical information providing server 400 for the second health information while transmitting authentication information for authentication of the first device 1000 to the medical information providing server 400. The authentication information for authentication of the first device 1000 may include, for example, an ID of a user of the first device 1000 and a password, but is not limited thereto.

In operation S1915, the medical information providing server 400 may provide the first device 1000 with the second health information. The medical information providing server 400 may authenticate the first device 1000 and provide the first device 1000 with information about a medical record of the user of the first device 1000.

In operation S1920, the first device 1000 may display the second health information received from the medical information providing server 400 on a screen of the first device 1000.

Figure 20:
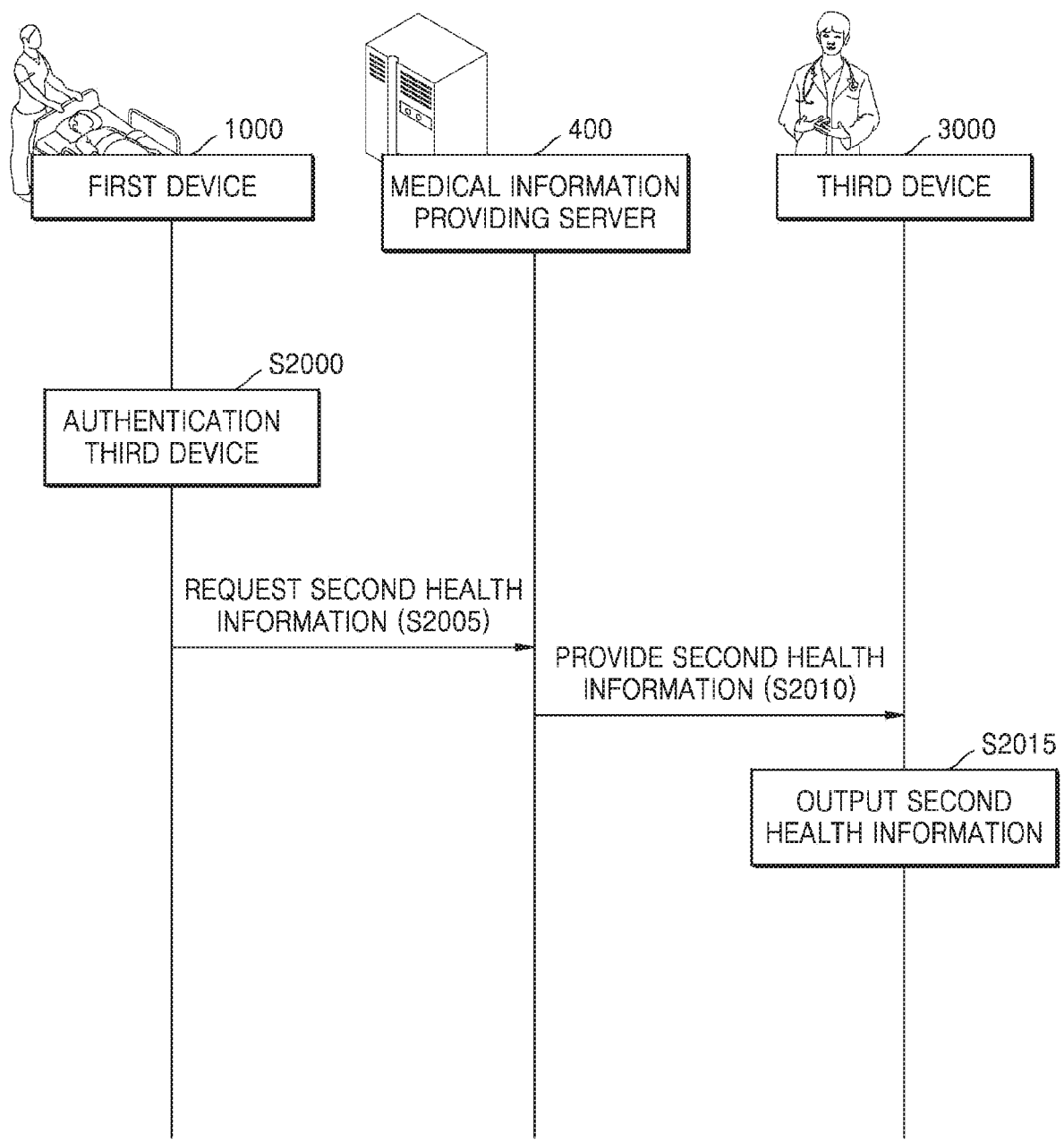
FIG. 20 is a flowchart of a method, performed by a medical information providing server, of providing second health information to a third device in response to a request from a first device, according to some embodiments.

FIG. 20 is a flowchart of a method performed by the medical information providing server 400 of providing second health information to the third device 3000 in response to a request from the first device 1000 according to some embodiments.

In operation S2000, the first device 1000 may authenticate the third device 3000. In operation S2005, the first device 1000 may request the medical information providing server 400 to provide the second health information to the third device 3000. In this case, the first device 1000 may transmit authentication information for authentication of the first device 1000 to the medical information providing server 400. The authentication information for authentication of the first device 1000 may include, for example, an ID of a user of the first device 1000 and a password, but is not limited thereto.

In operation S2010, the medical information providing server 400 may provide the third device 3000 with the second health information. The medical information providing server 400 may authenticate the first device 1000 and provide information about a medical record of the user of the first device 1000 to the third device 3000.

In operation S2015, the third device 3000 may display the second health information received from the medical information providing server 400 on a screen of the third device 3000.

Figure 21:
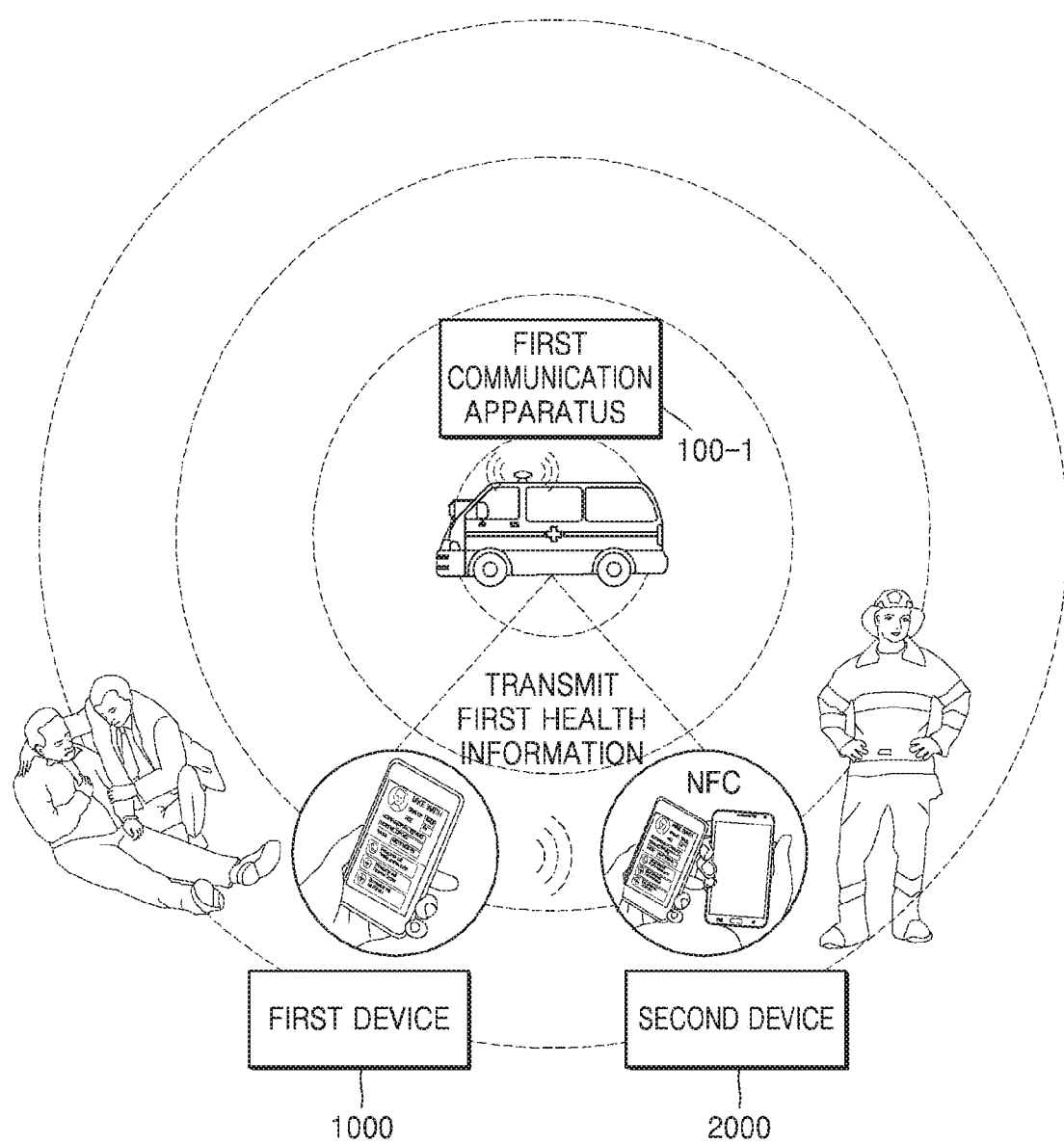
FIG. 21 is a diagram illustrating an example in which a first device transmits first health information to a second device, according to some embodiments.

FIG. 21 is a diagram illustrating an example in which the first device 1000 transmits first health information to the second device 2000 according to some embodiments.

Referring to FIG. 21, the first device 1000 and the second device 2000 may be located within a near field communication range of the first communication apparatus 100-1 and the first device 1000 may authenticate the second device 1000 2000 and provide the second device 2000 with the first health information. For example, the first device 1000 may transmit the first health information to the second device 2000 through NFC communication.

Alternatively, the first device 1000 may provide the first health information to the second device 2000 through another communication method. In this case, the first device 1000 and the second device 2000 may be communicatively connected to each other using a communication method other than NFC communication, and the first device 1000 may transmit the first health information stored in the first device 1000 to the second device 2000 using another communication method.

Alternatively, for example, the first device 1000 may transmit link information for downloading the first health information to the second device 2000 through NFC communication. In this case, the second device 2000 may download the first health information using the received link information.

Figure 22:
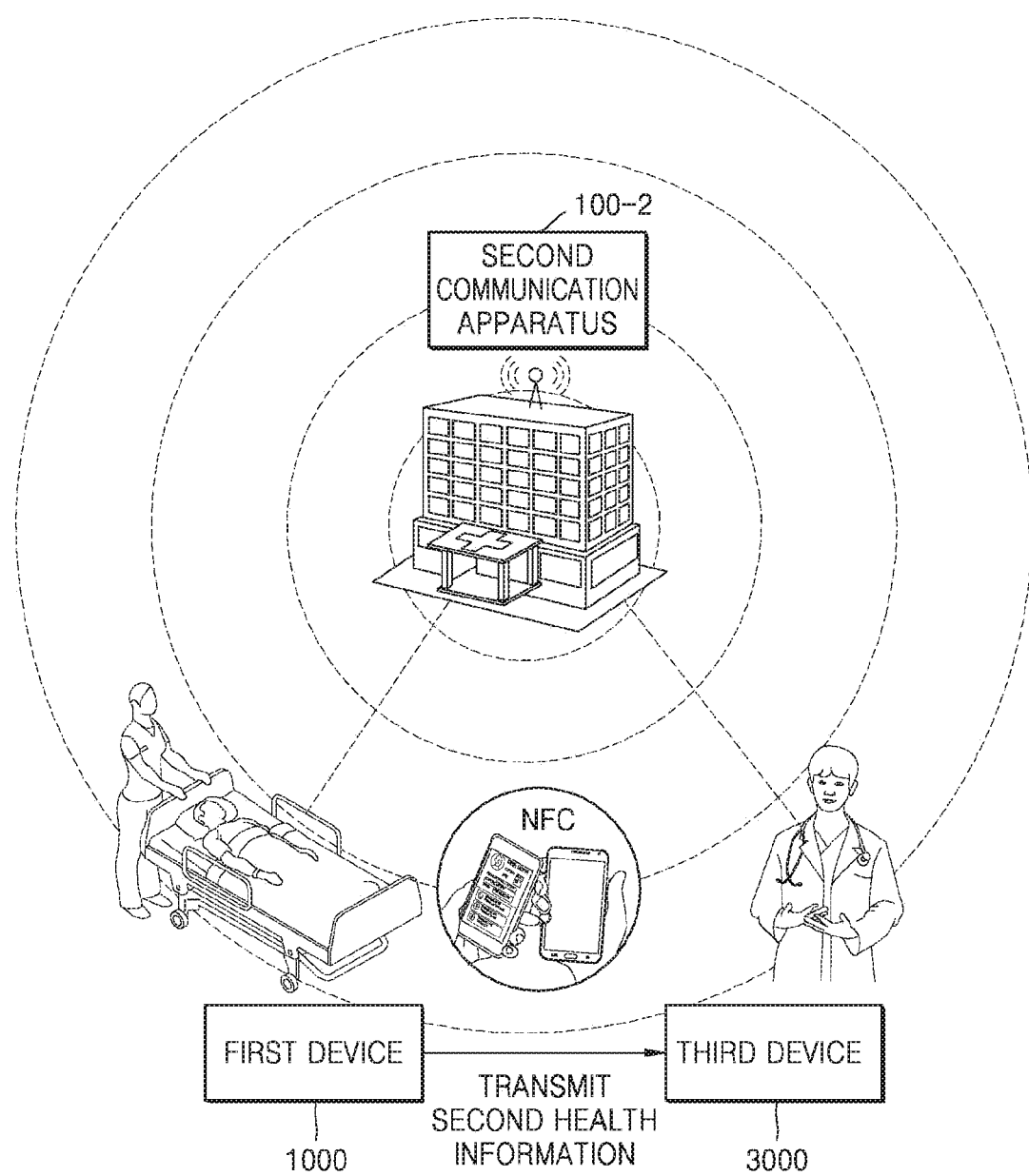
FIG. 22 is a diagram illustrating an example in which a first device transmits second health information to a third device, according to some embodiments.

FIG. 22 is a diagram illustrating an example in which the first device 1000 transmits second health information to the third device 3000 according to some embodiments.

Referring to FIG. 22, the first device 1000 and the third device 3000 may be located within a near field communication range of the second communication apparatus 100-2, and the first device 1000 may authenticate the third device 3000 and provide the third device 3000 with the second health information. The third device 3000 may, for example, obtain the second health information in the same manner as the method in which the second device 2000 of FIG. 21 obtains first health information.

Figure 23:
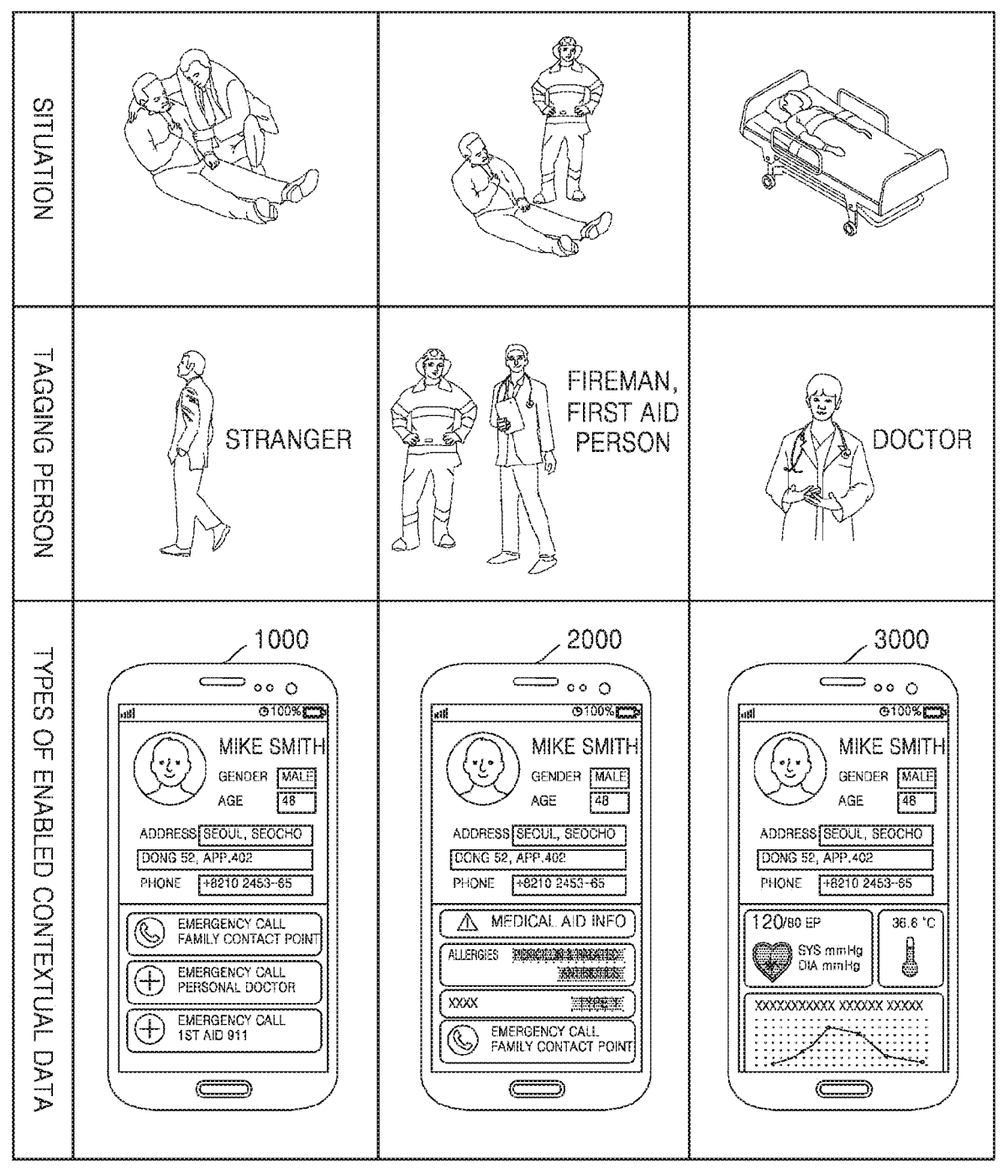

FIG. 23 is a diagram showing an example in which the first device 1000, the second device 2000, and the third device 3000 display profile information, first health information, and second health information, respectively, according to some embodiments.

Referring to FIG. 23, when a user of the first device 1000 is in an emergency state, the first device 1000 may determine that the user is in the emergency state based on biometric information of the user or based on a user input and display the first profile information on a screen of the first device 1000.

Thereafter, when an ambulance arrives near the user of the first device 1000, the first device 1000 and the second device 2000 of a firefighter may be located within a near field communication range of the first communication apparatus 100-1 installed in the ambulance, and the first device 1000 may authenticate the second device 2000 and may transmit the first health information to the second device 2000. Also, the second device 2000 may display the first health information received from the first device 1000 on a screen of the second device 2000.

When the ambulance boarded by the user of the first device 1000 arrives at a hospital, the first device 1000 and the third device 3000 of a doctor may be located within a near field communication range of the second communication apparatus 100-2 installed in the hospital and the first device 1000 may authenticate the third device 3000 and may transmit the second health information to the third device 3000. Also, the third device 3000 may display the second health information received from the first device 1000 on a screen of the third device 3000.

Figure 24:
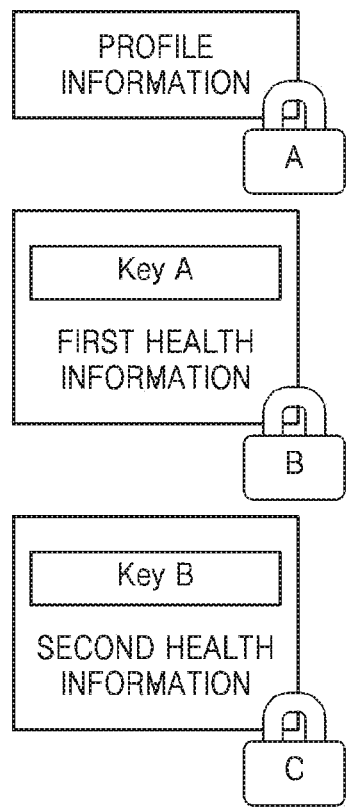
FIGS. 24 and 25 illustrate examples of encrypted profile information, encrypted first health information, and encrypted second health information, according to some embodiments.
Figure 25:
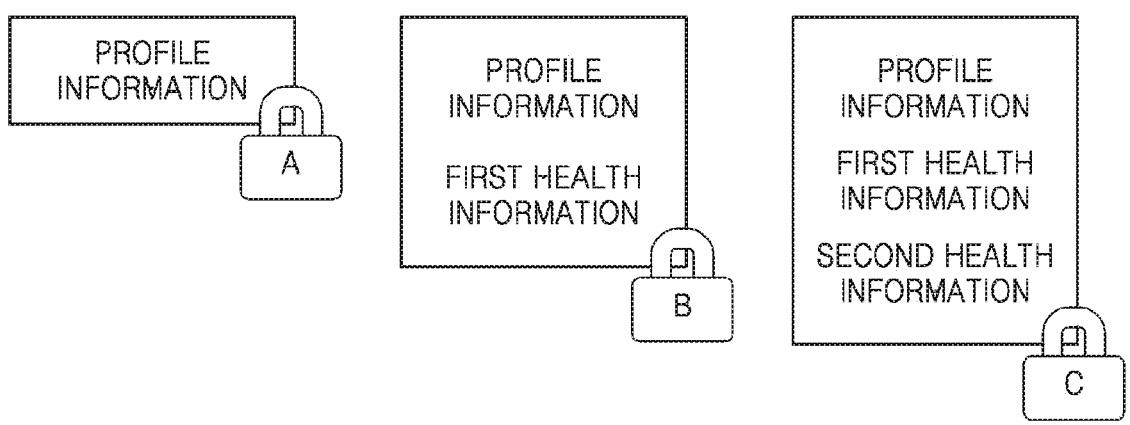

FIGS. 24 and 25 illustrate examples of encrypted profile information, encrypted first health information, and encrypted second health information according to some embodiments.

Referring to FIG. 24, profile information of a user of the first device 1000 may be encrypted by an encryption key A, and first health information and the encryption key A may be encrypted by an encryption key B. Further, second health information and the encryption key B may be encrypted by an encryption key C.

In this case, i) the profile information encrypted with the encryption key A, ii) the first health information encrypted with the encryption key B and the encryption key A, and iii) the second health information encrypted with the encryption key C and the encryption key B may be provided from the first device 1000 to another device (not shown), and the other device (not shown) may use only information corresponding to its own authority.

For example, when the other device (not shown) has the encryption key A, the other device (not shown) may use only profile information. Also, for example, when the other device (not shown) has the encryption key B, the other device (not shown) may obtain the first health information and the encryption key A using the encryption key B, and obtain the profile information using the encryption key A. Also, for example, when the other device (not shown) has the encryption key C, the other device (not shown) may obtain the second health information and encryption key B using the encryption key C, obtain the first health information and the encryption key A using the obtained encryption key B, and obtain the profile information using the obtained encryption key A.

Referring to FIG. 25, the profile information may be encrypted by the encryption key A, the profile information and the first health information may be encrypted by the encryption key B, the profile information, the first health information, and the second health information may be encrypted with the encryption key C. In this case, the information corresponding to its own authority of the another device (not shown) among i) the profile information encrypted with the encryption key A, ii) the profile information and the first health information encrypted with the encryption key B, and iii) the profile information, the first health information, and the second health information encrypted with the encryption key C may be selectively transmitted to the other device (not shown).

Figure 26:
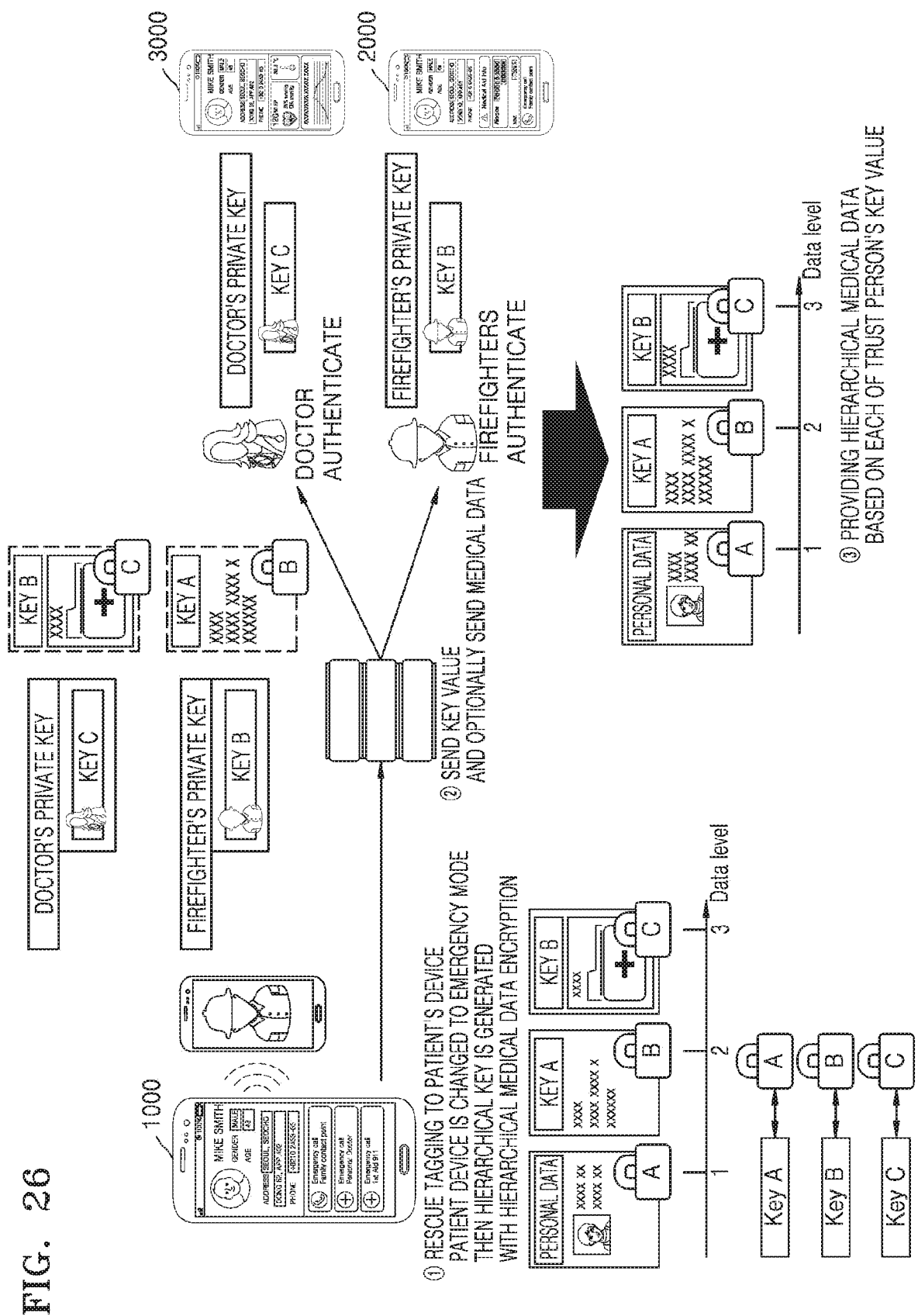
FIG. 26 is a diagram illustrating an example in which encrypted profile information, encrypted first health information, and encrypted second health information are provided to a second device and a third device, according to some embodiments.

FIG. 26 is a diagram illustrating an example in which encrypted profile information, encrypted first health information, and encrypted second health information are provided to the second device 2000 and the third device 3000 according to some embodiments.

Referring to FIG. 26, the first device 1000 may encrypt profile information with the encryption key A, encrypt first health information and the encryption key A with the encryption key B, and encrypt second health information and the encryption key B with the encryption key C.

Also, the first device 1000 may transmit i) the profile information encrypted with the encryption key A, ii) the first health information and the encryption key A encrypted with the encryption key B, and iii) the second health information and the encryption key B encrypted with the encryption key C to the second device 2000 and the third device 3000.

Also, the first device 1000 may authenticate the second device 2000 of a firefighter and may transmit the encryption key B corresponding to authority of the firefighter to the second device 2000. Also, the first device 1000 may authenticate the third device 3000 of a doctor and may transmit the encryption key C corresponding to authority of the doctor to the third device 3000.

Accordingly, the second device 2000 of the firefighter may obtain the first health information and the encryption key A by decrypting the first health information and the encryption key A encrypted with the encryption key B using the received encryption key B. Also, the second device 2000 may obtain the profile information by decrypting i) the profile information encrypted with the encryption key A using the encryption key A.

Also, the third device 3000 of the doctor may obtain the second health information and encryption key B by decrypting iii) the second health information and encryption key B encrypted with the encryption key C using the received encryption key C. Also, the third device 3000 may obtain the first health information and the encryption key A by decrypting ii) the first health information and the encryption key A encrypted with the encryption key B using the obtained encryption key B. Also, the third device 3000 may obtain the profile information by decrypting i) the profile information encrypted with the encryption key A using the obtained encrypted key A.

On the other hand, the first device 1000 may selectively transmit i) the profile information encrypted with the encryption key A, ii) the first health information and the encryption key A encrypted with the encryption key B, and iii) the second health information and the encryption key B encrypted with the encryption key C to the second device 2000 and the third device 3000. For example, the first device 1000 may transmit ii) the first health information and the encryption key A encrypted with the encryption key B to the second device 2000 and may transmit iii) the second health information and the encryption key B encrypted with the encryption key C to the third device 3000.

Figure 27:
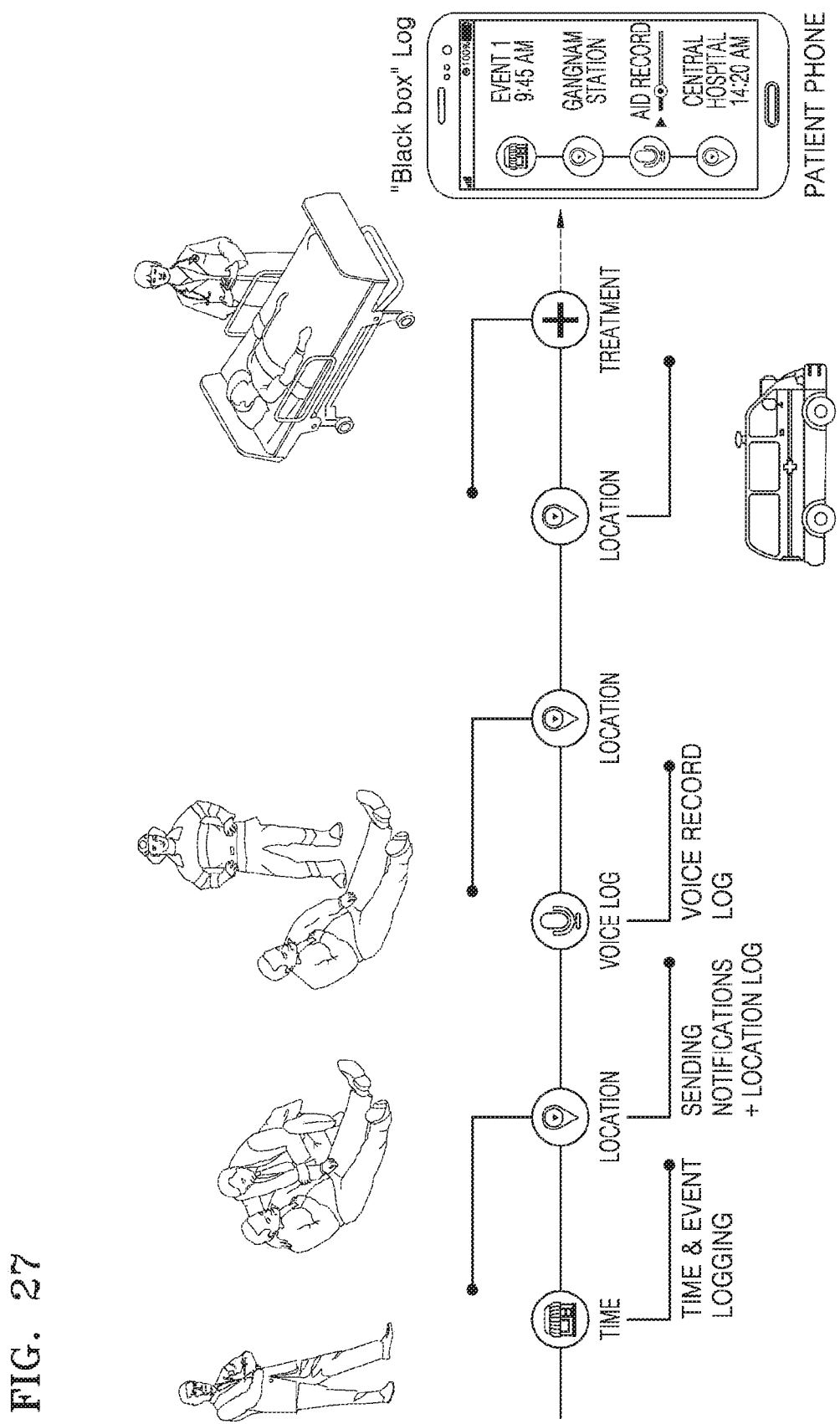
FIG. 27 illustrates an example in which a first device performs a black box function, according to some embodiments.

FIG. 27 illustrates an example in which the first device 1000 performs a black box function according to some embodiments.

Referring to FIG. 27, when a health condition of a user of the first device 1000 is in an emergency state, the first device 1000 may activate the black box function to generate situation information of a situation around the first device 1000. Also, the first device 1000 may periodically generate the situation information indicating the situation around the first device 1000 using the black box function, and may periodically transmit the generated situation information to a predetermined another device of an acquaintance.

The black box function of the first device 1000 may be a function of activating units of the first device 1000 for generating the situation information of the situation around the first device 1000 and may collect data of the situation around the first device 1000 at a predetermined period or continuously using the activated units. For example, when the black box function of the first device 1000 is activated, the first device 1000 may sense a location of the first device 1000 using a GPS sensor, record sound around the first device 1000 using a microphone, capture around the first device 1000 using a camera, store an identification value of another device connected to the first device 1000, store a data transmission/reception history with other devices, and store data output from the first device 1000, thereby generating the situation information.

Meanwhile, it is described that the first device 1000 activates the black box function when the user of the first device 1000 is in the emergency state, but a time for activating the black box function is not limited thereto. The first device 1000 may activate the black box function, for example, when the first device 1000 dials a 911 number, when the first device 1000 is included in a communication range of the communication apparatus 100, or when the first device 1000 authenticates the second device 2000.

Also, information included in the situation information generated by the black box function is not limited to the information described above. For example, when the black box function is activated, the first device 1000 may periodically collect biometric information indicating a body condition of the user using a sensor in the first device 1000, the wearable device 10, and the biometric chip 20 in the body of the user. Also, the first device 1000 may include the collected biometric information in second health information, and the biometric information included in the second health information may be provided from the device 1000 to the third device 3000 within a communication range of the second communication apparatus 100-2.

Figure 28:
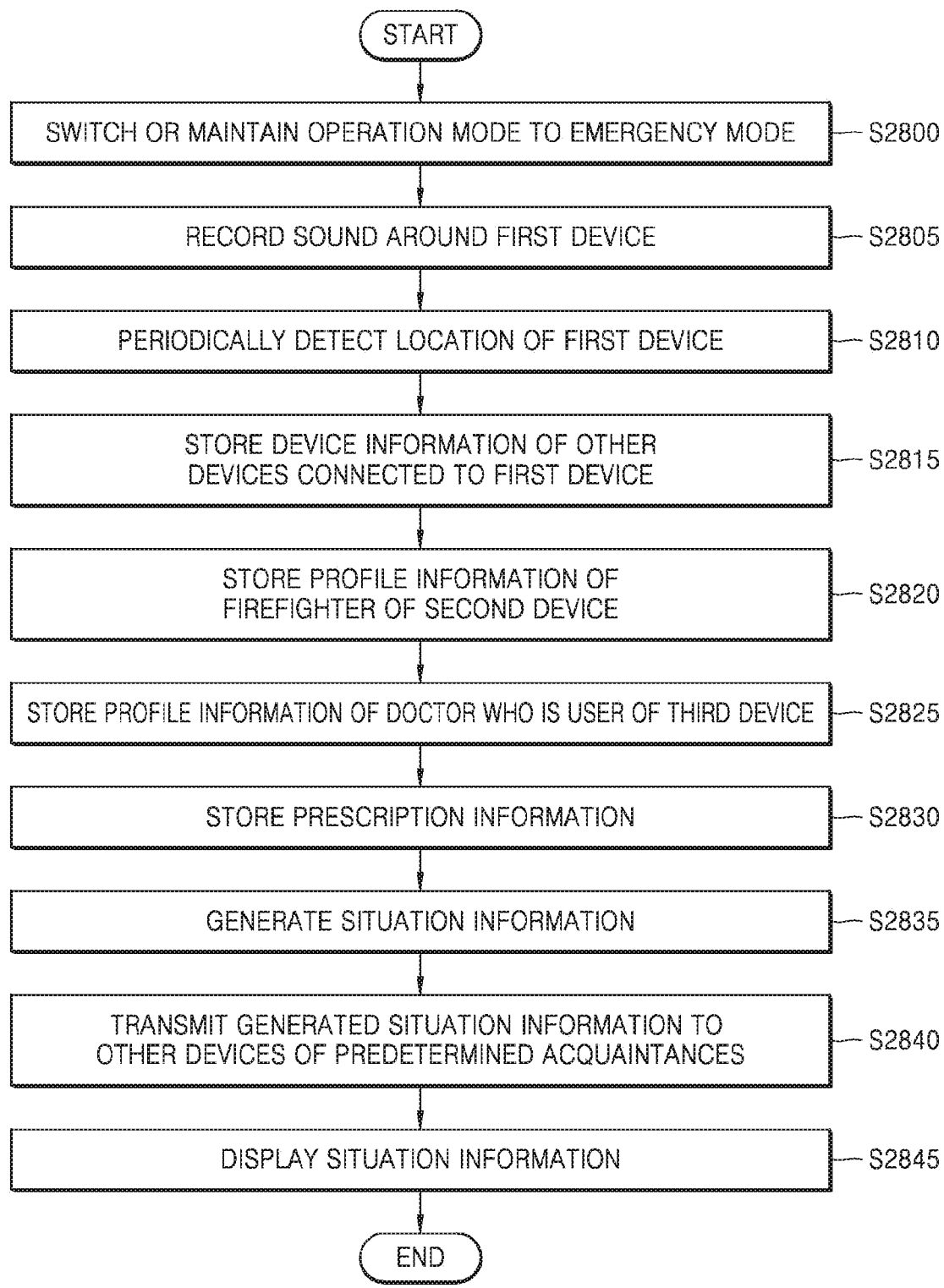
FIG. 28 is a flowchart of a method performed by a first device of generating and displaying black box information in an emergency mode, according to some embodiments.

FIG. 28 is a flowchart of a method performed by the first device 1000 of generating and displaying black box information in an emergency mode according to some embodiments.

In operation S2800, the first device 1000 may switch an operation mode to the emergency mode. The first device 1000 may switch the operation mode of the first device 1000 to the emergency mode when a health condition of a user is an emergency state. Alternatively, after the first device 1000 authenticates the second device 2000, the first device 1000 may switch the operation mode of the first device 1000 to the emergency mode. Also, the first device 1000 may activate a black box function since the operation mode of the first device 1000 is switched to the emergency mode.

In operation S2805, the first device 1000 may record sound around the first device 1000. The first device 1000 may record the sound around the first device 1000 using a microphone in the first device 1000 or a microphone in the wearable device 10 connected to the first device 1000. The first device 1000 may continuously record the sound around the first device 1000, and may divide and store recorded sound data by a predetermined time unit. The first device 1000 may match and store the recorded sound data with time information and location information.

In operation S2810, the first device 1000 may periodically detect a location of the first device 1000. For example, the first device 1000 may detect the location of the first device 1000 using a GPS sensor in the first device 1000 and a GPS sensor in the wearable device 10 connected to the first device 1000. Also, the first device 1000 may detect the location of the first device 1000 based on location information indicating a location of a base station around the first device 1000.

In operation S2815, the first device 1000 may store device information of other devices connected to the first device 1000. The first device 1000 may respectively receive device information of the communication apparatus 100 communicatively connected to the first device 1000, the second device 2000, and the third device 3000 from the communication apparatus 100, the second device 2000, and the third device 3000. Also, the first device 1000 may match and store the received device information with the time information and the location information.

In operation S2820, the first device 1000 may store profile information of a firefighter who is a user of the second device 2000. The first device 1000 may receive authentication information from the second device 2000 and extract the profile information of the firefighter included in the received authentication information from the authentication information. Also, the first device 1000 may match and store the extracted profile information of the firefighter with time information and location information.

In operation S2825, the first device 1000 may store profile information of a doctor who is a user of the third device 3000. The first device 1000 may receive authentication information from the third device 3000 and extract the profile information of the doctor included in the received authentication information from the authentication information. Also, the first device 1000 may store and match the extracted profile information of the doctor with the time information and the location information.

In operation S2830, the first device 1000 may store prescription information. When the user of the first device 1000 is being treated by a medical device installed in an ambulance in the ambulance, the first device 1000 may receive the prescription information from the medical device installed in the ambulance. The first device 1000 may receive information about, for example, use of an oxygen respirator in the ambulance, use of a defibrillator, and use of an electrocardiogram. Also, the first device 1000 may match and store the received prescription information with the time information and the location information.

Also, when the user of the first device 1000 is treated in a hospital, the first device 1000 may receive the prescription information from a medical device installed in the hospital. The first device 1000 may receive information about, for example, use of an oxygen respirator installed in the hospital, use of a defibrillator, use of an electrocardiogram, use of an x-ray device, and use of a CT. Also, the first device 1000 may match and store the received prescription information with the time information and the location information.

In operation S2835, the first device 1000 may generate situation information using at least one of the information stored in operations S2805 to S2830. The first device 1000 may generate a GUI representing a situation of the user of the first device 1000 by matching summary information of the information stored in operations S2805 to S2830 with the time information and the location information.

In operation S2840, the first device 1000 may transmit the generated situation information to other devices of predetermined acquaintances. The other devices of the acquaintances to receive the situation information may be previously set and the situation information may be sent to, for example, other devices of the family, friends, and the first device 1000.

In operation S2845, the first device 1000 may display the generated situation information. For example, the first device 1000 may display a GUI representing a status of the first device 1000 on a screen of the first device 1000.

Meanwhile, in FIG. 28, it is described that the first device 1000 generates, transmits, and stores the situation information after operation S2805 to operation S2830, but is not limited thereto. The first device 1000 may generate, transmit, and store situation information indicating a situation of a user at a predetermined period or when a specific event occurs.

Figure 29:
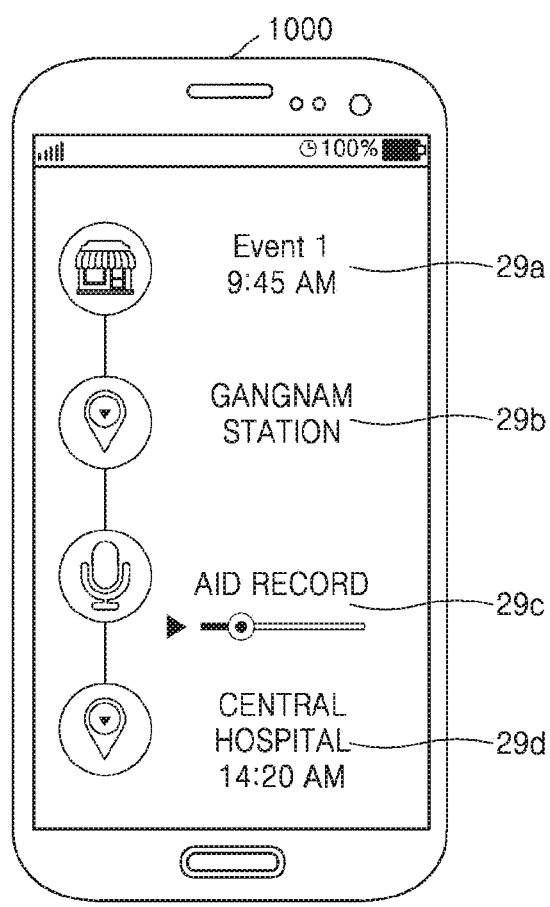
FIG. 29 is a diagram illustrating an example of situation information generated by a black box function, according to some embodiments.

FIG. 29 is a diagram illustrating an example of situation information generated by a black box function according to some embodiments.

Referring to FIG. 29, the situation information generated by the first device 1000 according to some embodiments may be represented as a GUI representing a situation of a user of the first device 1000. The GUI representing the situation of the user may include, for example, an item 29a indicating a specific event, items 29b 29d indicating a location of the first device 1000 and an item 29c indicating recorded data of sound around the first device 1000. The item 29a indicating the specific event, the items 29b 29d indicating the location of the first device 1000 and the item 29c indicating the recorded data of sound around the first device 1000 may be time sequentially arranged and thus displayed on a screen of the first device 1000.

In the GUI representing the situation of the user, when at least one of the item 29a indicating the specific event, the items 29b 29d indicating the location of the first device 1000 and the item 29c indicating the recorded data of sound around the first device 1000 is selected, detailed information corresponding to a selected item may be displayed on the screen of the first device 1000.

Figure 30:
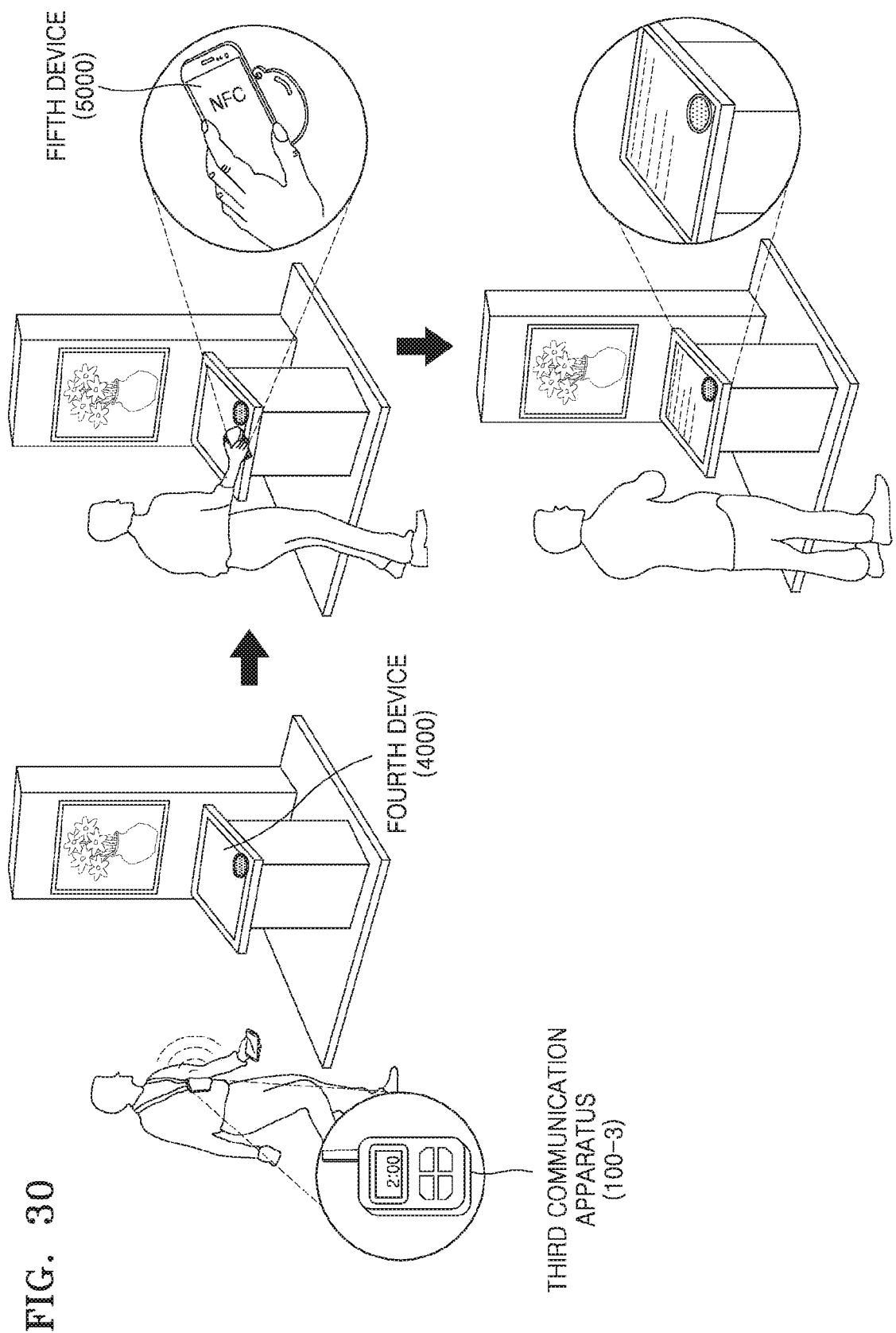
FIG. 30 illustrates an example in which a fourth device in a museum authenticates a fifth device of a visitor and provides guide information, according to some embodiments.
Figure 31:
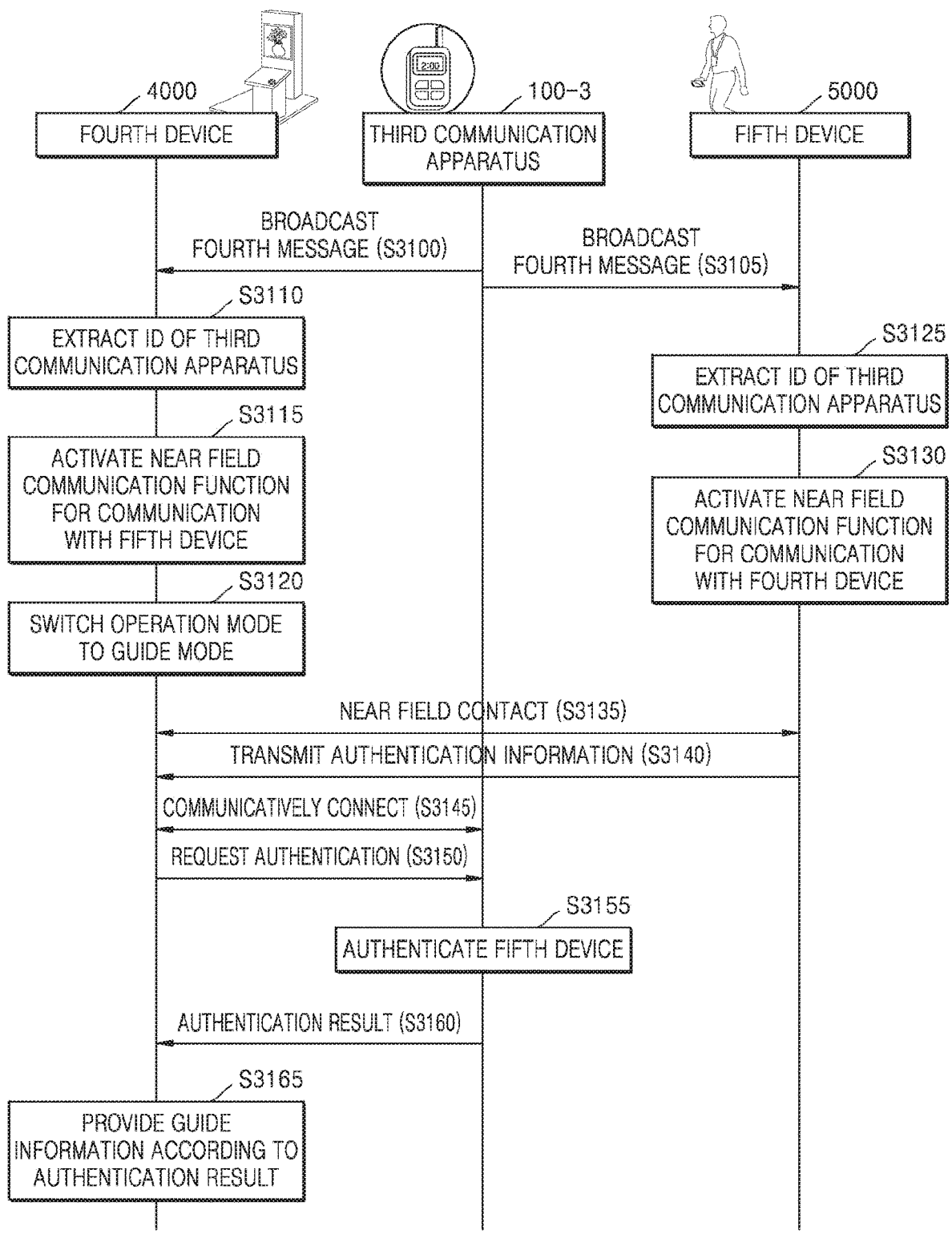
FIG. 31 is a flowchart of a method, performed by a fourth device in a museum, of authenticating a fifth device of a visitor and providing guide information, according to some embodiments.
Figure 32:
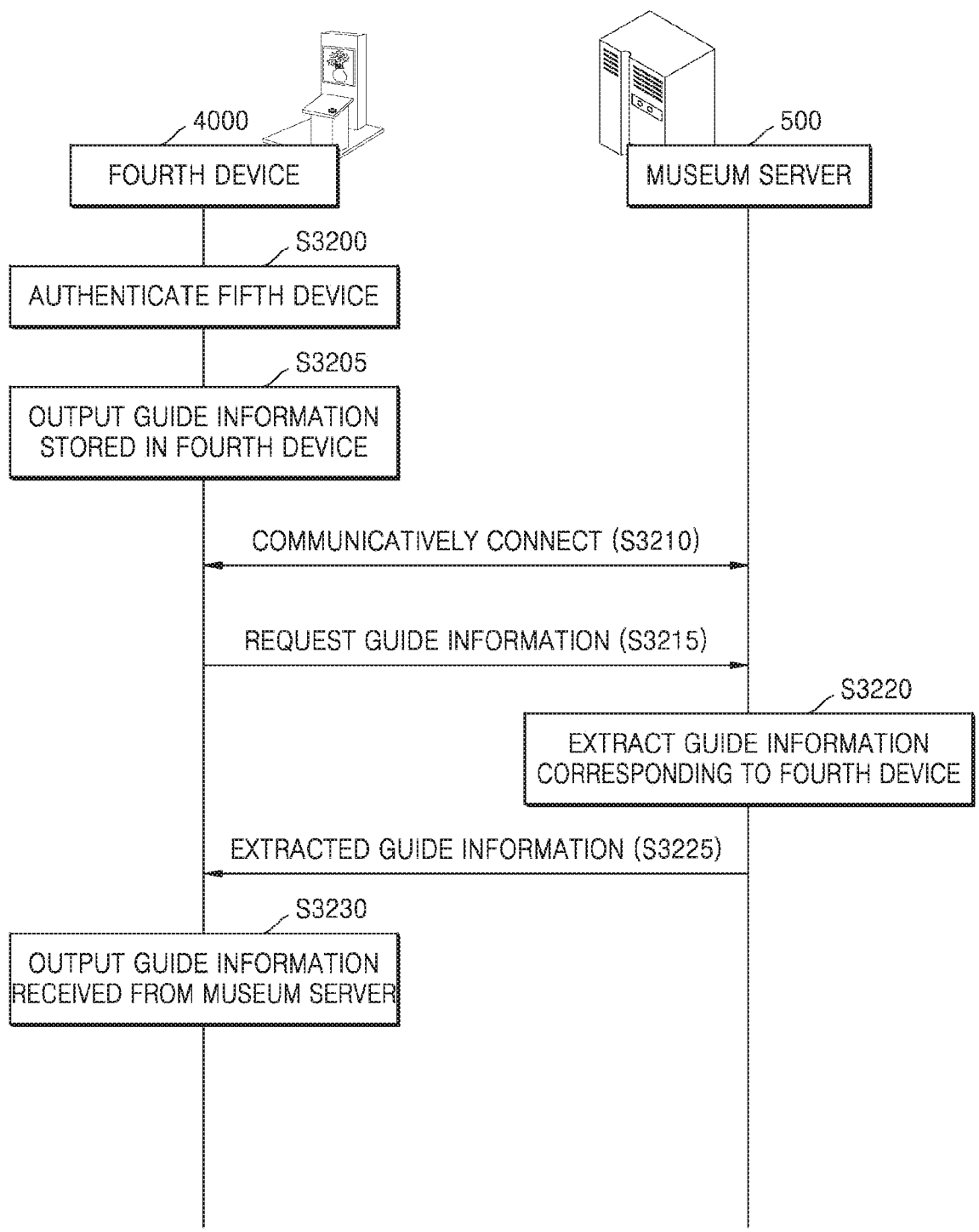
FIG. 32 is a flowchart of a method, performed by a fourth device, of obtaining guide information from a museum server, according to some embodiments.

FIGS. 30 to 32 are diagrams showing an embodiment in which a fourth device 4000 authenticates a fifth device 5000 and provides guide information in an information providing system using near field communication.

The guide information may be information for guiding watching of a user at a place such as a museum. The guide information may include, but not limited to, for example, detailed information about the artwork, a current location in the museum, a moving route of a visitor, and the like.

FIG. 30 illustrates an example in which the fourth device 4000 in a museum authenticates the fifth device 5000 of a visitor and provides guide information according to some embodiments.

In FIG. 30, the fourth device 4000 may be an information providing device of a museum installed near an exhibit, and may provide guide information for guiding a visitor to the museum. Also, a third communication apparatus 100-3 may be a communication apparatus worn by the visitor for watching the museum, and may include, for example, a beacon. Also, the fifth device 5000 may be a personal terminal of the visitor.

Referring to FIG. 30, the visitor wearing the third communication apparatus 100-3 may watch the artwork in the museum with the visitor's fifth device 5000. The artwork may be installed near the fourth device 4000 that is the information providing device for explaining the artwork. The third communication apparatus 100-3 worn by the viewer may be an electronic device for guiding the watching of the visitor and may include the beacon.

The third communication apparatus 100-3 may broadcast a fourth message including identification information of the third communication apparatus 100-3 through near field communication. Also, when the visitor moves near the artwork to watch the artwork, the fourth device 4000 and the fifth device 5000 of the visitor may be located within a communication range of the third communication apparatus 100-3.

The fourth device 4000 and the fifth device 5000 may be in near field contact with each other within a near field communication range of the third communication apparatus 100-3 and the fourth device 4000 may receive identification information including an ID of the visitor who is a user of the fifth device 5000 fifth device 5000. The fourth device 4000 may then authenticate the fifth device 5000 and display the guide information on a screen of the fourth device 4000.

FIG. 31 is a flowchart of a method performed by the fourth device 4000 in a museum of authenticating the fifth device 5000 of a visitor and providing guide information according to some embodiments.

The operations S3100 to S3115 in FIG. 31 are similar to operations S1000 to S1015 in FIG. 10, and thus descriptions of the operations S3100 to S3115 will be omitted for the sake of convenience.

In operation S3120, the fourth device 4000 may switch an operation mode of the fourth device 4000 to a guide mode. The guide mode may be the operation mode of the fourth device 4000 for allowing a user (e.g., the visitor) of the fifth device 5000 to receive guide information. For example, in the guide mode, the fourth device 4000 may authenticate the fifth device 5000 according to a predetermined rule, and may provide the guide information about the artwork exhibited around the fourth device 4000.

The fifth device 5000 may extract an ID of the third communication apparatus 100-3 from a fourth message in operation S3125 and the fifth device 5000 may activate a communication function for near field communication with the fourth device 4000 in operation S3130. Since the fifth device 5000 extracts the ID of the communication apparatus 100 from the fourth message, the fifth device 5000 may, for example, activate a NFC communication function. In this case, the fifth device 5000 may previously set a condition for activating the near field communication function. For example, the ID of the third communication apparatus 100-3 to be extracted to activate the near field communication function may be previously set.

In operation S3135, the fourth device 4000 and the fifth device 5000 may be in near field contact with each other. For example, since the fifth device 5000 with a NFC function activated is tagged to the fourth device 4000 with the NFC function activated, the fourth device 4000 and the fifth device 5000 may be connected to each other through NFC communication.

In operation S3140, the fifth device 5000 may transmit authentication information of the fifth device 5000 to the fourth device 4000. The fifth device 5000 may transmit, for example, the authentication information including a random number extracted from the fourth message and an ID of the visitor who is a user of the fifth device 5000 to the fifth device 5000 through NFC communication. Alternatively, for example, the fifth device 5000 may transmit the authentication information including the random number extracted from the fourth message, a session key extracted from the fourth message, and the ID of the user of the fifth device 5000 to the fifth device 5000 through NFC communication.

In operation S3145, the fourth device 4000 may be communicatively connected to the third communication apparatus 100-3. The fourth device 4000 may pair with the third communication apparatus 100-3 and transmit and receive data to and from the third communication apparatus 100-3 through bidirectional communication. The fourth device 4000 may be communicatively connected to the third communication apparatus 100-3 through near field communication. For example, the fourth device 4000 may be communicatively connected with the third communication apparatus 100-3 through BLE communication, but is not limited thereto.

In operation S3150, the fourth device 4000 may request authentication of the fifth device 5000 from the third communication apparatus 100-3. The fourth device 4000 may extract the ID of the user of the fifth device 5000, the random number, and the session key from the authentication information received from the fifth device 5000. Also, the fourth device 4000 may encrypt the ID of the user of the fifth device 5000 and the random number value with the session key. Also, the fourth device 4000 may transmit the ID of the user of the fifth device 5000 and the random number value encrypted by the session key to the third communication apparatus 100-3.

The third communication apparatus 100-3 may authenticate the fifth device 5000 in operation S3155. The third communication apparatus 100-3 may decrypt the encrypted ID of the user of the fifth device 5000 and random number value received from the fourth device 4000 with the session key stored in the third communication apparatus 100-3. The session key stored in the third communication apparatus 100-3 may be a session key included in the fourth message when the third communication apparatus 100-3 generates the fourth message.

Also, the third communication apparatus 100-3 may authenticate the fifth device 5000 using the ID of the user of the fifth device 5000 and the random number value obtained through decryption described above. For example, the third communication apparatus 100-3 may authenticate the fifth device 5000 by comparing the ID of the user of the fifth device 5000 and the random number value obtained through decryption above with an ID and a random number value previously stored in a DB (not shown) connected to the third communication apparatus 100-3.

The third communication apparatus 100-3 may transmit an authentication result of the fifth device 5000 to the fourth device 4000 in operation S3160 and the fourth device 4000 may display the guide information about the artwork exhibited around the fourth device 4000 on a display device of the fourth device 4000 in operation S3165.

The fourth device 4000 may also authenticate the fifth device 5000 in a manner similar to the way that the first device 1000 authenticates the second device 2000 in FIGS. 10-13.

FIG. 32 is a flowchart of a method performed by the fourth device 4000 of obtaining guide information from a museum server 500 according to some embodiments.

The fourth device 4000 may authenticate the fifth device 5000 in operation S3200 and the fourth device 4000 may output guide information stored in the fourth device 4000 in operation S3205. The fourth device 4000 may display a GUI including information describing exhibits exhibited around the fourth device 4000, a location of a visitor in a museum, and information about a recommended travel route of the visitor.

In operation S3210, the fourth device 4000 may be communicatively connected with the museum server 500. The fourth device 4000 may be connected to the museum server 500 and may transmit and receive data to and from the museum server 500 through bidirectional communication. For example, the fourth device 4000 may be communicatively connected with the museum server 500 through IP communication, but is not limited thereto. Also, the first device 1000 may transmit and receive data to and from the museum server 500 through various communication protocols such as HTTP and FTP.

In operation S3215, the fourth device 4000 may request guide information from the museum server 500. For example, the fourth device 4000 may complementally request the guide information from the museum server 500 according to a user input to the fourth device 4000.

In operation S3220, the museum server 500 may extract the guide information corresponding to the fourth device 4000. The museum server 500 may extract guide information corresponding to the fourth device 4000 from a DB (not shown) of the museum server 500 in response to a request from the fourth device 4000.

In operation S3225, the museum server 500 may provide the extracted guide information to the fourth device 4000. In operation S3230, the fourth device 4000 may display the guide information received from the museum server 500 on a display device of the fourth device 4000.

Figure 33:
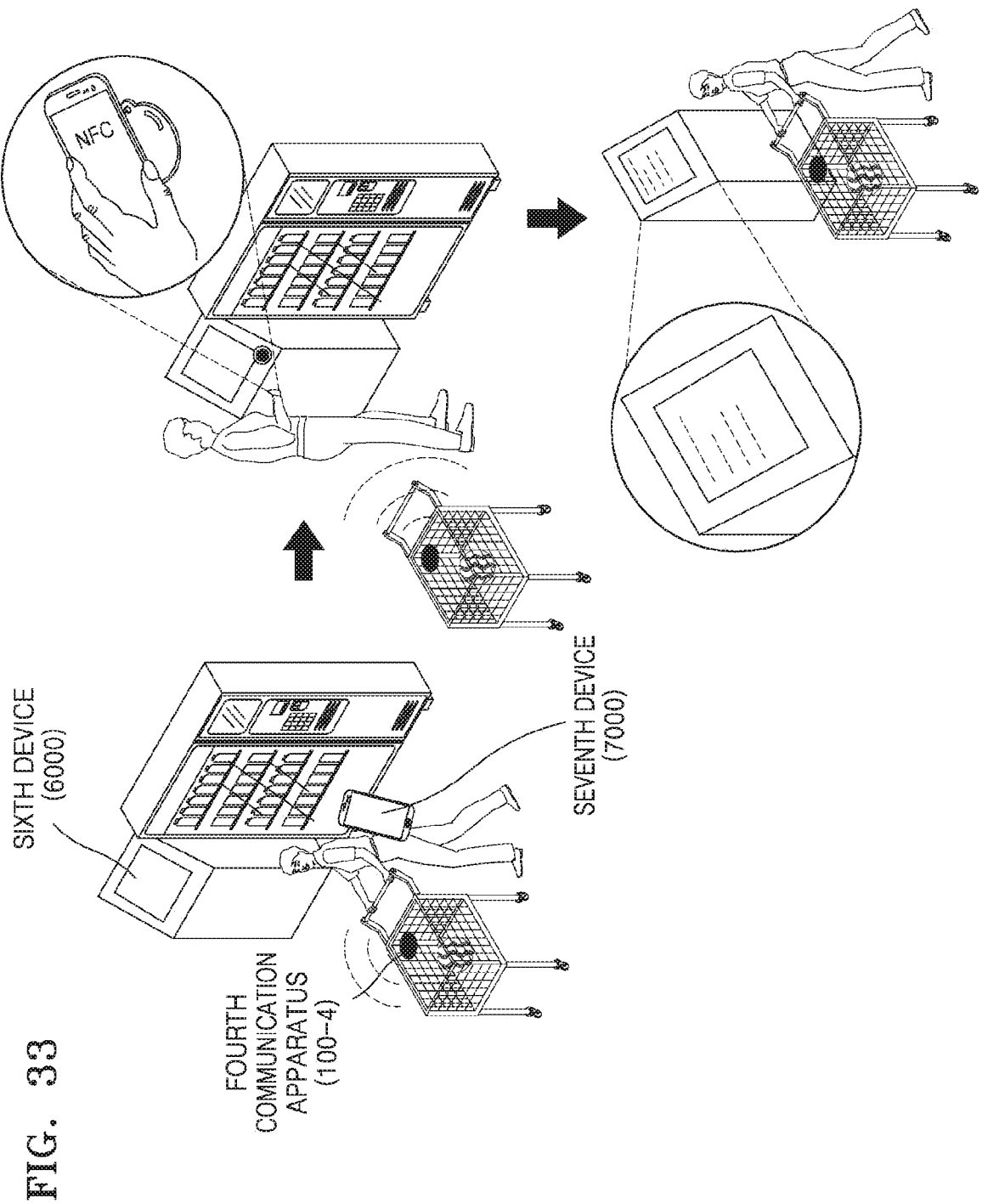
FIG. 33 is a diagram illustrating an example in which a sixth device authenticates a seventh device of a shopper and provides shopping information in an information providing system using near field communication, according to some embodiments.

FIG. 33 is a diagram illustrating an example in which a sixth device 6000 authenticates a seventh device 7000 of a shopper and provides shopping information in an information providing system using near field communication according to some embodiments.

In FIG. 33, the sixth device 6000 may provide the shopping information for helping the shopper to shop as a store terminal installed in a store. The shopping information may include, for example, goods information of goods included in a wish list of the shopper, goods information about recommended articles recommended to the shopper, route information indicating locations where goods to be shopped by the shopper are displayed, goods discount information, and coupon information but is not limited thereto.

Further, the fourth communication apparatus 100-4 may be a communication apparatus installed at a cart in the store, and may include, for example, a beacon. Also, the seventh device 7000 may be a personal terminal of the shopper.

Referring to FIG. 33, the shopper using the cart in which the fourth communication apparatus 100-4 is installed may shop goods of the store at the store with his/her seventh device 7000.

The fourth communication apparatus 100-4 may broadcast a fifth message including identification information of the fourth communication apparatus 100-4 through near field communication. Further, when the shopper moves the cart in which the fourth communication apparatus 100-4 is installed around the sixth device 6000, the sixth device 6000 and the seventh device 7000 of the shopper may be within a communication range of the fourth communication apparatus 100-4.

The sixth device 6000 and the seventh device 7000 may also be in near field contact with each other within a near field communication range of the fourth communication apparatus 100-4 and the sixth device 6000 may receive identification information including an ID of the shopper who is a user of the seventh device 7000 from the seventh device 7000. The sixth device 6000 may then authenticate the seventh device 7000 and display the shopping information on a screen of the sixth device 6000.

Figure 34:
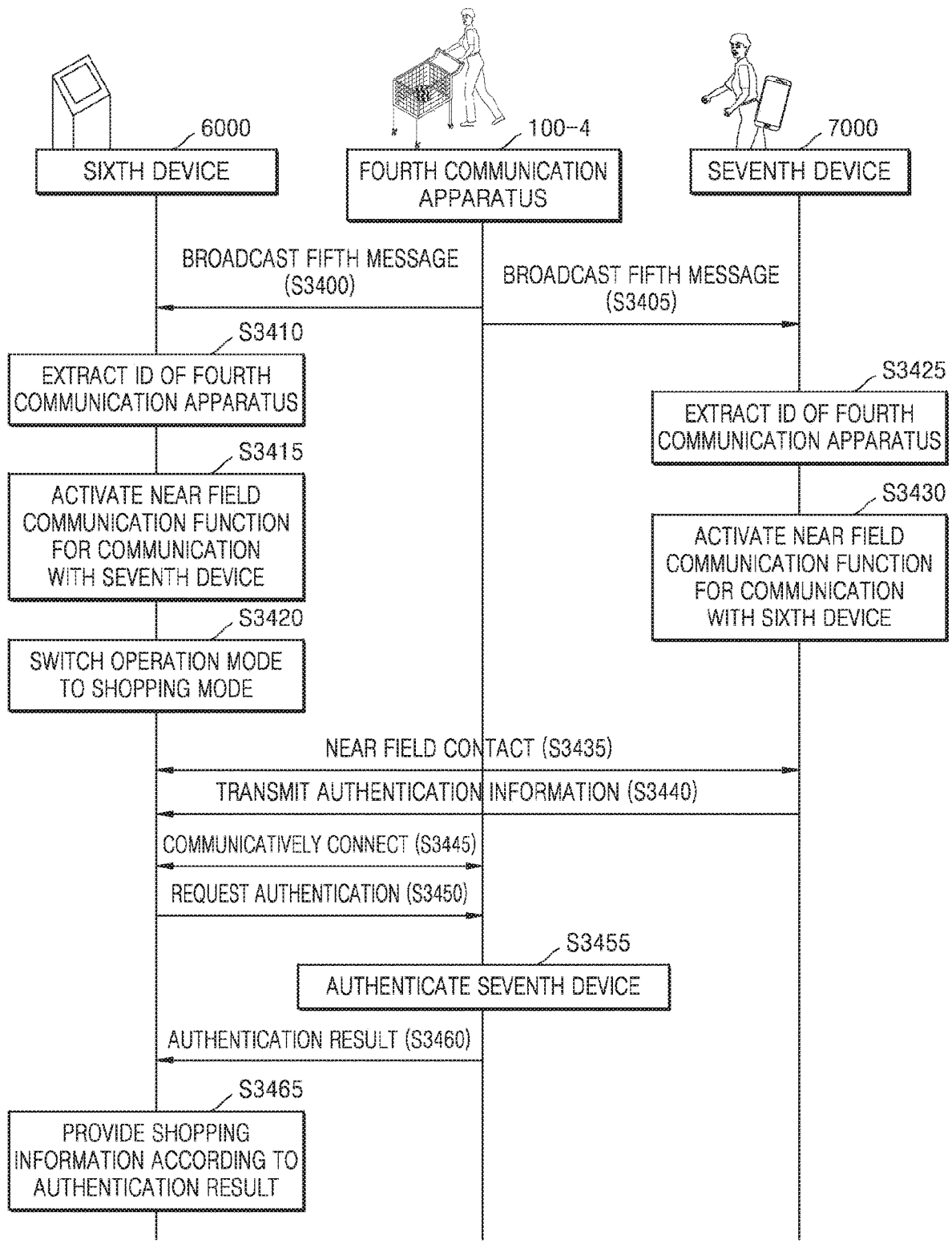
FIG. 34 is a flowchart of a method, performed by a sixth device, of authenticating a seventh device of a shopper and providing shopping information, according to some embodiments.

FIG. 34 is a flowchart of a method performed by the sixth device 6000 of authenticating the seventh device 7000 of a shopper and providing shopping information according to some embodiments.

Operations S3400 to S3415, operation S3425, and operation S3430 in FIG. 34 are similar to operations S3100 to S3115, operation S3125, and operation S3130 in FIG. 31, and thus descriptions of operations S3400 to S3415, operation S3425, and operation S3430 will be omitted for the sake of convenience.

In operation S3420, the sixth device 6000 may switch an operation mode of the sixth device 6000 to a shopping mode. The shopping mode may be the operation mode of the sixth device 6000 to allow the shopper who is a user of the seventh device 7000 to be provided with information that facilitates shopping. For example, in the shopping mode, the sixth device 6000 may authenticate the seventh device 7000 according to a predetermined rule, and provide shopping information about goods related to a user of the sixth device 6000.

Operations S3435 to S3460 of FIG. 34 are similar to operations S3135 to S3160 of FIG. 31, and thus descriptions of operations S3435 to S3460 will be omitted for the sake of convenience.

In operation S3465, the sixth device 6000 may display shopping information of goods related to the user of the seventh device 7000. In this case, the sixth device 6000 may previously receive from the seventh device 7000 information about kinds of goods included in a wish list of the user of the seventh device 7000. Further, the sixth device 6000 may output shopping information about goods to be shopped by the user of the seventh device 7000, using the information about the kinds of goods previously received from the seventh device 7000 and information about goods of a store.

The sixth device 6000 may receive shopping history information and profile information of the user of the seventh device 7000 from the store server 600 and output shopping information about goods to be recommended to the user using the received information.

The sixth device 6000 may also authenticate the seventh device 7000 in a manner similar to the way that the first device 1000 authenticates the second device 2000 in FIGS. 10-13.

Figure 35:
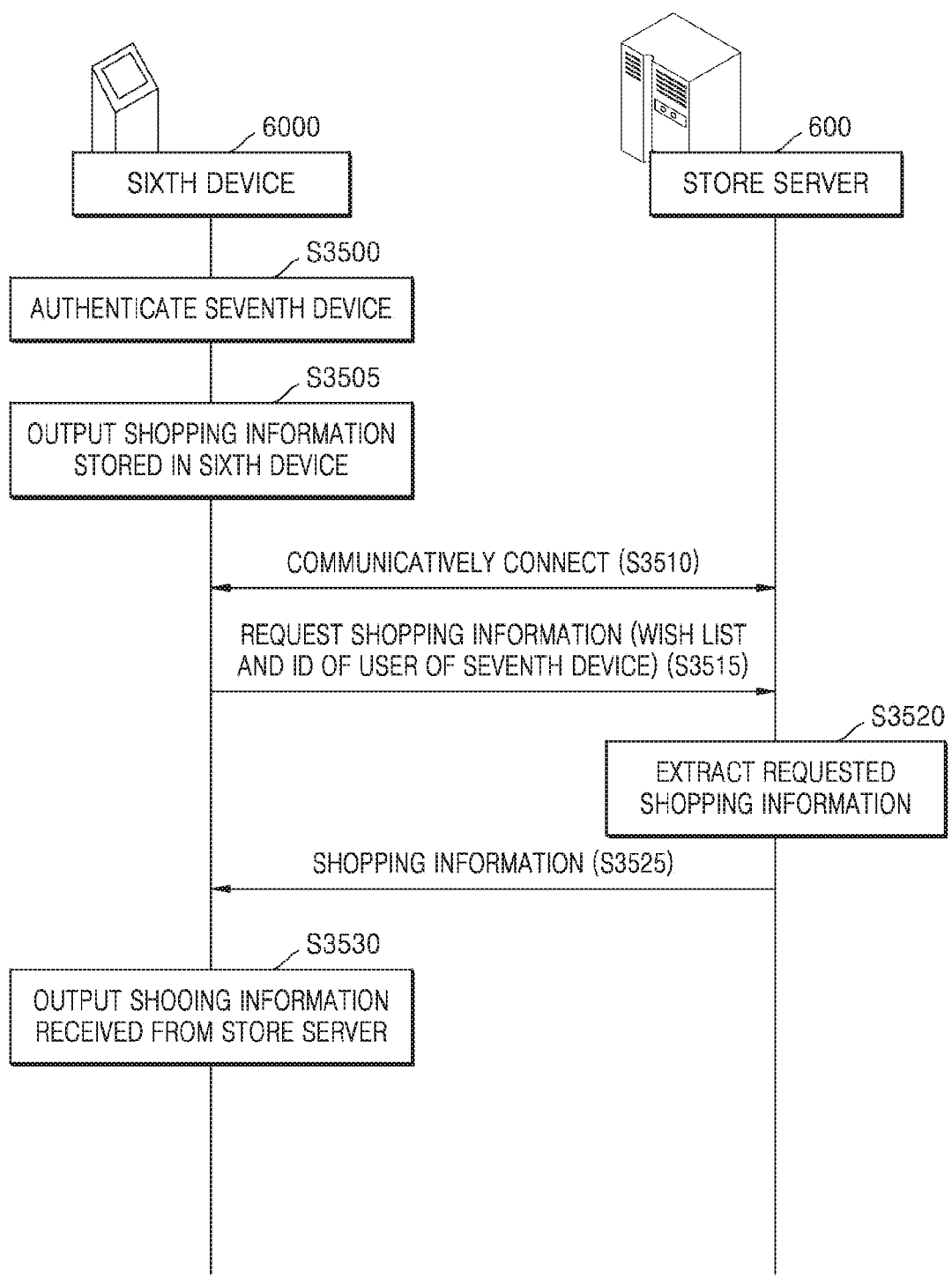
FIG. 35 is a flowchart of a method, performed by a sixth device, of obtaining shopping information from a store server, according to some embodiments.

FIG. 35 is a flowchart of a method performed by the sixth device 6000 of obtaining shopping information from the store server 600 according to some embodiments.

The sixth device 6000 may authenticate the seventh device 7000 in operation S3500 and the sixth device 6000 may output the shopping information stored in the sixth device 6000 in operation S3505. The sixth device 6000 may display the shopping information about goods to be shopped by a user of the seventh device 7000 and goods to be recommended to the user of the seventh device 7000 on a screen of the sixth device 6000.

In operation S3510, the sixth device 6000 may be communicatively connected with the store server 600. The sixth device 6000 may be connected to the store server 600 to transmit and receive data through bidirectional communication. For example, the sixth device 6000 may be communicatively connected to the store server 600 through IP communication, but is not limited thereto. Also, the first device 1000 may transmit and receive data to and from the store server 600 through various communication protocols such as, for example, HTTP and FTP.

In operation S3515, the sixth device 6000 may request shopping information from the store server 600. For example, the sixth device 6000 may complementally request the shopping information from the store server 600 according to a user input to the sixth device 6000.

In this case, the sixth device 6000 may receive a wish list stored in the seventh device 7000 and an ID of a user of the seventh device 7000 from the seventh device 7000, and store the received wish list and user ID to the store server 600.

In operation S3520, the store server 600 may extract the shopping information requested from the sixth device 6000. The store server 600 may extract the shopping information to be provided to the user of the seventh device 7000 from a DB (not shown) of the store server 600 in response to a request from the sixth device 6000.

The store server 600 may extract the shopping information about goods included in the wish list received from the sixth device 6000 from the DB (not shown). For example, the sixth device 6000 may extract from the DB (not shown) information about display locations of the goods included in the wish list, prices of the goods, coupons applicable to the goods, and discounts of the goods.

The store server 600 may also extract the shopping information to be provided to the user of the seventh device 7000 from the DB (not shown) based on the ID of the user of the seventh device 7000 received from the sixth device 6000. For example, the store server 600 may obtain information about a preferred brand, preferred goods, and the like from a shopping history of the user of the seventh device 7000 from the DB (not shown) based on the ID of the user of the seventh device 7000. The store server 600 may also extract shopping information about recommended goods to be provided to the user of the seventh device 7000 from the DB (not shown), for example, based on the obtained information about the preferred brand and the preferred goods.

Meanwhile, the user of the seventh device 7000 may previously upload the wish list to the store server 600. In this case, the sixth device 6000 may provide only the ID of the user of the seventh device 7000 to the store server 600. Also, the store server 600 may extract the wish list of the user of the seventh device 7000 from the DB (not shown) based on the ID of the user of the seventh device 7000.

In operation S3525, the store server 600 may provide the shopping information to the sixth device 6000. In operation S3530, the sixth device 6000 may display the shopping information received from the store server 600 on a display device of the sixth device 6000.

Figure 36:
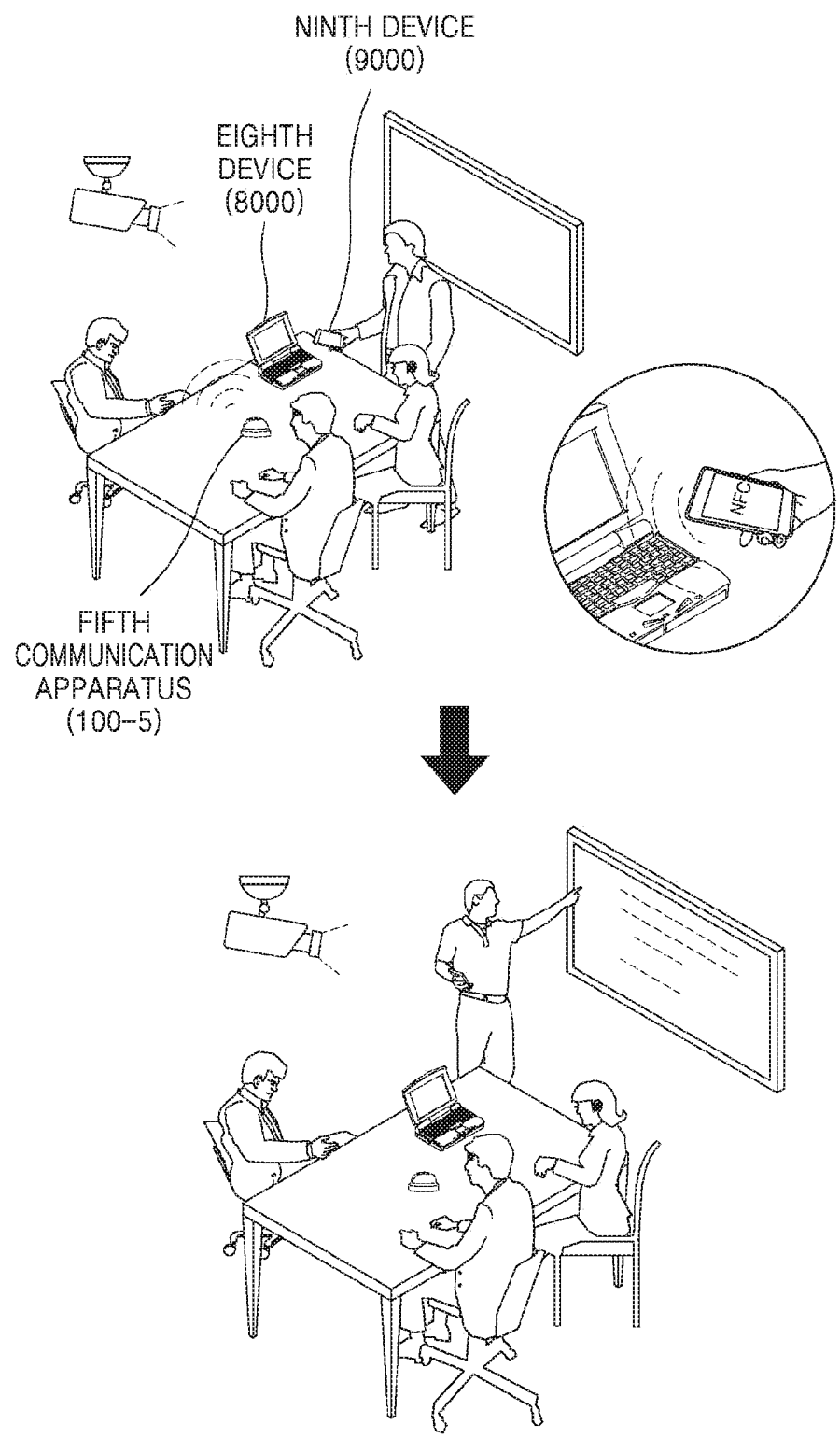
FIG. 36 illustrates an example in which an eighth device operates by authenticating a ninth device of a presenter and receiving a control command from the ninth device in an information providing system using near field communication, according to some embodiments.

FIG. 36 illustrates an example in which an eighth device 8000 operates by authenticating a ninth device 9000 of a presenter and receiving a control command from the ninth device 9000 in an information providing system using near field communication according to some embodiments.

In FIG. 36, the eighth device 8000 may be a device storing presentation content and may execute the presentation content and transmit output data of the executed content to a projector. The presentation content may be, for example, a moving picture file, a document file, and a PPT file, but is not limited thereto.

Further, a fifth communication apparatus 100-5 may be a communication apparatus disposed in a conference room, and may include, for example, a beacon. Also, the ninth device 9000 may be a personal terminal of the presenter.

Referring to FIG. 36, the presenter presenting in the conference room may control the eighth device 8000 using the ninth device 9000, thereby enabling an output image of the presentation content executed in the eighth device 8000 to be projected through a projector.

The fifth communication apparatus 100-5 may broadcast a sixth message including identification information of the fifth communication apparatus 100-5 through near field communication. Further, the eighth device 8000 and the ninth device 9000 may be located within a communication range of the fifth communication apparatus 100-5.

The eighth device 8000 and the ninth device 9000 may be in near field contact with each other within a near field communication range of the fifth communication apparatus 100-5 and the eighth device 8000 may receive identification information including an ID of the presenter who is a user of the ninth device 9000 from the ninth device 9000. The eighth device 8000 may then authenticate the ninth device 9000 and provide control authority for controlling the eighth device 8000 to the ninth device 9000.

Figure 37:
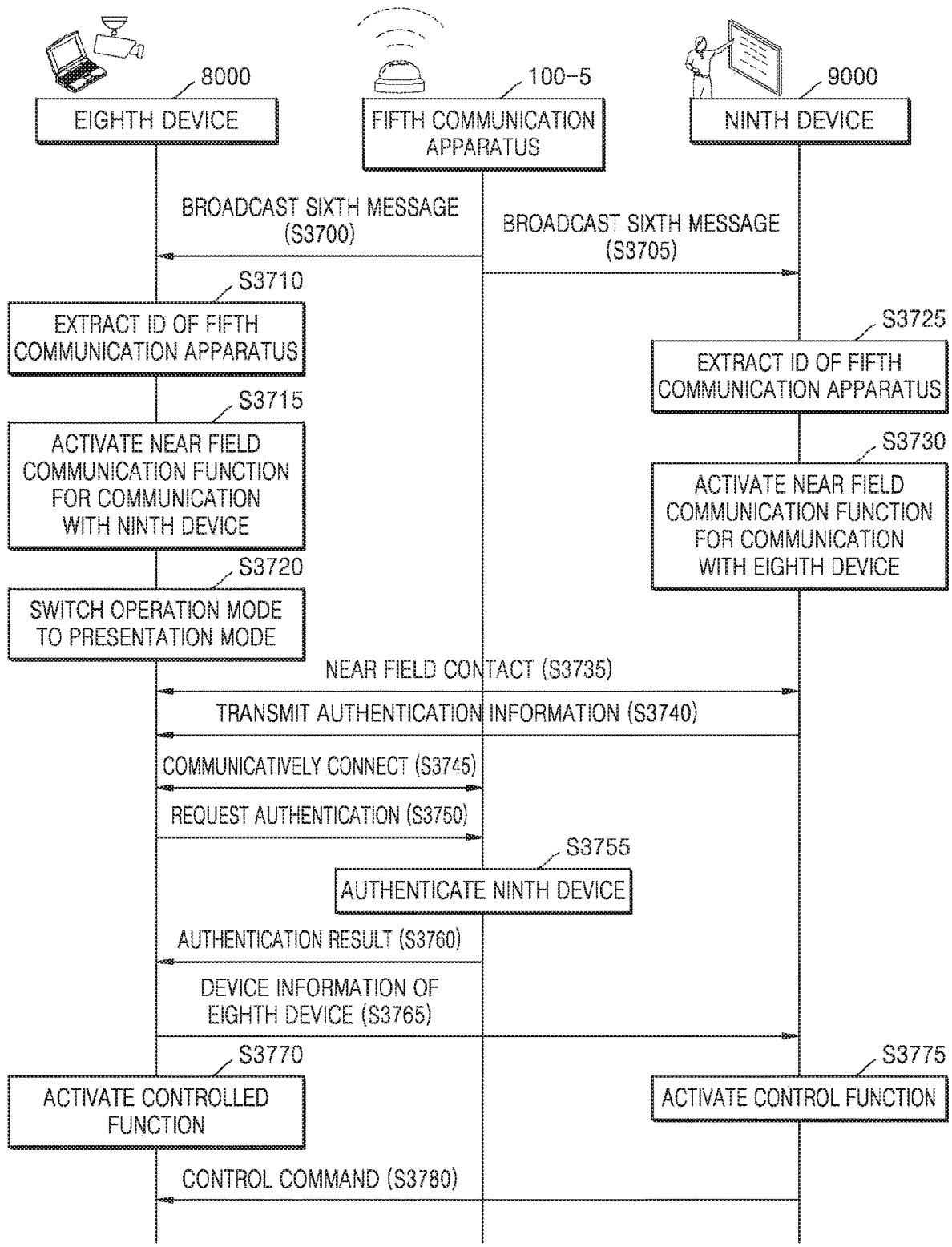
FIG. 37 is a flowchart of a method, performed by an eighth device, of operating by authenticating a ninth device of a presenter and receiving a control command from the ninth device in an information providing system using near field communication, according to some embodiments.

FIG. 37 is a flowchart of a method performed by the eighth device 8000 of operating by authenticating the ninth device 9000 of a presenter and receiving a control command from the ninth device 9000 in an information providing system using near field communication according to some embodiments.

In FIG. 37, a presentation mode may be an operation mode of the eighth device 8000 for the eighth device 8000 to execute presentation content according to the control command from the ninth device 9000.

Also, operations S3700 to S3760 related to a method in which the eighth device 8000 and the ninth device 9000 activate a near field communication function for near field communication therebetween and the eighth device 8000 authenticates the ninth device 9000 are similar to operations S3100 to S3160, and thus descriptions of the operations S3700 to S3760 will be omitted for the sake of convenience.

The eighth device 8000 may provide device information of the eighth device 8000 to the ninth device 9000 in operation S3765. Since the ninth device 9000 is authenticated, the eighth device 8000 may, for example, transmit an identification value of the eighth device 8000 and control authority for controlling the eighth device 8000 to the ninth device 9000.

In operation S3770, the eighth device 8000 may activate a controlled function by which the eighth device 800 may be controlled according to the control command from the ninth device 9000. The eighth device 8000 may wait for reception of the control command from the ninth device 9000 by executing a predetermined controlled program on a background such that the eighth device 800 may be controlled according to the control command from the ninth device 9000.

In operation S3775, the ninth device 9000 may activate a control function for controlling the eighth device 8000. The ninth device 9000 may execute a control program for controlling the eighth device 8000. Further, since the control program is executed, the ninth device 9000 may display a remote control GUI for controlling the eighth device 8000 on a screen of the ninth device 9000.

In operation S3780, the ninth device 9000 may transmit the control command to the eighth device 8000. The ninth device 9000 may receive a user input through the displayed remote control GUI and may transmit the control command for executing and controlling multimedia content in response to the received user input to the eighth device 8000. The eighth device 8000 may execute and control the presentation content stored in the eighth device 8000 according to the received control command, and may check an output image of the presentation content via a projector.

Figure 38:
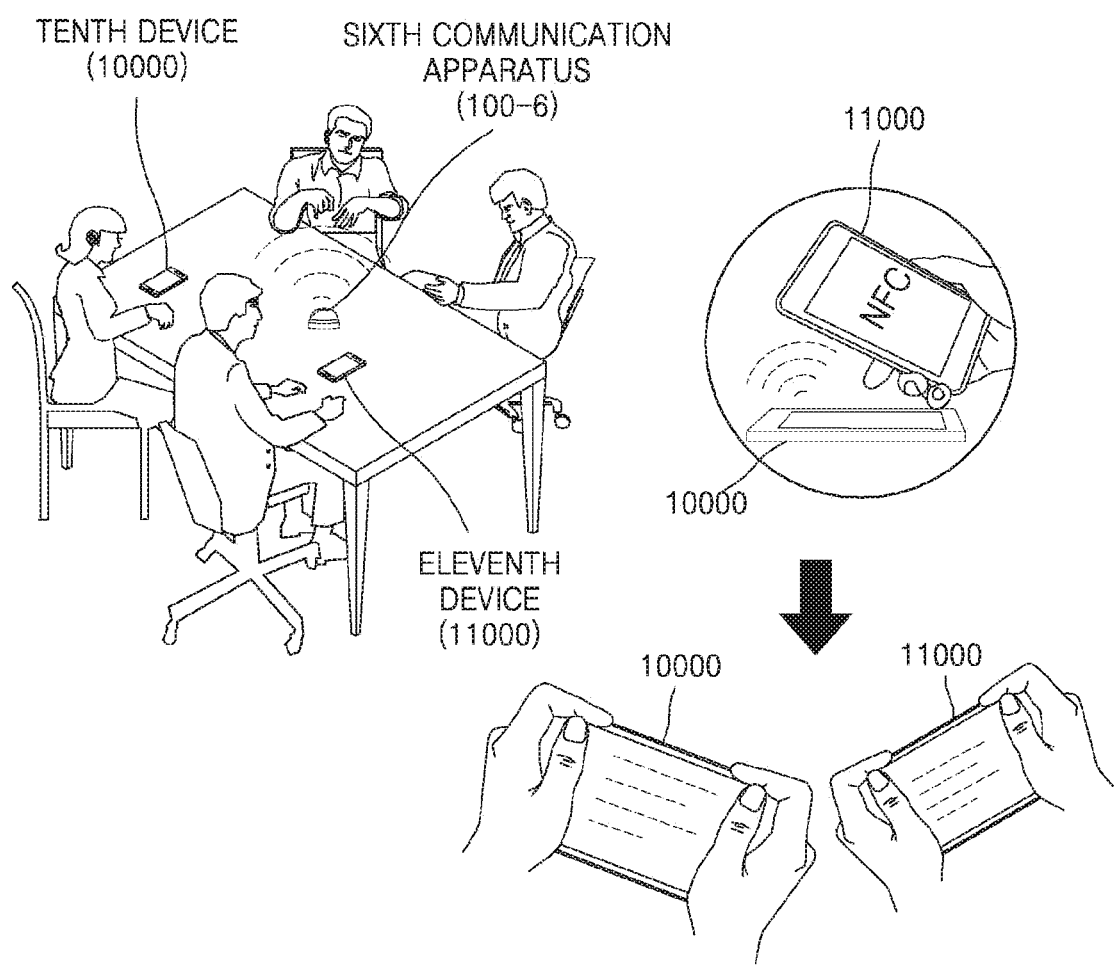
FIG. 38 illustrates an example in which a tenth device authenticates an eleventh device of a presenter and provides mirroring data indicating meeting information to the eleventh device in an information providing system using near field communication, according to some embodiments.

FIG. 38 illustrates an example in which a tenth device 10000 authenticates an eleventh device 11000 of a presenter and provides mirroring data indicating meeting information to the eleventh device 11000 in an information providing system using near field communication according to some embodiments.

In FIG. 38, the tenth device 10000 may be a device of a user A storing the meeting information, and may transmit the meeting information related to a meeting to the eleventh device 11000 of a user B. The meeting information may be data relating to a meeting between users, for example, but not limited to, a moving picture file, a document file, and a PPT file.

Further, a sixth communication apparatus 100-6 may be a communication apparatus disposed in a conference room, and may include, for example, a beacon. Also, the tenth device 10000 may be a personal terminal of the user A, and the eleventh device 11000 may be a personal terminal of the user B.

Referring to FIG. 38, the user A and the user B may be under a meeting in the conference room, the tenth device 000 of the user A may transmit the mirror data representing the meeting information to the eleventh device 11000 of the user B. Accordingly, the user A and the user B may easily conduct the meeting with each other using their own personal terminals.

The fifth communication apparatus 100-5 disposed in the conference room may broadcast a sixth message including identification information of the fifth communication apparatus 100-5 through near field communication. Further, the tenth device 10000 and the eleventh device 11000 may be located within a communication range of the fifth communication apparatus 100-5.

The tenth device 10000 and the eleventh device 11000 may also be in bear field contact with each other within a near field communication range of the fifth communication apparatus 100-5 and the tenth device 10000 may receive identification information including an ID of the user B from the eleventh device 11000. The tenth device 10000 may then authenticate the eleventh device 11000 and transmit mirroring data representing the meeting information stored in the tenth device 10000 to the eleventh device 11000.

Figure 39:
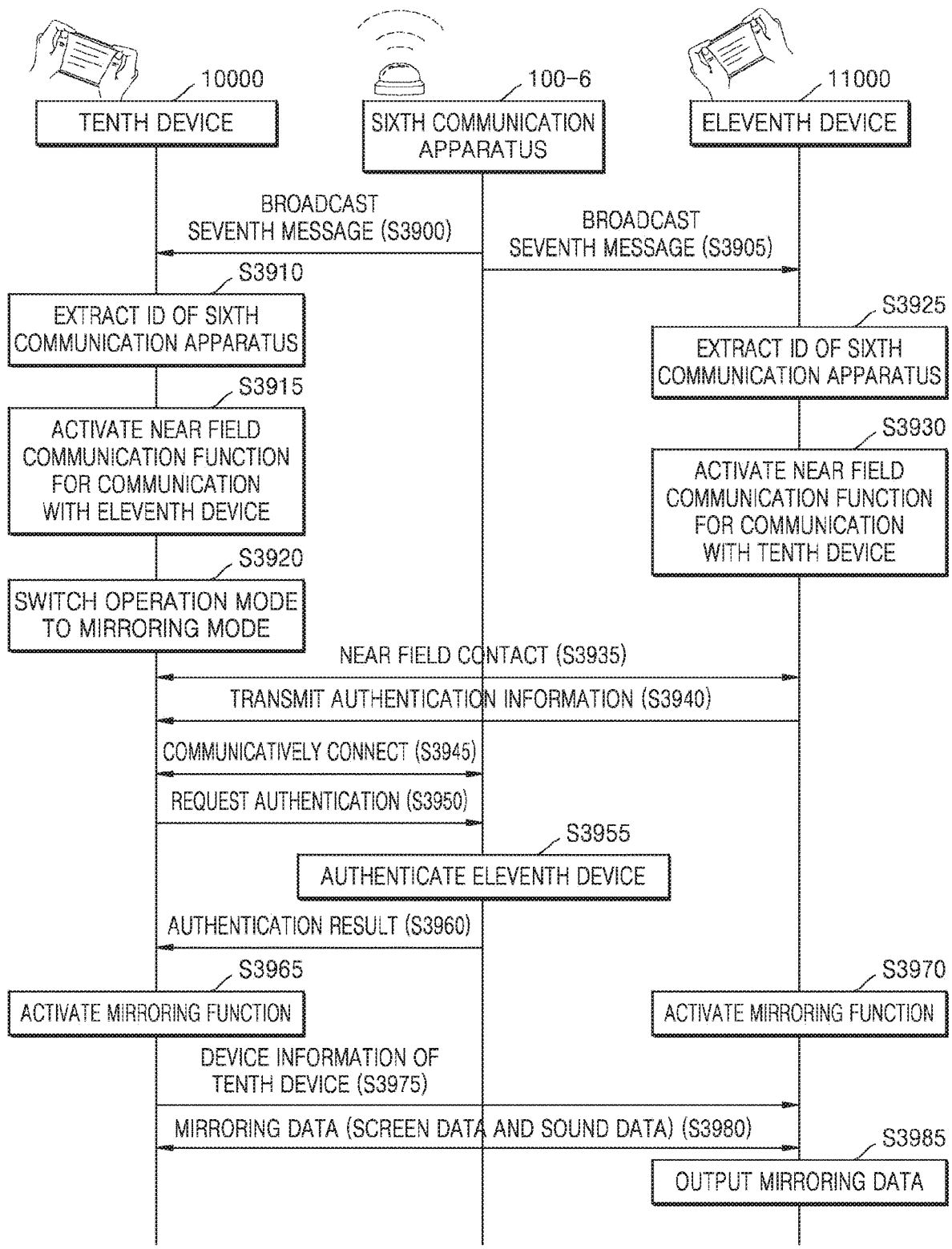
FIG. 39 is a flowchart of a method performed by a tenth device of authenticating an eleventh device of a presenter and providing mirroring data indicating presentation information to the eleventh device in an information providing system using near field communication, according to some embodiments.

FIG. 39 is a flowchart of a method performed by the tenth device 10000 of authenticating the eleventh device 11000 of a presenter and providing mirroring data indicating presentation information to the eleventh device 11000 in an information providing system using near field communication according to some embodiments.

A mirroring mode of the tenth device 10000 in FIG. 39 may be an operation mode of the tenth device 10000 for providing the mirroring data to the tenth device 10000.

Operations S3900 to S3960 related to a method in which the tenth device 10000 and the eleventh device 11000 activate a near field communication function for near field communication between each other and the tenth device 10000 authenticates the eleventh device 11000 are similar to operations S3100 to S3160, and thus descriptions of operations S3900 to S3960 will be omitted for the sake of convenience.

In operation S3965, the tenth device 10000 may activate a mirroring function. The mirroring function of the tenth device 10000 may be a function of transmitting image data being displayed on a screen of the tenth device 10000 to the eleventh device 11000 such that the same image as the image being displayed on the screen of the tenth device 10000 may be displayed on the screen of the eleventh device 11000. Since the eleventh device 11000 is authenticated, the tenth device 10000 may activate the mirroring function of the tenth device 10000 such that the image data of the image being displayed on the tenth device 10000 may be provided to the eleventh device 11000.

In operation S3970, the eleventh device 11000 may activate the mirroring function. The mirroring function of the eleventh device 11000 may be a function of receiving the same image as the image being displayed on the screen of the tenth device 10000 from the tenth device 10000 and displaying the image on the screen of the eleventh device 11000. The eleventh device 11000 may activate the mirroring function of the eleventh device 11000 to receive and display the image data of the image being displayed on the tenth device 10000 from the tenth device 10000.

The eleventh device 11000 may transmit device information to the tenth device 10000 in operation S3975. The eleventh device 11000 may provide the device information of the eleventh device 11000 to the tenth device 10000 such that the tenth device 10000 may transmit mirroring data to the eleventh device 11000. The device information of the eleventh device 11000 may include, for example, information about an identification value of the eleventh device 11000, an ID of the user B, and a type of a communication method that may be used for transmitting and receiving the mirroring data but is not limited thereto.

In operation S3980, the tenth device 10000 may transmit the mirroring data to the eleventh device 11000. The mirroring data may include, for example, screen data and sound data being output from the tenth device 10000.

In operation S3985, the eleventh device 11000 may output the mirroring data. The eleventh device 11000 may display the received screen data on the screen of the eleventh device 11000 and output the received sound data through a speaker of the eleventh device 11000.

Figure 40:
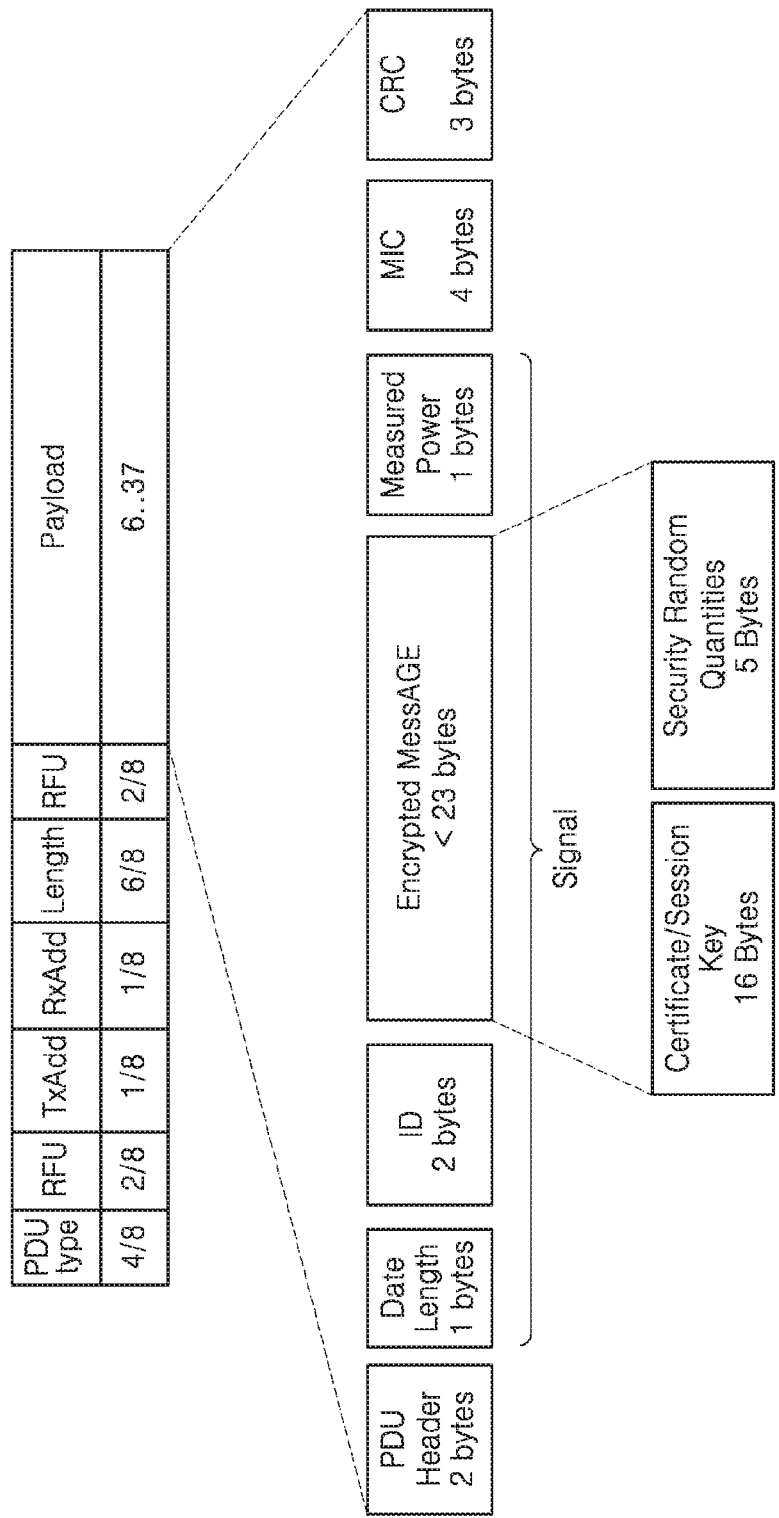
FIG. 40 is a diagram showing a data structure of a message broadcasted from a communication apparatus, according to some embodiments.

FIG. 40 is a diagram showing a data structure of a message broadcasted from the communication apparatus 100 according to some embodiments.

Referring to FIG. 40, data of the message broadcasted from the communication apparatus 100 according to some embodiments may include, for example, a PDU type field, an RFU field, a TxAdd field, an RxAdd field, a Length field, an RFU field, and a Payload field.

Also, the Payload field may include, for example, a PDU Header field, a Data Length field, an ID field, an Encrypted Messages field, a Measured Power field, a MIC field, and a CRC field. Further, in the ID field, an identification value of the communication apparatus 100 may be recorded. In the ID field, different identification information may be recorded depending on a type of the communication apparatus 100. For example, when the communication apparatus 100 is a device installed in an ambulance, an ID indicating an emergency state may be recorded in the ID field. When the communication apparatus 100 is a device worn by a user using a museum, an ID indicating the museum may be recorded. Also, for example, a session key and a random number value may be recorded in the Encrypted Messages field.

Alternatively, for example, the session key, the random number value, and information about a certificate may be recorded in the Encrypted Messages field. Alternatively, for example, information about the session key and the certificate may be recorded in the Encrypted Messages field. In this case, the certificate may be used to authenticate the second device 2000 as well as the random number value.

Figure 41:
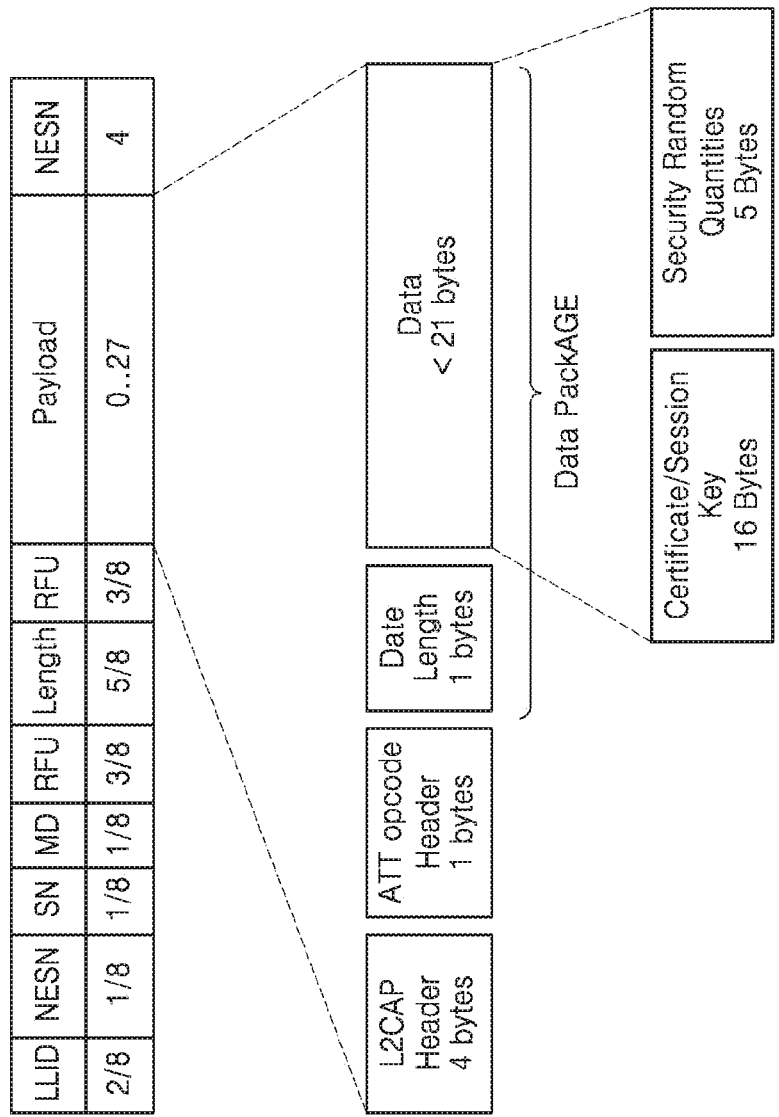
FIG. 41 is a diagram illustrating a structure of data transmitted between devices paired for BLE communication, according to some embodiments.

FIG. 41 is a diagram illustrating a structure of data transmitted between devices paired for BLE communication according to some embodiments.

Referring to FIG. 41, the data transmitted between the paired devices may include, for example, an LLID field, a NESN field, an SN field, an MD field, an RFU field, a Length field, an RFU field, a Payload field, and a NESE field.

Also, the Payload field may include, for example, an L2CAP Header field, an ATT Opcode Header field, a Data Length field, and a Data field, and the Data field may include a session key and a random number value. Alternatively, for example, information about the session key, the random number, and a certificate may be recorded in the Data field. Alternatively, for example, the information regarding the session key and the certificate may be recorded in the Data field. In this case, the certificate may be used to authenticate the second device 2000 as well as the random number value.

Figure 42:
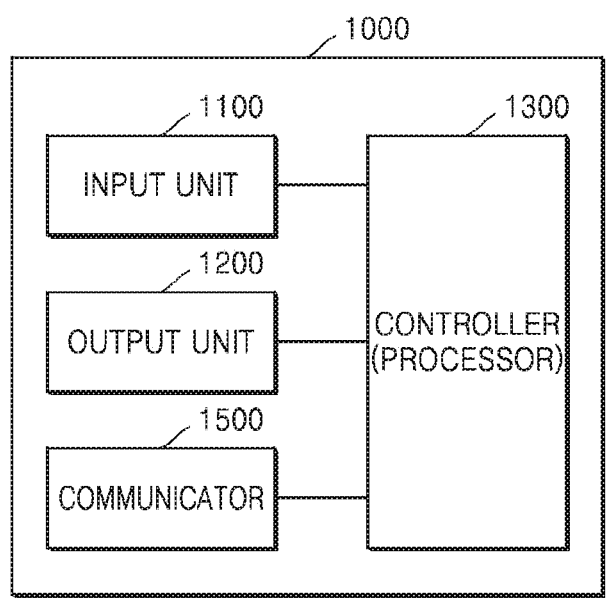
FIGS. 42 and 43 are block diagrams of a first device according to some embodiments.
Figure 43:
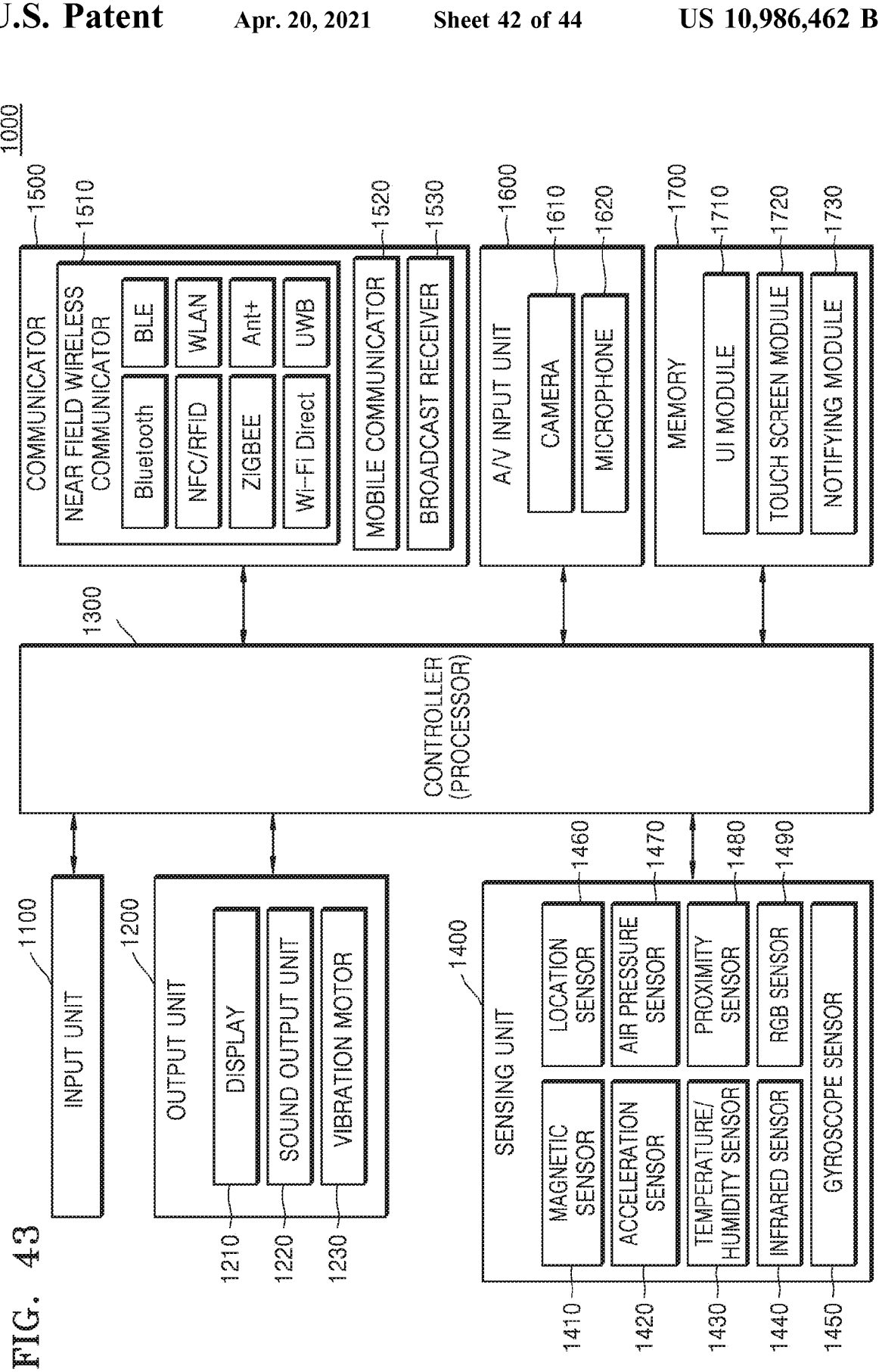

FIGS. 42 and 43 are block diagrams of the first device 1000 according to some embodiments.

As shown in FIG. 42, the first device 1000 according to some embodiments may include an input unit 1100, an output unit 1200, a controller 1300, and a communicator 1500. However, all components shown in FIG. 42 are not indispensable components of the first device 1000. The first device 1000 may be implemented by more components than the components shown in FIG. 42, or the first device 1000 may be implemented by fewer components than those shown in FIG. 42.

For example, as shown in FIG. 43, the first device 1000 according to some embodiments may further include a sensing unit (not shown) 1400, an A/V input unit 1600, and a memory 1700, in addition to the input unit 1100, the output unit 1200, the controller 1300, and the communicator 1500.

The input unit 1100 refers to means receiving data for controlling the first device 1000. The input unit 1100 may receive a user input for controlling the first device 1000. For example, the input unit 1100 may be a key pad, a dome switch, a touch pad (contact type capacitance type, pressure type resistive type, infrared ray detection type, surface ultrasonic wave conduction type, integral tension measurement type, piezo effect type, etc.), a jog wheel, a jog switch, and the like, but is not limited thereto. For example, the input unit 1100 may be an interface receiving a user input signal from an external input device (not shown).

The output unit 1200 may output an audio signal or a video signal or a vibration signal and the output unit 1200 may include a display 1210, a sound output unit 1220, and a vibration motor 1230.

The display 1210 may display and output information processed by the first device 1000. The display 1210 may display predetermined information related to the communication apparatus 100 and the second device 2000. For example, the display 1210 may display profile information of a user of the first device 1000, first health information, and second health information.

Meanwhile, when the display 1210 and a touch pad have a layer structure are configured as a touch screen, the display 1210 may be used as an input device in addition to the output device. The display 1210 may include at least one of a liquid crystal display, a thin film transistor-liquid crystal display, an organic light-emitting diode, a flexible display, a 3D display, and an electrophoretic display. The first device 1000 may include two or more displays 1210 according to the implementation of the first device 1000. At this time, the two or more displays 1210 may be arranged to face each other using a hinge.

The sound output unit 1220 may output audio data received from the communicator 1500 or stored in the memory 1700. The sound output unit 1220 also may output a sound signal related to a function (e.g., call signal reception sound, message reception sound, and alarm sound) performed by the first device 1000. The sound output unit 1220 may include a speaker, a buzzer, and the like.

The vibration motor 1230 may output a vibration signal. For example, the vibration motor 1230 may output the vibration signal corresponding to an output of audio data or video data (e.g., a call signal reception sound, a message reception sound, etc.) Also, the vibration motor 1230 may output the vibration signal when a touch is input to the touch screen.

The controller 1300 typically controls the overall operation of the first device 1000. The controller 1300 may control other components in the first device 1000 to perform operations of the first device 1000 described above. For example, the controller 1300 may generally control the input unit 1100, the output unit 1200, the sensing unit 1400, the communicator 1500, the A/V input unit 1600, by executing a program stored in the memory 1700.

Specifically, the controller 1300 may receive a first message broadcasted from the communication apparatus 100 via the communicator 1500. The first message may include, for example, identification information of the communication apparatus 100, a session key, and a random number value. The identification information of the communication apparatus 100 may be used by the first device 1000 to activate a near field communication function and may be used to determine which operation mode the first device 1000 needs to operate. The session key may also be used by the first device 1000 to transmit and receive data to and from the authentication server 200 to authenticate the second device 2000 and the data transmitted and received between the first device 1000 and the authentication server 200 may be encrypted by the session key. Also, the random number value may be provided from the first device 1000 to the authentication server 200, and may be used to authenticate the second device 2000.

Also, the controller 1300 may activate the near field communication function for communication with the second device 2000. The controller 1300 may extract identification information of the communication apparatus 100 from the first message received from the communication apparatus 100 and, since the identification information of the communication apparatus 100 is extracted, may activate the near field communication function for near field communication with the second device 2000. In this case, the controller 1300 may previously set conditions for activating the near field communication function, for example, an ID of the communication apparatus 100 to be extracted to activate the near field communication function.

Also, the first device 1000 in which the near field communication function is activated and the second device 2000 in which the near field communication function is activated may be close to each other, and since the first device 1000 and the second device 2000 are close to each other, the controller 1300 may transmit and receive data to and from the second device 2000 by controlling the communicator 1500.

Also, the controller 1300 may receive a second message for authentication of the second device 2000 from the second device 2000. The second device 2000 may extract the random number value included in the first message and generate authentication information including the extracted random number value and the identification information of the user of the second device 2000. Also, the second device 2000 may transmit the second message including the authentication information to the first device 1000.

The controller 1300 may authenticate the second device 2000 using the random number value in the second message received from the second device 2000 and the identification information of the user of the second device 2000. The controller 1300 may request the authentication server 200 to authenticate the second device 2000.

Also, the controller 1300 may provide predetermined information related to the communication apparatus 100 and the second device 2000.

The sensing unit 1400 may sense a state of the first device 1000 or a state around the first device 1000 and may transmit sensed information to the controller 1300.

The sensing unit 1400 may include at least one of a magnetic sensor 1410, an acceleration sensor 1420, a temperature/humidity sensor 1430, an infrared sensor 1440, a gyroscope sensor 1450, a location sensor (e.g. GPS) 1460, an air pressure sensor 1470, a proximity sensor 1480, and an RGB sensor (an illuminance sensor) 1490, but is not limited thereto. A function of each sensor may be intuitively deduced from the name by a person skilled in the art, and thus a detailed description thereof will be omitted.

The communicator 1500 may include one or more components for communicating with at least one of the communication apparatus 100, the second device 2000, and the authentication server 200. For example, the communicator 1500 may include a near field wireless communicator 1510, a mobile communicator 1520, and a broadcast receiver 1530.

The near field wireless communicator 151 may include a Bluetooth communicator, a BLE (Bluetooth Low Energy) communicator, a near field communicator, a WLAN communicator, a Zigbee communicator, an IrDA (infrared data association) communicator, a WFD (Wi-Fi Direct) communicator, an UWB (ultra wideband) communicator, and an Ant+communicator, etc. but is not limited thereto.

The mobile communicator 1520 may transmit and receive a wireless signal to at least one of a base station, an external terminal, and a server on a mobile communication network. In this regard, the wireless signal may include various types of data depending on a voice call signal, a video call signal, or a text/multimedia message transmission/reception.

The broadcast receiver 1530 may receive a broadcast signal and/or broadcast-related information from outside through a broadcast channel. The broadcast channel may include a satellite channel and a terrestrial channel. The first device 1000 may not include the broadcast receiver 1530 according to an embodiment.

The communicator 1500 may transmit and receive information necessary for operating in an operation mode related to the communication apparatus 100 and the second device 2000 to and from at least one of the communication apparatus 100, the second device 2000, and the authentication server 200.

The A/V (Audio/Video) input unit 1600 may input an audio signal or a video signal, and may include a camera 1610, a microphone 1620, and the like. The camera 1610 may obtain an image frame such as a still image or a moving image through an image sensor in a video call mode or a capturing mode. The image captured through the image sensor may be processed through the controller 1300 or a separate image processor (not shown).

The image frame processed by the camera 1610 may be stored in the memory 1700 or may be transmitted to outside via the communicator 1500. More than two cameras 1610 may be provided according to a configuration of a terminal.

The microphone 1620 may receive and process an external sound signal into electrical voice data. For example, the microphone 1620 may receive a sound signal from an external device or a speaker. The microphone 1620 may use various noise reduction algorithms to remove noise generated in receiving the external sound signal.

The memory 1700 may store a program for processing and controlling the controller 1300 and may store data input to or output from the first device 1000.

The memory 1700 may include a storage medium of at least one type of a flash memory type, a hard disk type, a multimedia card micro type, a card type memory (e.g., SD or XD memory), RAM (Random Access Memory), SRAM (Static Random Access Memory), ROM (Read Only Memory), EEPROM (Electrically Erasable Programmable Read-Only Memory), PROM (Programmable Read-Only Memory), magnetic memory, a magnetic disc, and an optical disc.

Programs stored in the memory 1700 may be classified into a plurality of modules according to their functions, for example, a UI module 1710, a touch screen module 1720, a notification module 1730, and the like.

The UI module 1710 may provide a specialized UI, a GUI, and the like that interwork with the first device 1000 for each application. The touch screen module 1720 may sense a touch gesture on a touch screen of a user and may transmit information about the touch gesture to the controller 1300. The touch screen module 1720 according to some embodiments may recognize and analyze a touch code. The touch screen module 1720 may be configured as separate hardware including a controller.

Various sensors may be provided in or near the touch screen to detect a touch or proximity touch of the touch screen. An example of a sensor for sensing the touch of the touch screen is a tactile sensor. The tactile sensor refers to a sensor that detects contact of a specific object to a degree or more that a person feels. The tactile sensor may detect various types of information such as roughness of a contact surface, rigidity of a contact object, temperature of a contact point, etc.

Also, a proximity sensor is an example of the sensor for sensing the touch of the touch screen.

The proximity sensor refers to a sensor that detects presence or absence of an object approaching a predetermined detection surface or in the vicinity thereof without mechanical contact using force of an electromagnetic field or infrared rays. Examples of the proximity sensor may include a transmission type photoelectric sensor, a direct reflection type photoelectric sensor, a mirror reflection type photoelectric sensor, a high frequency oscillation type proximity sensor, a capacitive proximity sensor, a magnetic proximity sensor, an infrared proximity sensor, etc. The touch gesture of the user may include tap, touch & hold, double tap, drag, panning, flick, drag and drop, swipe, and the like.

The notification module 1730 may generate a signal for notifying an occurrence of an event of the first device 1000. Examples of the event generated in the first device 1000 may include call signal reception, message reception, key signal input, schedule notification, and the like. The notification module 1730 may output a notification signal in the form of a video signal through the display 1210, may output a notification signal in the form of an audio signal through the sound output unit 122, or may output a notification signal in the form of a vibration signal.

Meanwhile, the fourth device 4000, the sixth device 6000, the eighth device 8000 and the tenth device 10000 may include the same or similar components as the first device 1000, a controller of each of the fourth device 4000, the sixth device 6000, the eighth device 8000 and the tenth device 10000 may control other components included in the fourth device 4000, the sixth device 6000, the eighth device 8000, and the tenth device 10000, to perform functions of the fourth device 4000, the sixth device 6000, the eighth device 8000, and the tenth device 10000 described above.

Figure 44:
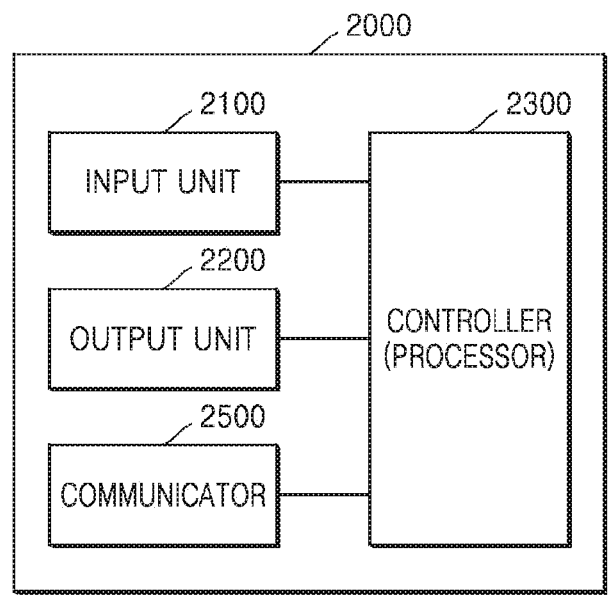
FIG. 44 is a block diagram of a second device according to some embodiments.

FIG. 44 is a block diagram of the second device 2000 according to some embodiments.

Referring to FIG. 44, the second device 2000 according to some embodiments may include an input unit 2100, an output unit 2200, a controller 2300, and a communicator 2500. However, all components shown in FIG. 44 are not indispensable components of the second device 2000. The second device 2000 may be implemented by more components than the components shown in FIG. 44, or the second device 2000 may be implemented by fewer components than those shown in FIG. 44. For example, the second device 2000 may include the same or similar components as the first device 1000 shown in FIG. 43.

The input unit 2100 refers to means for a user to input data for controlling the second device 2000. For example, the input unit 2100 may be a key pad, a dome switch, a touch pad (contact type capacitance type, pressure type resistive type, infrared ray detection type, surface ultrasonic wave conduction type, integral tension measurement type, piezo effect type, etc.), a jog wheel, a jog switch, and the like, but is not limited thereto.

The output unit 2200 may output an audio signal, a video signal, or a vibration signal, and the output unit 2200 may include a display, a sound output unit, and a vibration motor. The display may display and output information processed in the second device 2000. The display may display a GUI used to transmit authentication information of the second device 2000 to the first device 1000. Also, the display may display predetermined information related to the communication apparatus 100 received from the first device 1000. The display may display, for example, profile information of a user of the first device 1000, first health information, and second health information.

The controller 2300 typically controls the overall operation of the second device 2000. The controller 2300 may control other components in the second device 2000 to perform operations of the second device 2000 described above. For example, the controller 2300 may generally control the input unit 2100, the output unit 2200, and the communicator 2500 by executing programs stored in a memory.

Specifically, the controller 2300 may receive a first message broadcasted from the communication apparatus 100 via the communicator 2500. The first message may include, for example, identification information of the communication apparatus 100, a session key, and a random number value. The identification information of the communication apparatus 100 may be used by the second device 2000 to activate a near field communication function. The session key may also be used by the first device 1000 to transmit and receive data to and from the authentication server 200 to authenticate the second device 2000 and the data transmitted and received between the first device 1000 and the authentication server 200 may be encrypted by the session key. Also, the random number value may be provided from the first device 1000 to the authentication server 200, and may be used to authenticate the second device 2000.

Also, the controller 2300 may activate the near field communication function for communication with the first device 1000. The controller 2300 may extract the identification information of the communication apparatus 100 from the first message received from the communication apparatus 100 and, since the identification information of the communication apparatus 100 is extracted, may activate the near field communication function for near field communication with the first device 1000. In this case, the controller 2300 may previously set conditions for activating the near field communication function, for example, an ID of the communication apparatus 100 to be extracted to activate the near field communication function.

The first device 1000 in which the near field communication function is activated and the second device 2000 in which the near field communication function is activated may be close to each other and, since the first device 1000 and the second device 2000 are close to each other, the controller 2300 may transmit and receive data to and from the first device 1000 by controlling the communicator 2500.

Also, the controller 2300 may provide the first device 1000 with a second message for authentication of the second device 2000. The controller 2300 may extract the random number value included in the first message and generate authentication information including the extracted random number value and the identification information of the user of the second device 2000. Also, the controller 2300 may provide the first device 1000 with the second message including the authentication information.

Meanwhile, the third device 3000, the fifth device 5000, the seventh device 7000, the ninth device 9000 and the eleventh device 11000 may include the same or similar components as the second device 2000 and a controller of each of the third device 3000, the fifth device 5000, the seventh device 7000, the ninth device 9000 and the eleventh device 11000 may control other components included in the third device 3000, the fifth device 5000, the seventh device 7000, the ninth device 9000 and the eleventh device 11000, to perform functions of the third device 3000, the fifth device 5000, the seventh device 7000, the ninth device 9000 and the eleventh device 11000 described above.

The communicator 2500 may include one or more components for communicating with at least one of the communication apparatus 100, the first device 1000, and the authentication server 200. For example, the communicator 2500 may include a near field communicator, a mobile communicator, and a broadcast receiver. The communicator 2500 may also transmit and receive information necessary for the first device 1000 to operate in an operation mode related to the communication apparatus 100 and the second device 2000 to and from at least one of the communication apparatus 100, first device 1000, and the authentication server 200.

Figure 45:
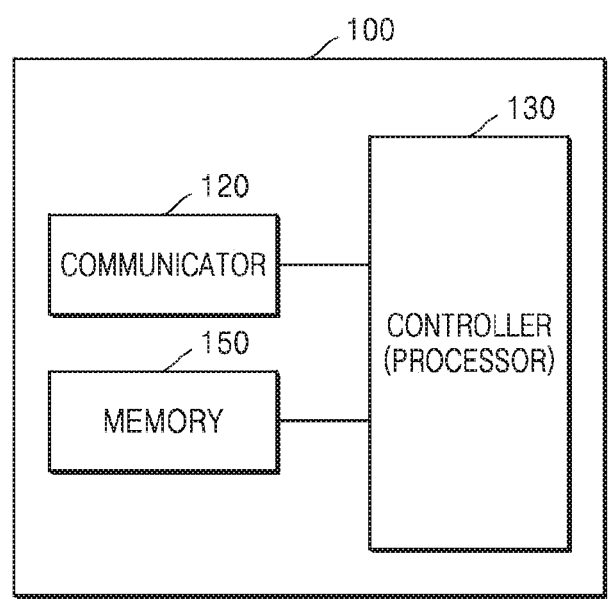
FIG. 45 is a block diagram of a communication apparatus according to some embodiments.

FIG. 45 is a block diagram of the communication apparatus 100 according to some embodiments.

Referring to FIG. 45, the communication apparatus 100 according to some embodiments may include a communicator 110, a controller 130, and a memory 150. However, all components shown in FIG. 45 are not indispensable components of the communication apparatus 100. The communication apparatus 100 may be implemented by more components than the components shown in FIG. 45, or the communication apparatus 100 may be implemented by fewer components than those shown in FIG. 45. For example, the communication apparatus 100 may include the same or similar components as the first device 1000 shown in FIG. 43.

The communicator 110 may transmit data to outside through near field communication.

The controller 130 controls the overall operation of the communication apparatus 100. The controller 130 may broadcast a message including identification information of the communication apparatus 100 to outside by controlling the communicator 110 and the memory 150. The message may include identification information of the communication apparatus 100, a session key, and a random number value. The controller 130 may encrypt the session key and the random number with a public key of the user of the second device 2000 and generate a message including the identification information of the communication apparatus 100 and the encrypted session key and random number value have. In this case, the public key of the user of the second device 2000 may be selected based on an identification value of a user of the second device 2000 input to the communication apparatus 100 among public keys stored in the memory 150.

Also, the controller 130 may authenticate the second device 2000. The controller 130 may decrypt an encrypted ID of the user of the encrypted second device 2000 and the random number value received from the first device 1000 with the session key stored in the memory 150. The session key stored in the memory 150 may be a session key included in the message when the controller 130 generates the message.

Also, the controller 130 may authenticate the second device 2000 using the ID of the user of the second device 2000 and the random number obtained through decryption described above. For example, the controller 130 may authenticate the second device 2000 by comparing the ID of the user of the second device 2000 and the random number obtained through decryption above with an ID and a random number previously stored in the memory 150.

Also, the controller 130 may provide an authentication result of the second device 2000 to the first device 1000.

The memory 150 may store a message to be broadcast from the communication apparatus 100. Also, the memory 150 may store information used to authenticate the second device 2000.

Meanwhile, the communication apparatus 100 may be one of the first communication apparatus 100-1 to the sixth communication apparatus 100-6 and the controller 130 of the communication apparatus 100 may control other components of the communication apparatus 100 to allow the communication apparatus 100 to perform operations of the first communication apparatus 100-1 to the sixth communication apparatus 100-6.

Figure 46:
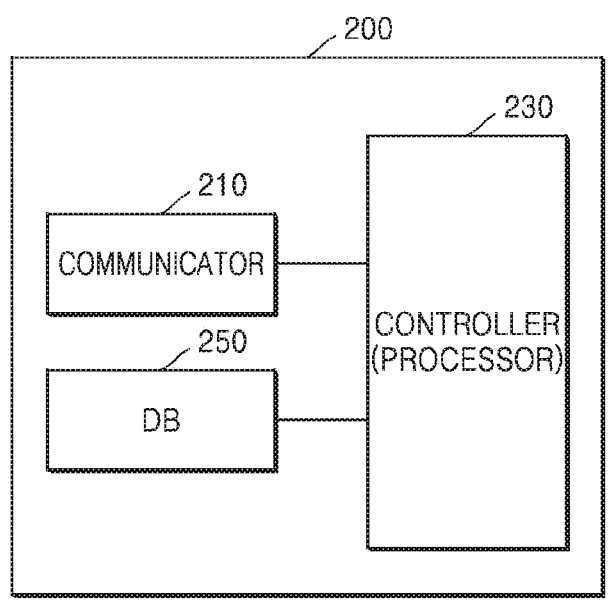
FIG. 46 is a block diagram of an authentication server according to some embodiments.

FIG. 46 is a block diagram of the authentication server 200 according to some embodiments.

Referring to FIG. 46, the authentication server 200 according to some embodiments may include a communicator 210, a controller 230, and a DB 250. However, all components shown in FIG. 46 are not indispensable components of the authentication server 200. The authentication server 200 may be implemented by more components than the components shown in FIG. 46.

The communicator 210 may transmit and receive data to and from the first device 1000 or the communication apparatus 100.

The controller 230 may control the overall operation of the authentication server 200. The controller 230 may authenticate the second device 2000 by controlling the communicator 210 and the DB 250.

Specifically, the controller 230 may be communicatively connected to the first device 1000 by controlling the communicator 210. The controller 230 may be connected to the first device 1000 by controlling the communicator 210 to transmit and receive data to and from the first device 1000 through bidirectional communication. For example, the controller 230 may be connected to the first device 1000 through IP communication, but is not limited thereto.

Also, the controller 230 may receive a request from the first device 1000 for authentication of the second device 2000. The controller 230 may receive an ID of the user of the second device 2000 and a random number encrypted by a session key from the first device 1000 through the communicator 210. Also, the controller 230 may receive a request for authentication of the second device 2000 from the first device 1000 via the communication apparatus 100.

Also, the controller 230 may authenticate the second device 2000. The controller 230 may decrypt the encrypted ID of the user of the second device 2000 and random number value received from the first device 1000 with a session key stored in the DB 250 of the authentication server 200. The session key stored in the DB 250 may be a session key included in a first message when the first communication apparatus 100-1 generates the first message.

Also, the controller 230 may authenticate the second device 2000 using the ID of the user of the second device 2000 and the random number obtained through decryption described above. For example, the controller 230 may authenticate the second device 2000 by comparing the ID of the user of the second device 2000 and the random number value obtained through decryption above with an ID and a random number previously stored in the DB 250 of the authentication server 200. Also, the controller 230 may transmit an authentication result of the second device 2000 to the first device 1000 by controlling the communicator 210.

On the other hand, the above-described embodiments may be implemented in a general-purpose digital computer that may be created as a program that may be executed by a computer and operates the program using a medium readable by a computer. Further, the structure of the data used in the above-described embodiments may be recorded on a computer-readable medium through various means. Furthermore, the above-described embodiments may be embodied in the form of a recording medium including instructions executable by a computer, such as a program module, executed by a computer. For example, methods implemented with software modules or algorithms may be stored in a computer readable recording medium as computer readable code or program instructions.

The computer-readable medium may be any recording medium that may be accessed by a computer, and may include volatile and non-volatile media, removable and non-removable media. Computer-readable media may include magnetic storage media, such as ROM, floppy disks, hard disks, and the like, and storage media such as optical storage media such as CD-ROMs, DVDs, but are not limited thereto. The computer-readable medium may also include computer storage media and communication media.

Also, a plurality of computer-readable recording media may be distributed over networked computer systems, and data stored in distributed recording media, such as program instructions and codes, may be executed by at least one computer.

The particular implementations described in the disclosure are by way of example only and are not intended to limit the scope of the disclosure in any way. For brevity of description, descriptions of conventional electronic configurations, control systems, software, and other functional aspects of the systems may be omitted.

It will be understood that the foregoing description of the disclosure is for the purpose of illustration only and that those of ordinary skill in the art will readily understand that various changes in form and details may be made without departing from the spirit or essential characteristics of the disclosure. It will therefore be understood that the above-described embodiments are illustrative in all aspects and not restrictive. For example, each component described as a single entity may be distributed and implemented, and components described as being distributed may also be implemented in a combined form.

The use of all examples or exemplary terms, e.g., "etc." in the disclosure is for the purpose of describing the disclosure in detail and is not intended to limit the scope of the disclosure unless limited by the claims.

Also, unless otherwise stated, such as "essential", "significant", and the like, the elements described in the disclosure may not be essential components for the practice of the disclosure.

It will be understood by those skilled in the art that various changes in form and details may be made therein without departing from the spirit and scope of the disclosure as defined by the appended claims.

It will be understood that the disclosure is not limited by the specific embodiments described in the specification and that various changes and modifications may be made therein without departing from the spirit and scope of the disclosure, and substitutions are to be understood to be included in the disclosure. Therefore, the disclosed embodiments should be understood in an illustrative rather than a restrictive sense.

The scope of the disclosure is defined by the appended claims rather than the detailed description of the disclosure, and all changes or modifications derived from the meaning and scope of the claims and their equivalents should be construed as being included within the scope of the disclosure.

The terms "unit", "module", and the like, as used herein, refer to a unit that processes at least one function or operation, which may be implemented in hardware or software or a combination of hardware and software.

The terms "unit" and "module" may be embodied by a program stored on a storage medium that may be addressed and that may be executed by a processor.

For example, the terms "unit" and "module" may be implemented by the elements such as software components, object oriented software components, class components and task components, processes, functions, attributes, procedures, sub-routines, segments of program codes, drivers, firmware, microcode, circuitry, data, databases, data structures, tables, arrays, and variables.

As used herein, a technique "A may include one of a1, a2 and a3" is that an element A may include an exemplary element a1, a2, or a3 in a wide sense.

Due to the above-described technique, an element that may be included the element A is not necessarily limited to a1, a2 or a3. Thus, the technique is not exclusively construed that an element that may be included in A excludes other elements that are not exemplified, in addition to a1, a2, and a3.

Further, the technique means that A may include a1, a2, or a3. The technique does not mean that elements included in A are not necessarily selectively determined within a predetermined set. For example, the technique is not limited to construe that a1, a2, or a3 selected from a set including a1, a2, and a3 is necessarily included in the component A.

Also, in the present specification, a technique "at least one of a1, a2, or (and) a3" means one of a1; a2; a3; a1 and a2; a1 and a3; a2 and a3; and a1 and a2, and a3.

Thus, unless explicitly described as "at least one of a1, at least one of a2, or (and) at least one of a3", the technique "at least one of a1, a2, or (and) a3" is not construed as "at least one of a1, at least one of a2, or (and) at least one of a3".

The invention claimed is:

1. A method, performed by a first device of a user, of providing information regarding emergency of the user to a second device, the method comprising:
    receiving a first message broadcast from a communication apparatus within a near field communication range of the communication apparatus;
    in response to receiving the first message, activating near field communication with the second device and receiving a second message from the second device as the second device located within the near field communication range of the communication apparatus comes into near field contact with the first device;
    authenticating the second device by using the second message; and
    providing the information regarding emergency of the user to the second device.

2. The method of claim 1, further comprising:
    activating a communication function for near field communication with the second device when the first message is received.

3. The method of claim 1, wherein the authenticating of the second device comprises:
    requesting the communication apparatus to authenticate the second device by providing the communication apparatus with identification information of a user of the second device included in the second message.

4. The method of claim 3,
    wherein the identification information of the user of the second device included in the second message is identification information encrypted by using a public key of a user of the first device, and
    wherein the requesting of the communication apparatus to authenticate the second device comprises:
    decrypting the encrypted identification information by using a private key of the user of the first device; and
    providing the decrypted identification information to the communication apparatus.

5. The method of claim 4, wherein the public key used to encrypt the identification information of the user of the second device is provided from the first device to the second device via near field communication.

6. The method of claim 4, wherein the second message comprises the identification information of the user of the second device, a session key, and a random number value that are encrypted by using the public key of the user of the first device.

7. The method of claim 6, wherein the requesting of the communication apparatus to authenticate the second device comprises:
    encrypting the identification information of the second device and the random number value by using the session key; and
    providing, to the communication apparatus, the identification information of the second device and the random number value encrypted using the session key.

8. The method of claim 1,
    wherein the first message comprises identification information of the communication apparatus, a session key and a random number value encrypted by using a public key of a user of the second device, and
    wherein the first message is broadcast to the first device and the second device.

9. The method of claim 1, wherein the receiving of the second message, the authenticating of the second device, and the providing of the information regarding emergency of the user are performed while the first device is located within the near field communication range of the communication apparatus.

10. The method of claim 1,
    wherein the communication apparatus is installed in an ambulance or a hospital, and
    wherein the information regarding emergency of the user comprises health information of a user of the first device.

11. The method of claim 10, further comprising:
    generating status information indicating a situation around the first device by using at least one of a voice recording function or a video photographing function of the first device when the second device is authenticated.

12. The method of claim 10, further comprising:
    transmitting notification information informing about an emergency state of the user to other predetermined devices when the second device is authenticated.

13. The method of claim 1, further comprising:

determining whether a user of the first device is in an emergency state, based on biometric information of the user; and displaying profile information of the user of the first device on a screen of the first device when the user is determined to be in the emergency state.

14. A first device of a user for providing information regarding emergency of the user to a second device, the first device comprising:

a transceiver configured to:

receive a first message broadcast from a communication apparatus within a near field communication range of the communication apparatus, and in response to receiving the first message, activate near field communication with the second device and receive a second message from the second device as the second device located within the near field communication range of the communication apparatus comes into near field contact with the first device; and at least one processor configured to:

authenticate the second device by using the second message, and provide information regarding emergency of the user to the second device.

15. A non-transitory computer-readable recording medium having recorded thereon a program for executing the method of claim 1 in a computer.

\* \* \* \* \*